US012640279B2

(12) United States Patent
Tringides et al.

(10) Patent No.: US 12,640,279 B2
(45) Date of Patent: May 26, 2026

(54) VISCOELASTIC CONDUCTIVE HYDROGEL

(71) Applicant: President and Fellows of Harvard College, Cambridge, MA (US)

(72) Inventors: Christina Tringides, Cambridge, MA (US); David J. Mooney, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 0 days.

(21) Appl. No.: 18/031,510

(22) PCT Filed: Oct. 12, 2021

(86) PCT No.: PCT/US2021/054500
§ 371 (c)(1),
(2) Date: Apr. 12, 2023

(87) PCT Pub. No.: WO2022/081527
PCT Pub. Date: Apr. 21, 2022

(65) Prior Publication Data
US 2023/0386697 A1      Nov. 30, 2023

Related U.S. Application Data

(60) Provisional application No. 63/090,960, filed on Oct. 13, 2020.

(51) Int. Cl.
*H01B 1/12* (2006.01)
*C08B 37/00* (2006.01)
(Continued)

(52) U.S. Cl.
CPC .......... *H01B 1/124* (2013.01); *C08B 37/0084* (2013.01); *C08L 33/26* (2013.01); *H01B 1/18* (2013.01)

(58) Field of Classification Search
CPC .............. H01B 1/04; H01B 1/12; H01B 1/18; H01B 1/124
(Continued)

(56) References Cited

U.S. PATENT DOCUMENTS 6,511,650 B1    1/2003    Eiselt et al.
9,387,276 B2    7/2016    Sun et al.
(Continued)

FOREIGN PATENT DOCUMENTS

WO      2019/138019 A2    7/2019
WO      2020/007590 A1    1/2020
WO      2020/077173 A1    4/2020

OTHER PUBLICATIONS

Tripathi "Elastic and macroporous agarose-gelatin cryogels with isotropic and anisotropic porosity for tissue engineering." Journal of Biomedical Materials Research Part A, pp. 680 et seq. (Year: 2008).*
(Continued)

*Primary Examiner* — Tri V Nguyen
(74) *Attorney, Agent, or Firm* — McCarter & English, LLP; Wei Song

(57) ABSTRACT
Disclosed herein are viscoelastic conductive composite. The viscoelastic conductive composite includes a viscoelastic conductive material; and a conductive filler. The viscoelastic conductive material has a viscoelastic property that matches the viscoelastic property of a tissue.

15 Claims, 31 Drawing Sheets

Viscoelastic insulation top encapsulation (10 µm)

Stretchable hydrogel top encapsulation (100 µm)

Electrode openings

Flexible connector

Viscoelastic encapsulation bilayer (110 µm)

Electrically conductive hydrogel tracks

(51) Int. Cl.
*C08L 33/26* (2006.01)
*H01B 1/18* (2006.01)

(58) Field of Classification Search
USPC .................................................. 252/510, 511
See application file for complete search history.

(56) References Cited

U.S. PATENT DOCUMENTS

| | | | |
|---|---|---|---|
| 9,675,561 | B2 | 6/2017 | Bencherif et al. |
| 2014/0079752 | A1 | 3/2014 | Huebsch et al. |
| 2014/0227327 | A1 | 8/2014 | Bencherif et al. |
| 2015/0359928 | A1 | 12/2015 | Gu et al. |
| 2016/0049217 | A1 | 2/2016 | Tee et al. |
| 2017/0119892 | A1 | 5/2017 | Brudno et al. |
| 2017/0189581 | A1 | 7/2017 | Desai et al. |
| 2017/0232138 | A1 | 8/2017 | Khademhosseini et al. |
| 2018/0179357 | A1* | 6/2018 | Lu ........................... A61L 27/48 |
| 2018/0326073 | A1 | 11/2018 | Mooney et al. |
| 2019/0091367 | A1 | 3/2019 | Li et al. |
| 2019/0106544 | A1 | 4/2019 | Bao et al. |
| 2019/0185672 | A1* | 6/2019 | Boland ................... C08L 83/04 |
| 2020/0038648 | A1 | 2/2020 | Heintz et al. |
| 2021/0059654 | A1* | 3/2021 | Ryan ..................... A61L 31/148 |
| 2021/0108180 | A1* | 4/2021 | Kim ...................... C12N 5/0696 |
| 2022/0047778 | A1* | 2/2022 | Shah ........................ A61L 27/54 |
| 2023/0166005 | A1* | 6/2023 | Woerly ................... A61L 27/16 |
| | | | 428/515 |

OTHER PUBLICATIONS

Bhagavatheswaran et al., Construction of an Interconnected Nanostructured Carbon Black Network: Development of Highly Stretchable and Robust Elastomeric Conductors. J Phys Chem C. 2015; 119(37):21723-21731.

Boyle et al., Epicardial interventions in electrophysiology. Circulation. Oct. 2, 2012;126(14):1752-69.

Budday et al., Region- and loading-specific finite viscoelasticity of human brain tissue. RAMM. Dec. 17, 2018;18(1):e201800169, 2 pages.

Chaudhuri et al., Effects of extracellular matrix viscoelasticity on cellular behaviour. Nature. Aug. 2020;584(7822):535-546.

Chaudhuri et al., Extracellular matrix stiffness and composition jointly regulate the induction of malignant phenotypes in mammary epithelium. Nat Mater. Oct. 2014;13(10):970-8.

Chaudhuri et al., Hydrogels with tunable stress relaxation regulate stem cell fate and activity. Nat Mater. Mar. 2016;15(3):326-34.

Chen et al., A Skin-Inspired Stretchable, Self-Healing and Electro-Conductive Hydrogel with A Synergistic Triple Network for Wearable Strain Sensors Applied in Human-Motion Detection. Nanomaterials (Basel). Dec. 6, 2019;9(12):1737, 20 pages.

Chen et al., Three-dimensional flexible and conductive interconnected graphene networks grown by chemical vapour deposition. Nat Mater. Jun. 2011;10(6):424-8.

Conti et al., First-in-human high-density endo-epicardial mapping and ablation through left minithoracotomy in a patient with unstable ventricular tachycardia requiring ECMO. HeartRhythm Case Rep. Apr. 13, 2020;6(7):427-430.

David-Pur et al., All-carbon-nanotube flexible multi-electrode array for neuronal recording and stimulation. Biomed Microdevices. Feb. 2014;16(1):43-53.

Feig et al., Mechanically tunable conductive interpenetrating network hydrogels that mimic the elastic moduli of biological tissue. Nat Commun. Jul. 16, 2018;9(1):2740, 9 pages.

Haggenmueller et al., Aligned single-wall carbon nanotubes in composites by melt processing methods. Chemical Physics Letters. Nov. 10, 2000;330(3-4):219-225.

Hassler et al., Polymers of Neural Implants. J Polym Sci Part B: Polym Phys. 2011;49:18-33.

Hong et al., Novel electrode technologies for neural recordings. Nat Rev Neurosci. Jun. 2019;20(6):330-345.

Jackson et al., Neural interfaces for the brain and spinal cord—restoring motor function. Nat Rev Neurol. Dec. 2012;8(12):690-9.

Jiang et al., Click hydrogels, microgels and nanogels: emerging platforms for drug delivery and tissue engineering. Biomaterials. Jun. 2014;35(18):4969-85.

Kang et al., Tough and Water-Insensitive Self-Healing Elastomer for Robust Electronic Skin. Adv Mater. Mar. 2018;30(13):e1706846, with Supplemental Materials, 31 pages.

Kim et al., Elastic conducting polymer composites in thermoelectric modules. Nat Commun. Mar. 18, 2020;11(1):1424, 10 pages.

Konerding et al., New thin-film surface electrode array enables brain mapping with high spatial acuity in rodents. Sci Rep. Feb. 28, 2018;8(1):3825, 14 pages.

Lacour et al., Materials and technologies for soft implantable neuroprostheses. Nature Reviews Materials. 2016;1:16063, 14 pages.

Lu et al., Pure PEDOT:PSS hydrogels. Nat Commun. Mar. 5, 2019;10(1):1043, 10 pages.

Luan et al., Ultraflexible nanoelectronic probes form reliable, glial scar-free neural integration. Sci Adv. Feb. 15, 2017;3(2):e1601966, 9 pages.

Martinsen et al., Alginate as immobilization material: I. Correlation between chemical and physical properties of alginate gel beads. Biotechnol Bioeng. Jan. 5, 1989;33(1):79-89.

Mcmanus et al., Water-based and biocompatible 2D crystal inks for all-inkjet-printed heterostructures. Nat Nanotechnol. May 2017;12(4):343-350.

Minev et al., Electronic dura mater for long-term multimodal neural interfaces. Science. Jan. 9, 2015;347(6218):159-63.

Rowley et al., Alginate hydrogels as synthetic extracellular matrix materials. Biomaterials. Jan. 1999;20(1):45-53.

Rubehn et al., A MEMS-based flexible multichannel ECoG-electrode array. J Neural Eng. Jun. 2009;6(3):036003, 10 pages.

Sun et al., Highly stretchable and tough hydrogels. Nature. Sep. 6, 2012;489(7414):133-6.

Tolstosheeva et al., A multi-channel, flex-rigid ECoG microelectrode array for visual cortical interfacing. Sensors (Basel). Jan. 6, 2015;15(1):832-54.

Tondera et al., Highly Conductive, Stretchable, and Cell-Adhesive Hydrogel by Nanoclay Doping. Small. Jul. 2019;15(27):e1901406, 9 pages.

Topsoe et al., Geometric factors in four point resistivity measurement. 2nd revised edition, Bulletin No. 472-13. Semiconductor Division. Our File No. 472, 64 pages, May 25, 1968.

Tringides et al., Viscoelastic surface electrode arrays to interface with viscoelastic tissues. Nat Nanotechnol. Sep. 2021;16(9):1019-1029, with supplemental materials, 49 pages.

Tybrandt et al., High-Density Stretchable Electrode Grids for Chronic Neural Recording. Adv Mater. Apr. 2018,30(15):e1706520, 14 pages.

Vicente et al., Electromechanical Properties of PVDF-Based Polymers Reinforced with Nanocarbonaceous Fillers for Pressure Sensing Applications. Materials (Basel). Oct. 29, 2019;12(21):3545, 14 pages.

Wang et al., A highly stretchable, transparent, and conductive polymer. Sci Adv. Mar. 10, 2017;3(3):e1602076, 10 pages.

Wang et al., Viscoelastic Properties of Cardiovascular Tissues. Viscoelastic and Viscoplastic Materials. Mohamed Fathy El-Amin (Ed.). IntechOpen. Chapter 7, pp. 141-163, (2016).

International Search Report and Written Opinion for Application No. PCT/US2021/054500, dated Mar. 1, 2022, 16 pages.

* cited by examiner

Viscoelastic insulation
top encapsulation
(10 μm)

Flexible
connector

Viscoelastic encapsulation
bilayer (110 μm)

Stretchable hydrogel
top encapsulation
(100 μm)

Electrode openings

Electrically conductive
hydrogel tracks

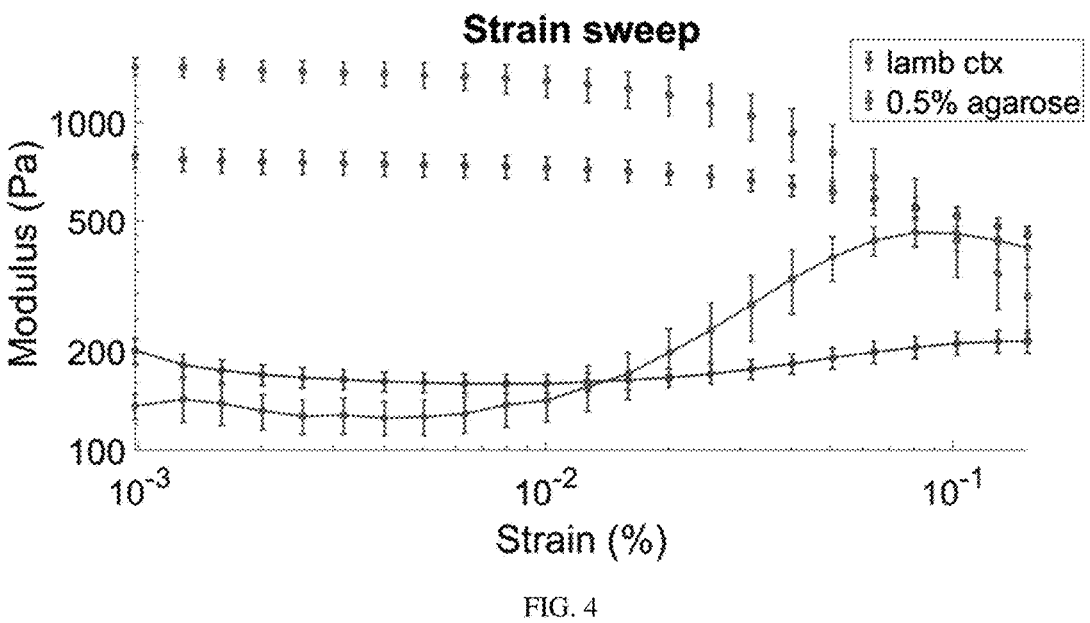
FIG. 4
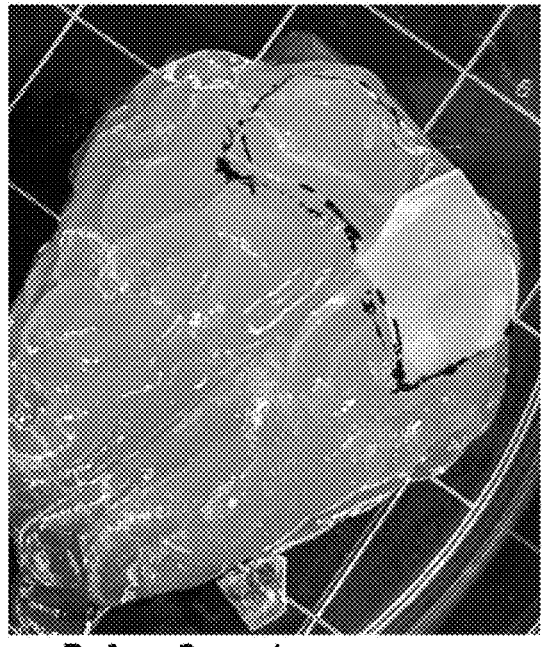
Before 2 weeks on
orbital shaker
After 2 weeks on
orbital shaker
FIG. 5

Immediately after removal from mock agarose brain 1 hour after removal from mock agarose brain

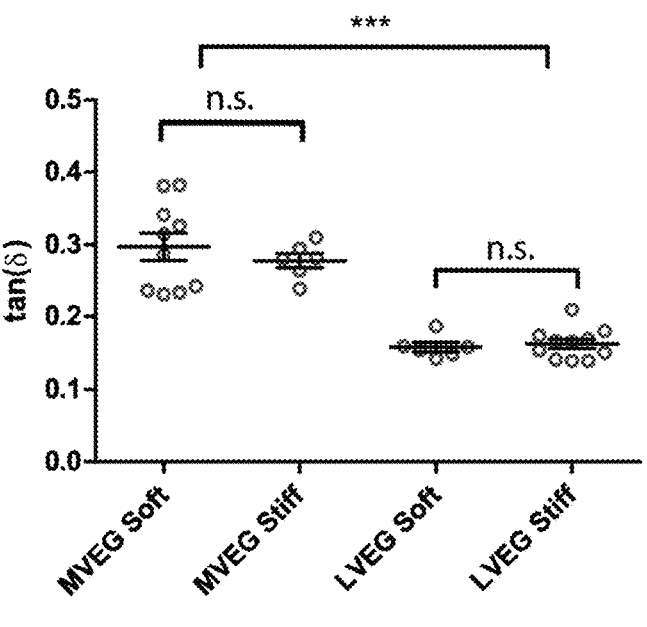
FIG. 7
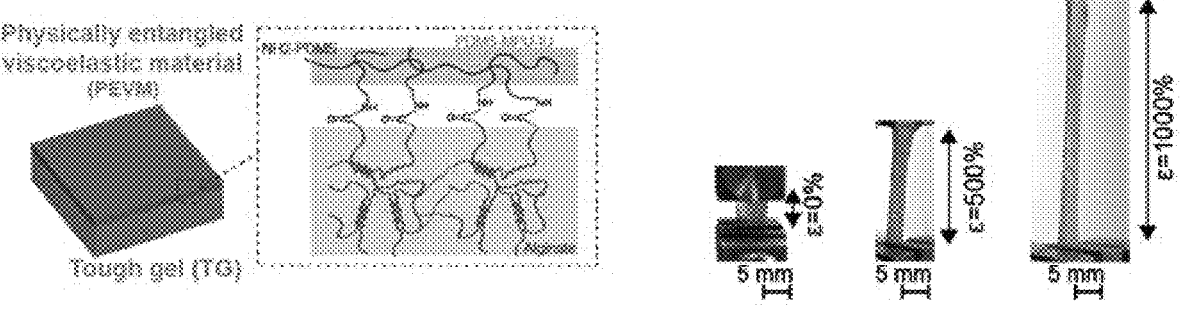
FIG. 8A                                           FIG. 8B
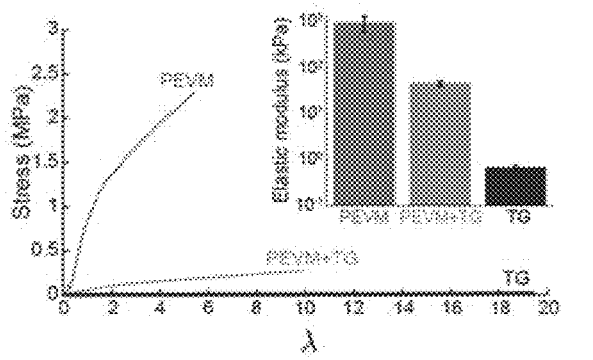 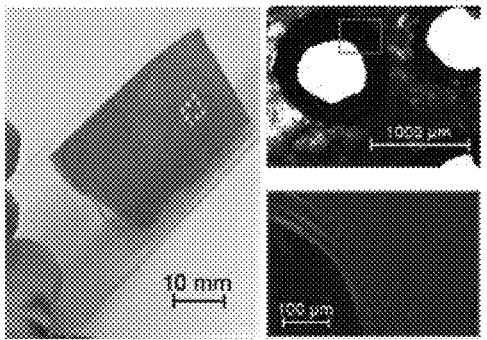
FIG. 8C                                           FIG. 8D

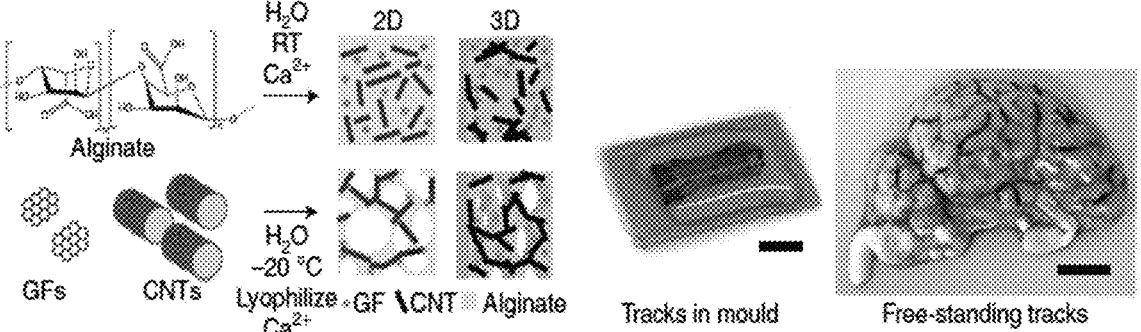
FIG. 11A                    FIG. 11B
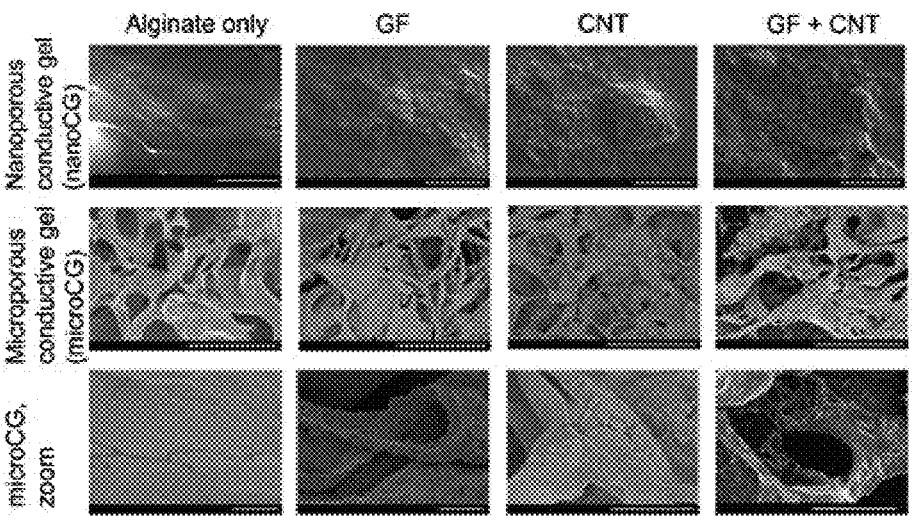
FIG. 11C
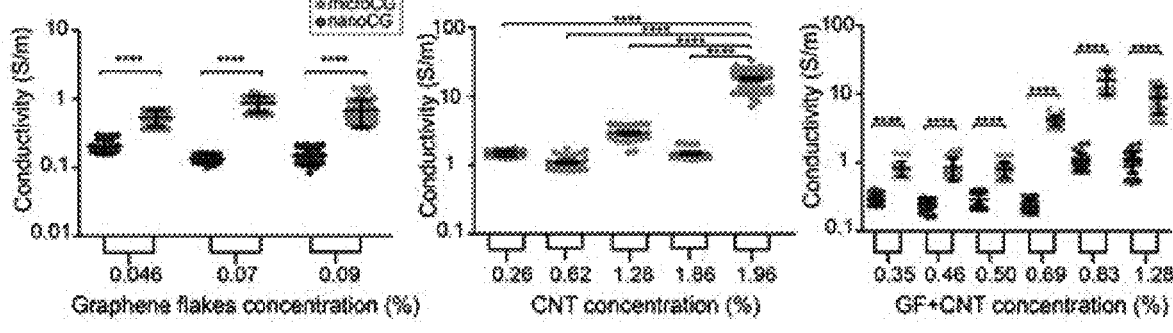
FIG. 11D                    FIG. 11E                    FIG. 11F

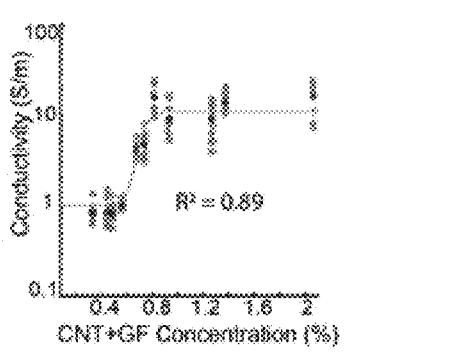
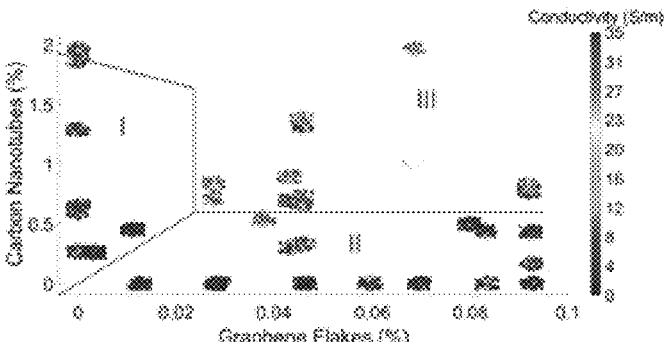
FIG. 11G
FIG. 11H
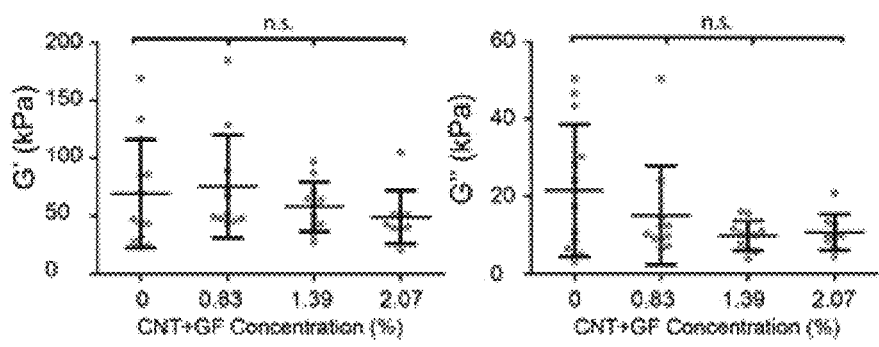
FIG. 11I
FIG. 11J
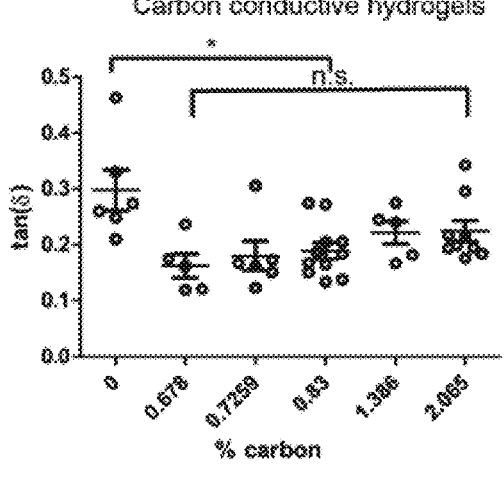
FIG. 11K Carbon conductive hydrogels Tungsten microparticle conductive hydrogels (frozen at -20 C)

Tungsten microparticle conductive hydrogels (frozen at -80 C)

200 µm

200 μm

PHYSICALLY ENTANGLED VISCOELASTIC MATERIAL

PDMS-MPU-IU

NH2-PDMS

NH     NH     NH     NH

O=C     O=C     O=C     O=C

Polyacrylamide

Alginate

TOUGH GEL

Side view  Top View  3D View

1. 3D print a plastic positive mold of the tracks

2. Cast Ecoflex 0030 to make a flexible, negative of the mold to pattern the tracks

3. Release the flexible mold and fill with conductive gel composite. Move to the freezer, lyophilizer to create macroporous conductive gels, or crosslink immediately after casting to create nanoporous gels.

4. Cast tough gel (blue), and physically entangled viscoelastic insulatory films (PEVM, pink). Once both have crosslinked, attach covalently with carboimide

5. Laser etch openings in the bilayer for the top encapsulation layer, to expose the electrodes at particular sites.

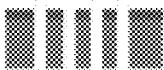

6. Transfer print the conductive tracks onto the PEVM side of the bottom encapsulation piece.

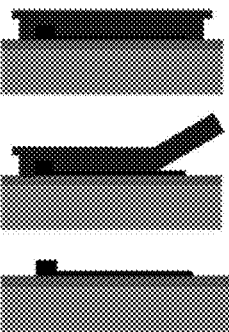

7. Align top encapsulation piece, such that electrodes are exposed, and add a connector (orange).

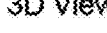
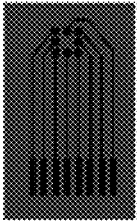
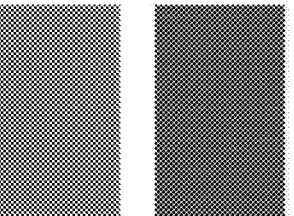
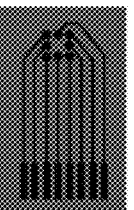
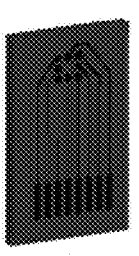
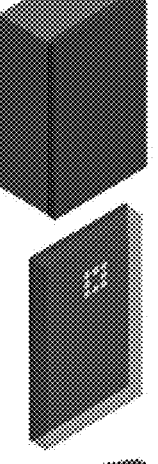
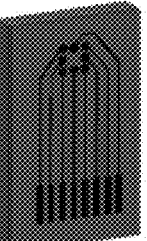
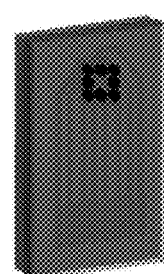

FIG. 17

Mechanical cycling

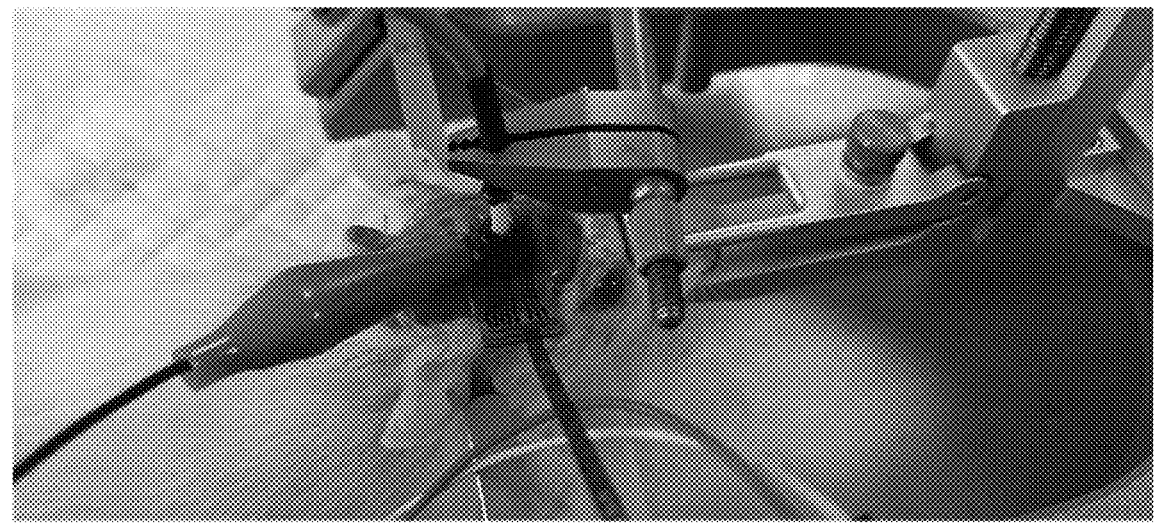
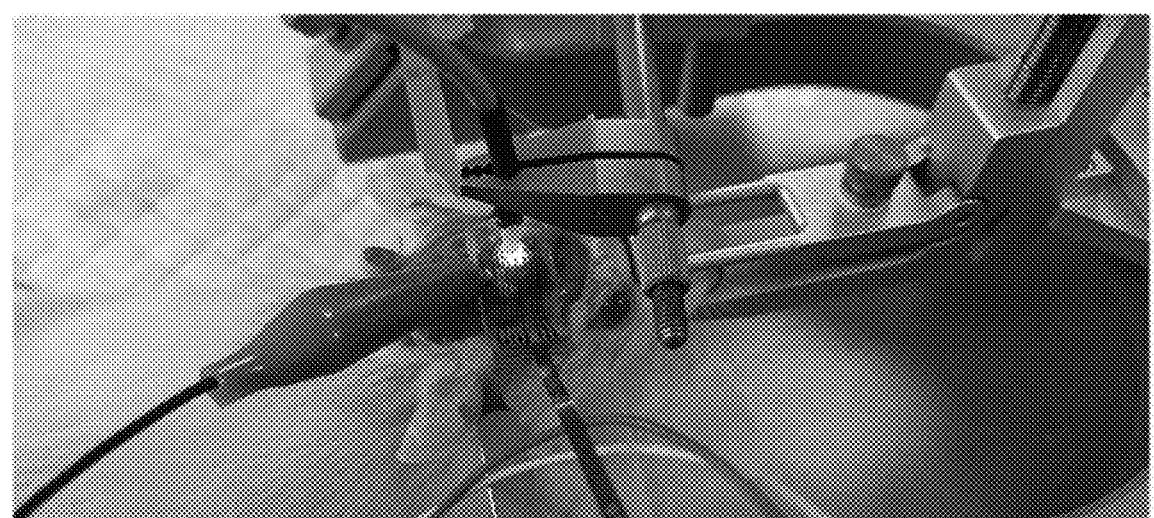
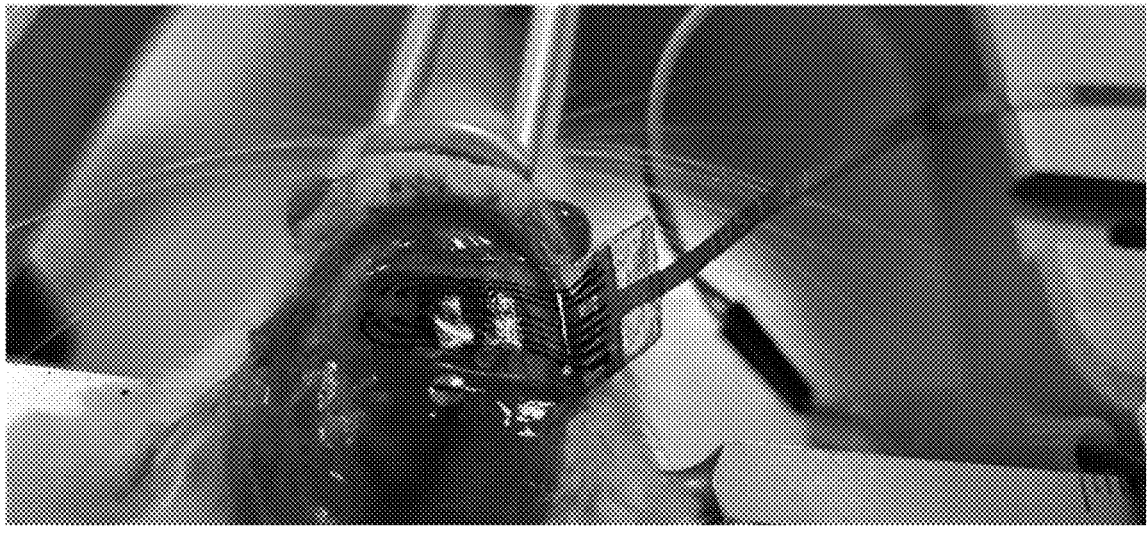
FIG. 22

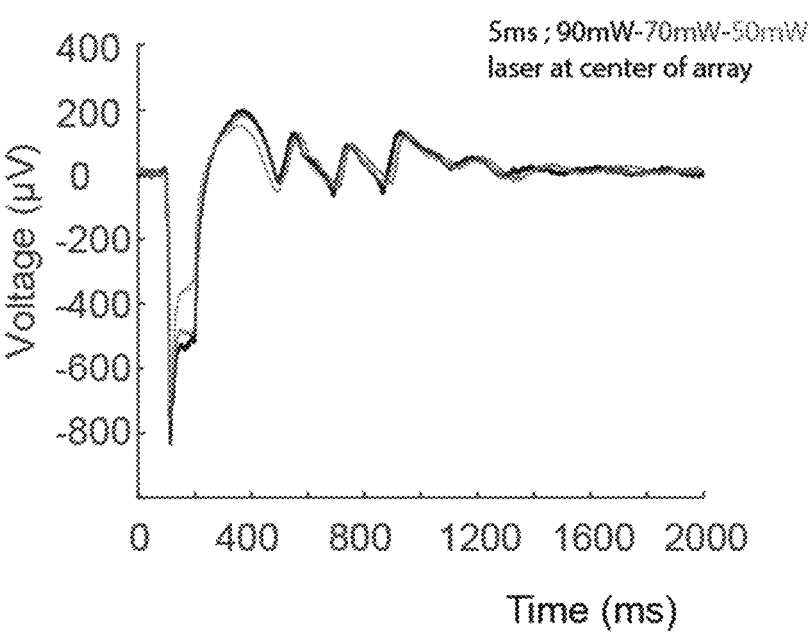
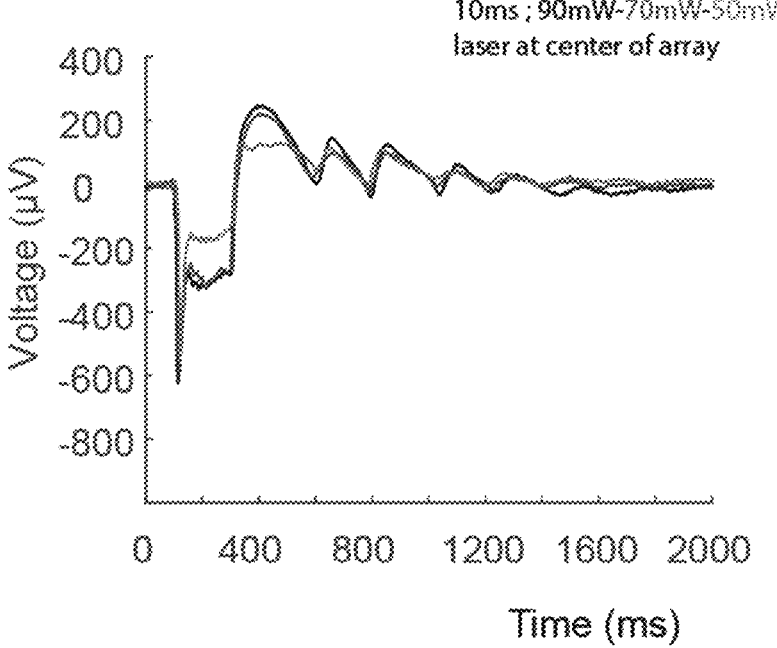
FIG. 24

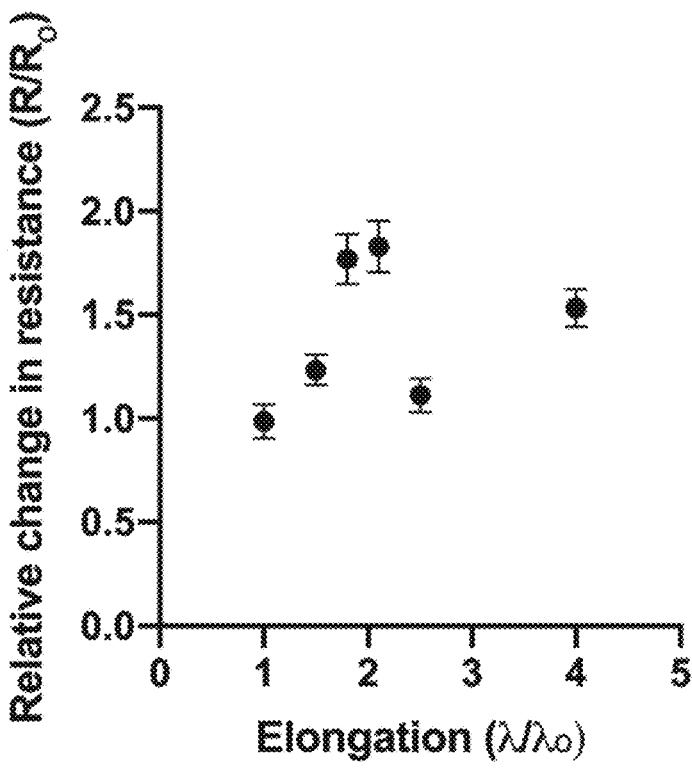
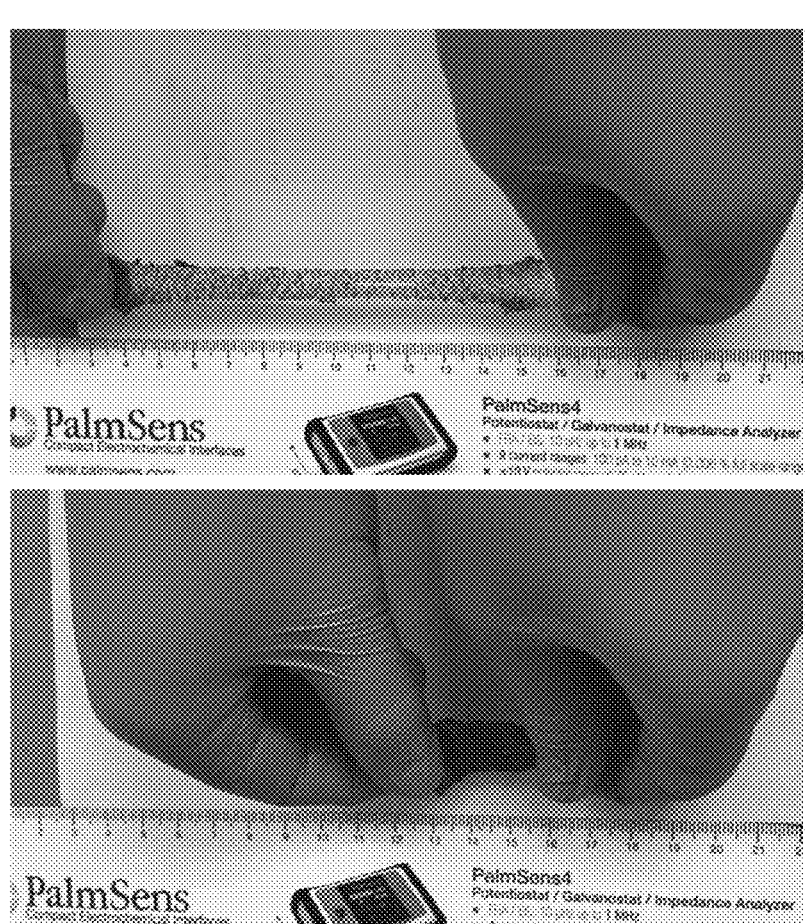
FIG. 27

VISCOELASTIC CONDUCTIVE HYDROGEL

CROSS REFERENCE TO RELATED APPLICATIONS

This application is a 35 U.S.C. § 371 national stage filing of International Application No. PCT/US2021/054500, filed on Oct. 12, 2021, which claims priority to U.S. Provisional Application Ser. No. 63/090,960, filed Oct. 13, 2020. The entire contents of each of these applications are incorporated herein by reference.

STATEMENT OF GOVERNMENT SUPPORT

This invention was made with U.S. government support under DE013033 awarded by the National Institutes of Health. The government has certain rights in the invention.

BACKGROUND

Existing surface electrode arrays that monitor the electrophysiology of the brain and the heart do not match the mechanical properties of these tissues, leading to poor device conformability and significant inflammatory responses.

Accordingly, there is a need in the art for compatible material for electrodes to monitor the electrophysiology of tissues, e.g., brain or heart.

SUMMARY

Disclosed herein are viscoelastic compositions that are used to make viscoelastic electrode arrays. The electrode arrays can match the mechanical properties of soft tissues and conform to the complex geometry thereof. Moreover, cells are not only viable to the viscoelastic compositions and/or the corresponding viscoelastic electrode arrays of the present inventions, they are also able to function (divide, form connections) while attached to the materials (See FIG. 26).

Accordingly, in one aspect, the present invention provides an viscoelastic conductive composite. The viscoelastic conductive composite includes a viscoelastic conductive material; and a conductive filler, wherein the viscoelastic conductive material has a viscoelastic property that matches the viscoelastic property of a tissue.

In one embodiment, the viscoelastic conductive material comprises a crosslinked polymer. In another embodiment, crosslinked polymer comprises a hydrogel. In still another embodiment, the polymer is a polypeptide or a polysaccharide. In yet another embodiment, the polymer is selected from the group consisting of alginate, chitosan, gelatin, collagen, laminin, and hyaluronic acid. In one embodiment, the polymer comprises an alginate.

In another embodiment, the polymer is ionically crosslinked. In still another embodiment, the polymer is ionically crosslinked with a crosslinking agent selected from the group consisting of a $Ca^{2+}$ salt, a $Mg^{2+}$ salt, a $Mn^{2+}$ salt, a $Be^{2+}$ salt, a $Sr^{2+}$ salt, a $Ba^{2+}$ salt, and a $Ra^{2+}$ salt. In yet another embodiment, the crosslinking agent is selected from the group consisting of $CaSO_4$, $CaCl_2$, $Ca(NO_3)_2$, and $CaCO_3$.

In still another embodiment, the polymer is covalently crosslinked. In yet another embodiment, the polymer is modified with methacrylate group or acrylate group and the polymer is covalently crosslinked through the interaction between the methacrylate group or the acrylate group.

In one embodiment, the hydrogel comprises a nanopore or a micropore. In another embodiment, the hydrogel comprises a micropore having a diameter of about 1 μm to about 150 μm.

In another embodiment, the hydrogel has a porosity of about 50% to about 97%. In still another embodiment, the hydrogel has a porosity of about 78% to about 95%.

In still another embodiment, the hydrogel is a cryogel.

In yet another embodiment, the conductive filler is selected from a metal, a carbon material, or a conductive polymer. In one embodiment, the conductive filler is selected from the group consisting of a graphene flake, a carbon nanotube, and a combination thereof. In another embodiment, the conductive filler comprises a conductive microparticle or a conductive nanoparticle, wherein the conductive microparticle or the conductive nanoparticle contacts another conductive microparticle or another conductive nanoparticle to form a percolating path.

In one embodiment, the viscoelastic property is selected from the group consisting of a storage modulus, a loss modulus, a ratio of loss modulus/storage modulus, and any combination thereof. In another embodiment, the viscoelastic conductive materials has a storage modulus of about 500 Pa to about 400 kPa, a loss modulus of about 40 Pa to about 200 kPa, and a ratio of loss storage to storage modulus of about 0.1 to about 0.5.

In another embodiment, the tissue is selected from the group consisting of central nervous system tissue, peripheral nervous system tissue, cardiac tissue, musculoskeletal tissues and skin. In still another embodiment, the tissue is selected from the group consisting of heart tissue, brain tissue, spinal cord tissue, peripheral nerve tissue, and skeletal muscle tissue.

In one aspect, the present invention provides an viscoelastic conductive composite. The viscoelastic conductive composite includes a viscoelastic hydrogel comprising a crosslinked alginate; and a conductive filler comprising a graphene flake and a carbon nanotube, wherein the hydrogel comprises a micropore having a diameter of about 40 μm to about 100 μm; wherein the hydrogel has a porosity of about 78% to about 95%; wherein the alginate is crosslinked with a $Ca^{2+}$ salt; and wherein the viscoelastic hydrogel has a viscoelastic property that matches the viscoelastic property of a tissue.

In another aspect, the present invention provides an viscoelastic conductive track. The viscoelastic conductive track includes the viscoelastic conductive composite of any embodiment of various aspects of the invention. In one embodiment, the viscoelastic conductive track has a cross-section diameter of about 80 μm to about 5 mm. In another embodiment, the viscoelastic conductive track further includes an electrode at a distal end of the viscoelastic conductive track. In still another embodiment, the electrode is a protrusion of the viscoelastic conductive track at the distal end.

In still another aspect, the present invention provides a viscoelastic electrode array. The viscoelastic electrode array includes at least one viscoelastic conductive track of any embodiment of various aspects of the invention. In one embodiment, the viscoelastic electrode array further includes a connector attached to a proximal end of the viscoelastic conductive track.

In one embodiment, the electrode disclosed herein is viscoelastic.

In one embodiment, the viscoelastic electrode array is stretchable.

In one embodiment, the viscoelastic electrode array further includes a first viscoelastic insulate film; and a second viscoelastic insulate film, wherein the first viscoelastic insulate film comprises at least one opening configured to accommodate the electrode of the at least one viscoelastic conductive track; wherein the first viscoelastic insulate film and the second viscoelastic insulate film electrically insulate the at least one electrode; and wherein the at least one viscoelastic conductive track is located between the first viscoelastic insulate film and the second viscoelastic insulate film. In another embodiment, the first viscoelastic insulate film and the second viscoelastic insulate film include a self-healing elastomer. In still another embodiment, the self-healing elastomer comprises a crosslinked polydimethylsiloxane (PDMS). In yet another embodiment, the self-healing elastomer include a polydimethylsiloxane (PDMS) polymer backbone with a particular ratio of 4,4'-methylenebis(phenyl urea) (MPU) and isophorone bisurea (IU). In yet another embodiment, the PDMS polymer is expressed as PDMS-MPU$_x$-IU$_{1-x}$, wherein the "x" represents the ratio of MPU and the "1-x" represents the ratio of IU.

In another embodiment, the viscoelastic electrode array further comprises a first viscoelastic outer layer and a second viscoelastic outer layer; wherein the first viscoelastic outer layer is attached to the first viscoelastic insulate film and comprises at least one opening configured to accommodate the electrode of the at least one viscoelastic conductive track, wherein the second viscoelastic outer layer is attached to the second viscoelastic insulate film, and wherein the first viscoelastic outer layer, the first viscoelastic insulate film, the viscoelastic conductive track, the second viscoelastic insulate film, and the second viscoelastic outer layer is arranged in the following order, with the viscoelastic conductive track located innermost: the first viscoelastic outer layer-the first viscoelastic insulate film-the viscoelastic conductive track-the second viscoelastic insulate film-the second viscoelastic outer layer.

In still another embodiment, the first viscoelastic outer layer is covalently bonded with the first viscoelastic insulate film and the second viscoelastic outer layer is covalently bonded with the second viscoelastic insulate film. In one embodiment, the viscoelastic insulate film and the viscoelastic outer layer are covalently bonded via carbodiimide chemistry or click chemistry.

In yet another embodiment, the first viscoelastic outer layer and the second viscoelastic outer layer comprise an interpenetrating networks (IPN) hydrogel composition, comprising a first polymer network and a second polymer network, wherein the first polymer network comprises a first polymer that is covalently crosslinked and the second polymer network comprises a second polymer that is ionically crosslinked.

In one embodiment of various aspects of the invention, the first polymer is selected from the group consisting of polyacrylamide, poly(hydroxyethylmethacrylate) (PHEMA), poly(vinyl alcohol) (PVA), polyethylene glycol (PEG), polyphosphazene, collagen, gelatin, poly(acrylate), poly(methacrylate), poly(methacrylamide), poly(acrylic acid), poly(N-isopropylacrylamide) (PNIPAM), poly(N,N-dimentylacrylamide), poly(allylamine) and copolymers thereof.

In another embodiment of various aspects of the invention, the first polymer network comprises a first polymer that is covalently crosslinked with a covalent crosslinking agent selected from the group consisting of N,N-methylenebisacrylamide (MBAA), a methacrylate crosslinker, N,N'-dicyclohexylcarbodiimide (DCC), 1-ethyl-3-(3-dimethylaminopropyl)carbodiimide (ECC), N-hydroxysuccinimide, N-hydroxysulfosuccinimide, glutaraldehyde, and a transglutaminase, optionally wherein the covalent crosslinking agent is N,N-methylenebisacrylamide (MBAA).

In still another embodiment of various aspects of the invention, the first polymer network comprises a first polymer that is covalently crosslinked with a biodegradable covalent crosslinking agent selected from the group consisting of a poly(ethylene glycol) acrylate, a gelatin acrylate, a hyaluronic acid acrylate, an alginate acrylate, and poloxamer (PEG-PPG-PEG) diacrylate.

In another embodiment of various aspects of the invention, the second polymer is selected from the group consisting of alginate, pectate, carboxymethyl cellulose, oxidized carboxymethyl cellulose, hyaluronate, chitosan, κ-carrageenan, ι-carrageenan and λ-carrageenan. In still another embodiment, the alginate, carboxymethyl cellulose, hyaluronate chitosan, κ-carrageenan, ι-carrageenan or λ-carrageenan is oxidized. In yet another embodiment, the alginate, carboxymethyl cellulose, hyaluronate chitosan, κ-carrageenan, ι-carrageenan or λ-carrageenan is oxidized. In one embodiment, the alginate, carboxymethyl cellulose, hyaluronate chitosan, κ-carrageenan, t-carrageenan or λ-carrageenan includes one or more groups selected from the group consisting of methacrylate, acrylate, acrylamide, methacrylamide, thiol, hydrazine, tetrazine, norbornene, transcyclooctene and cyclooctyne.

In one embodiment of various aspects of the invention, the second polymer network comprises a second polymer that is ionically crosslinked with an ionic crosslinking agent selected from the group consisting of CaCl$_2$, CaSO$_4$, CaCO$_3$, hyaluronic acid, and polylysine.

In another embodiment of various aspects of the invention, the first polymer network and the second polymer network are covalently coupled.

In still another embodiment of various aspects of the invention, the viscoelastic electrode array further comprises an adhesive layer. In one embodiment, the adhesive layer comprising an adhesive comprising a high density primary amine polymer. In one embodiment, the high density primary amine polymer is selected from the group consisting of chitosan, gelatin, collagen, polyallylamine, polylysine, and polyethylenimine. In a specific embodiment, the high density primary amine polymer is chitosan.

In one aspect, the present invention provide an viscoelastic electrode array. The viscoelastic electrode array includes at least an viscoelastic conductive track, comprising a viscoelastic hydrogel comprising a crosslinked alginate, wherein the hydrogel comprising a micropore having a diameter of about 40 μm to about 100 μm; and a conductive filler comprising a graphene flake and a carbon nanotube, wherein the viscoelastic hydrogel has a viscoelastic property that matches the viscoelastic property of the tissue; an electrode, wherein the electrode is a protrusion of the viscoelastic conductive track at the distal end; a first viscoelastic insulate film and a second viscoelastic insulate film, wherein the first viscoelastic insulate film comprises at least one opening configured to accommodate the electrode of the at least one viscoelastic conductive track, wherein the first viscoelastic insulate film and the second viscoelastic insulate film electrically insulate the at least one electrode, wherein the first viscoelastic insulate film and the second viscoelastic insulate film comprise a crosslinked polydimethylsiloxane (PDMS). In one embodiment, the crosslinked PDMS include a polydimethylsiloxane (PDMS) polymer backbone with a particular ratio of 4,4'-methylenebis(phenyl urea) (MPU) and isophorone bisurea (IU). In yet another embodiment, the PDMS polymer backbone is expressed as PDMS-MPU$_x$-IU$_{1-x}$, wherein the "x" represents the ratio of MPU and the "1-x" represents the ratio of IU.

In one embodiment, the viscoelastic electrode array further includes a first viscoelastic outer layer and a second viscoelastic outer layer; wherein the first viscoelastic outer layer is attached to the first viscoelastic insulate film and comprises at least one opening configured to accommodate the electrode of the at least one viscoelastic conductive track, wherein the second viscoelastic outer layer is attached to the second viscoelastic insulate film, and wherein the first viscoelastic outer layer, the first viscoelastic insulate film, the viscoelastic conductive track, the second viscoelastic insulate film, and the second viscoelastic outer layer is arranged in the following order, with the viscoelastic conductive track located innermost: the first viscoelastic outer layer-the first viscoelastic insulate film-the viscoelastic conductive track-the second viscoelastic insulate film-the second viscoelastic outer layer; wherein the first viscoelastic outer layer is covalently bonded with the first viscoelastic insulate film and the second viscoelastic outer layer is covalently bonded with the second viscoelastic insulate film; wherein the first viscoelastic outer layer and the second viscoelastic outer layer comprise an interpenetrating networks (IPN) hydrogel composition, comprising: a first polymer network and a second polymer network, wherein the first polymer network comprises a first polymer that is covalently crosslinked and the second polymer network comprises a second polymer that is ionically crosslinked; wherein the first polymer network comprises a polyacrylamide polymer crosslinked with N,N-methylenebisacrylamide (MBAA) and the second polymer network comprises an alginate polymer crosslinked with CaSO$_4$.

In one aspect, the present invention provides a viscoelastic encapsulation composition for encapsulating one or more electrodes. The viscoelastic encapsulation composition includes a viscoelastic insulate film; and a viscoelastic outer layer, wherein the viscoelastic insulate film comprises an elastomer material comprising a flexible polymer backbone;

wherein the viscoelastic outer layer comprise a viscoelastic composition; and wherein the viscoelastic insulate film is attached to the viscoelastic outer layer.

In one embodiment, the elastomer material comprises a self-healing elastomer. In another embodiment, the self-healing elastomer comprises crosslinked polydimethylsiloxane (PDMS). In still another embodiment, the self-healing elastomer include a polydimethylsiloxane (PDMS) polymer backbone with a particular ratio of 4,4'-methylenebis(phenyl urea) (MPU) and isophorone bisurea (IU). In yet another embodiment, the PDMS polymer is expressed as PDMS-MPU$_x$-IU$_{1-x}$, wherein the "x" represents the ratio of MPU and the "1-x" represents the ratio of IU.

In one embodiment, the viscoelastic composition of the viscoelastic outer layer comprises an interpenetrating networks (IPN) hydrogel composition, comprising a first polymer network and a second polymer network, and wherein the first polymer network comprises a first polymer that is covalently crosslinked and the second polymer network comprises a second polymer that is ionically crosslinked.

In another embodiment, the viscoelastic insulate film is covalently bonded to the viscoelastic outer layer.

In one aspect, the present invention provides a viscoelastic encapsulation composition for encapsulating one or more electrodes. The viscoelastic encapsulation composition includes a viscoelastic insulate film; and a viscoelastic outer layer, wherein the viscoelastic insulate film comprises a crosslinked polydimethylsiloxane; wherein the viscoelastic outer layer comprise an interpenetrating networks (IPN) hydrogel composition, comprising: a first polymer network and a second polymer network, wherein the first polymer network comprises a first polymer that is covalently crosslinked and the second polymer network comprises a second polymer that is ionically crosslinked; wherein the first polymer network comprises a polyacrylamide polymer crosslinked with N,N-methylenebisacrylamide (MBAA) and the second polymer network comprises an alginate polymer crosslinked with CaSO$_4$; and wherein the viscoelastic insulate film is attached to the viscoelastic outer layer. In one embodiment, the crosslinked PDMS include a polydimethylsiloxane (PDMS) polymer backbone with a particular ratio of 4,4'-methylenebis(phenyl urea) (MPU) and isophorone bisurea (IU). In yet another embodiment, the PDMS polymer backbone is expressed as PDMS-MPU$_x$-IU$_{1-x}$, wherein the "x" represents the ratio of MPU and the "1-x" represents the ratio of IU.

In another aspect, the present invention provides a method of making the viscoelastic encapsulation composition of any embodiment of various aspects of the invention. The method includes attaching the viscoelastic insulate film to the viscoelastic outer layer. In one embodiment, the viscoelastic insulate film is covalently bonded to the viscoelastic outer layer.

In still another aspect, the present invention provides a method of making an viscoelastic conductive composite. The method includes mixing a conductive filler and a viscoelastic conductive material. In one embodiment, the conductive filler is incorporated in the viscoelastic conductive material. In one embodiment, the viscoelastic conductive material is a crosslinked polymer; and the conductive filler is mixed with the polymer prior to the crosslinking; and the method further comprises crosslinking the polymer. In another embodiment, the crosslinking is an ionic crosslinking or a covalent crosslinking. In still another embodiment, the crosslinking is a cryogelation.

In one embodiment, the viscoelastic conductive material is a hydrogel. In another embodiment, the hydrogel is a cryogel.

In still another embodiment, the conductive filler comprises a material selected from the group consisting of a graphene flake, a carbon nanotube, and a combination thereof.

In yet another aspect, the present invention provides a method of making an viscoelastic conductive composite. The method includes mixing a conductive filler with a polymer comprising an alginate; and crosslinking the polymer wherein the conductive filler comprises a material selected from the group consisting of a graphene flake, a carbon nanotube, and a combination thereof; and wherein the crosslinking is a cryogelation.

In one aspect, the present invention provides a method of making an viscoelastic electrode array. The method includes attaching the at least one viscoelastic conductive track of any embodiment of various aspects of the invention to a first viscoelastic insulate film and a second viscoelastic insulate film, wherein the at lease on electric track is located between the first viscoelastic insulate film and the second viscoelastic insulate film, and wherein the first viscoelastic insulate film comprises at least one opening configured to accommodate the electrode of the at least one viscoelastic conductive track. In one embodiment, the first viscoelastic insulate film and the second viscoelastic insulate film comprise a crosslinked polydimethylsiloxane.

In another embodiment, the method further includes attaching the first viscoelastic insulate film to a first viscoelastic outer layer and the second viscoelastic insulate film to a second viscoelastic outer layer, wherein the first viscoelastic outer layer comprises at least one opening configured to accommodate the electrode of the at least one viscoelastic conductive track. In still another embodiment, the first viscoelastic insulate film is attached to the first viscoelastic outer layer via covalent bonding; and the second viscoelastic insulate film is attached to the second viscoelastic outer layer via covalent bonding.

In one aspect, the present invention comprising a method of detecting an electrical signal of a tissue. The method includes contacting the viscoelastic electrode array of any embodiment of various aspects of the invention with the tissue. In one embodiment, the tissue is selected from the group consisting of central nervous system tissue, peripheral nervous system tissue, cardiac tissue, musculoskeletal tissues and skin. In another embodiment, the tissue is selected from the group consisting of heart tissue, brain tissue, spinal cord tissue, peripheral nerve tissue, and skeletal muscle tissue.

BRIEF DESCRIPTION OF DRAWINGS

FIG. 1A is a schematic of an exemplary electrode array of the invention and its various components. The exemplary encapsulation layer is made from a stretchable hydrogel (blue) (exemplary outer layer) to which a viscoelastic electrically insulating polymer (pink) (exemplary viscoelastic insulate film) is covalently coupled. The exemplary viscoelastic conductive tracks (black) are fabricated from a microporous hydrogel with carbon additives (inset) (exemplary viscoelastic conductive material), and interface with a flexible connector (gold). As all the components of the exemplary electrode array are viscoelastic, the assembled array can be designed to match the modulus, and flow to conform to follow the tissue on which it is implanted to match the modulus, and flow to conform to follow the tissue on which it is implanted, whether it be brain (FIG. 1B), heart (FIG. 1C), or other soft tissues.

FIGS. 1B and 1C are schematics depicting the use of an exemplary electrode array according to the present invention on heart (FIG. 1B) or heart (FIG. 1C).

FIG. 2A includes graphs depicting the rheological properties of fresh lamb cortical tissue and fresh rat cardiac tissue. Storage moduli (G') (top), and loss moduli (G") (bottom) were shown as a function of strain (c), at a frequency of 1 Hz.

FIG. 2B includes graphs depicting the rheological properties of alginate hydrogels with varying levels of crosslinking agent indicated in the legend. Storage moduli (G') (top), and loss moduli (G") (bottom) were shown as a function of strain (c), at a frequency of 1 Hz.

FIG. 2C includes photographs of plastic (5 mm×15 mm×25 μm sheet of polyimide, left), elastomer (5 mm×15 mm×100 μm sheet of Ecoflex, center), and viscoelastic (5 mm×15 mm×250 μm sheet of alginate, right) substrates, with the thickness adjusted so that the bending stiffnesses were comparable. Substrates were coated with blue dye prior to application, and images (top) demonstrate the shapes taken by each material immediately following placement onto the agarose brain model. The brain models were subsequently imaged after removal of the substrates, and the dye transferred from each substrate to the tissue demonstrated regions of close contact.

FIG. 2D is a graph depicting quantification of the area on model brains to which dye was transferred for each material (plastic, elastic, viscoelastic), as a metric of direct contact between the substrates and the porcine brain model. Values are normalized to that of the viscoelastic alginate substrate. Values represent mean and s.d. (n=3).

FIG. 2E includes photographs of viscoelastic (alginate sheets, left: 5 mm×5 mm×200 μm, top; 5 mm×10 mm×200 μm) and elastic (Ecoflex sheets, right: 5 mm×5 mm×100 μm, top; 5 mm×10 mm×100 μm, bottom) substrates, both when present on the porcine brain model and immediately after removal. The two substrates had matched bending stiffness and were placed on the brain models for two weeks prior to removal and immediate imaging.

FIG. 2F includes photomicrographs of primary cortical astrocytes seeded on MVEG and LVEG of different stiffness, stained for live (green)/dead (red)/nuclei (blue). Scale bar is 1000 μm (left). The graph at the right depicts quantification of cytoplasm/nucleus ratio for each substrate. Values represent mean and s.d. *,**, indicate p<0.05, p<0.01, respectively, assessed by one-way ANOVA and Tukey's post hoc test (n=4/sample, 10 random fields/sample).

FIG. 2G includes photomicrographs of primary cortical astrocytes seeded on exemplary viscoelastic conductive materials of the invention, e.g., hydrogels of different viscoelasticity (more viscoelastic gels, MVEG; less viscoelastic gels, LVEG) and stiffness (soft, 1 kPa, and stiff, 8 kPa). Cells stained for GFAP (green)/nuclei (blue), scale bar 10 μm (top). The graph at the bottom panel depicts quantification of % cells positive for GFAP on each substrate (bottom). Values represent mean and s.d. , * indicate p<0.01, p<0.001, respectively, assessed by one-way ANOVA and Tukey's post hoc test (n=4/sample, 14 random fields/sample).

FIG. 2H includes photomicrographs of primary cortical neurons seeded on alginate-Matrigel interpenetrating networks of different viscoelasticity (MVEG, LVEG)) and stiffness (soft, 1 kPa, and stiff, 8 kPa), after 72 hours. Cell bodies and neurites are falsely colored blue to provide better contrast from the underlying gel. Scale bar, 400 μm (top). The graph at the bottom panel depicts quantification of the number of neurites in a 0.8 mm² area (bottom). Values represent mean and s.d. *, *** indicate p<0.05, p<0.001, respectively, assessed by one-way ANOVA and Tukey's post hoc test (n=4/sample, 5 random fields/sample).

FIG. 4 is a graph depicting mechanical properties of agarose at 0.5%. Rheological characterization of gels composed of 0.5% weight/volume agarose (red) dissolved in deionized water, showing G' (individual points) and G" (connected by a line). Agarose gels were the same dimension as the tissue samples that were characterized and measured at the same conditions. Lamb cortex (blue) was shown as a comparison. Mean and standard deviation shown, with n=6 for each condition.

FIG. 5 includes images depicting substrates made from exemplary viscoelastic conductive materials of the invention, e.g., alginate hydrogel, and elastic substrates, on a mock agarose brain, for two weeks on an orbital shaker. Substrates made from viscoelastic alginate (clear) and elastic Ecoflex (yellow), were placed onto a mock agarose porcine brain and outlined with a blue hydrophobic dye. The mock brains were imaged before they were left on an orbital shaker for 2 weeks (left), to mimic micromotion of the brain, and immediately after they were removed from the orbital shaker (right). The alginate substrate remained in place and conformed to the mock tissue, whereas the Ecoflex had delaminated from the mock brain surface and slid around (observed by the thick blue dye accumulated at the center of the Ecoflex film).

FIG. 6A depicts that, immediately after being removed from the mock agarose brain, the alginate (yellow) substrates have plastically deformed to conform to the surface of the brain.

FIG. 6B depicts that, one hour later, after sitting on a flat surface, the alginate has flowed to restore its original 2D-shape. The Ecoflex film remains its original 2D shape in both cases, as it is unable to flow and conform.

FIG. 7 is a graph depicting viscoelastic properties of exemplary viscoelastic conductive materials of the invention, high-molecular weight, low-molecular weight alginate hydrogels. Alginate hydrogels with different concentrations of crosslinker (soft, stiff gels), and with different molecular weights (higher molecular weight, lower molecular weight), were analyzed to determine the degree of viscoelasticity ($\tan(\delta)$) for the gels. Values represent mean and s.d.; n.s., and *** indicate non-significant, and $p<0.001$, respectively.

FIG. 8A-8D are images and graphs depicting fabrication of highly flexible and stretchable viscoelastic encapsulation layers of exemplary electrode array of the invention.

FIG. 8A is a schematic of the two individual components that comprise the encapsulation layers, comprising an exemplary outer layer and an exemplary viscoelastic insulate film of the exemplary electrode array. An exemplary outer layer of the invention, stretchable tough gel based on alginate, TG (purple), was covalently coupled to an exemplary insulate film of the invention, self-healing, PDMS-based, physically entangled viscoelastic conductive material, PEVM (pink), via carbodiimide chemistry.

FIG. 8B includes photographs of the composite encapsulation layer stretched under tension to 0, 500 and 1000% of the original length. The PEVM (pink) can be observed to begin to fracture at the greatest strain, while the TG (clear) remained intact. Scale bar represents 5 mm.

FIG. 8C is a graph depicting quantification of the stress ($\sigma$) vs elongation ($\lambda$) behavior until the first point of film fracture. Representative curve was shown for each encapsulation layer tested: PEVM-only, TG-only, and PEVM-TG (left). The elastic modulus for each material was extracted from the linear regime. Values represent mean (n=3) and s.d. (right, inset).

FIG. 8D includes photographs of the encapsulation layer following cutting with a $CO_2$ laser (left), bright field microphotograph (right, top) and scanning electron microscopy view (right, bottom) of the cut after exposure to the laser. Scale bar represents 10 mm (left), 1 mm (right, top) and 100 μm (right, bottom).

FIGS. 11A-11P are images and graphs depicting that the exemplary viscoelastic conductive tracks of the invention formed from a matrix of ionically conductive alginate hydrogel and electrically active carbon-based fillers (exemplary viscoelastic conductive composite of the invention), are viscoelastic and can be extruded.

FIG. 11A is a schematic showing the fabrication of nanoporous conductive gel (NCG) and microporous conductive gels (MCG), two exemplary viscoelastic conductive material of the invention. An alginate solution, graphene flakes (GF), and/or carbon nanotubes (CNT) were mixed, and (i). immediately crosslinked to create nanoporous gels (pore diameter ~10 s nm). When the mixed solution was frozen and lyophilized, a (ii) MCG was formed (pore diameter ~100 s μm), with a higher density of carbon additives in the gel walls.

FIG. 11B includes photographs demonstrating casting of the tracks in a flexible mold (left), and their ability of cast tracks to follow the vasculature of a fresh lamb brain (right). Scale bars represent 10 mm.

FIG. 11C includes scanning electron microscope (SEM) photomicrographs comparing NCG (top row), and MCG (middle row), with no additives, GF-only, CNT-only, and GF+CNT. Higher magnification of MCG (bottom row). Red arrows point to CNT, and * regions indicate regions containing GF. Scale bars represent 100 um (top row), 50 μm (middle row), and 5 um (bottom row).

FIGS. 11D-11F are graphs depicting quantification of the conductivity (S/m) of NCG (blue) and MCG (red), comparing the behavior of GF-only, CNT-only, and GF+CNT compositions at increasing concentrations of carbon. **** indicates $p<0.0001$, assessed by assessed by one-way ANOVA and Tukey's post hoc test, mean (n=38) and s.d (error bars) shown in black.

FIG. 11G is a graph depicting quantification of conductivity as a function of total carbon (GF+CNT) compositions, fit with a sigmoidal curve ($R^2=0.89$).

FIG. 11H is a graph depicting graphical evaluation of the relative contribution of GF (x-axis) and CNT (y-axis) on the conductivity of cryogels. Resulting gel conductivity shown by color, ranging from low (blue) to high (red), as indicated in legend. Each small solid circle represents an independent gel measurement, and the coloration of the groupings of solid circles represents mean conductivity (n=20-30).

FIGS. 11I and 11J are graphs depicting quantification of the storage modulus (G') (I) and loss modulus (G") (J) of GF+CNT MCG using nanoindentation. Values represent mean (n=10) and s.d. (error bars). No differences between conditions were statistically significant (Tukey's HSD post hoc test).

FIGS. 11K-11M are graphs depicting that viscoelastic microporous conductive hydrogels (exemplary viscoelastic conductive materials of the invention) described have a viscoelastic nature, which is characterized by their ratio of loss to storage modulus, G"/G', which is defined as $\tan(\delta)$. If carbon additives are added, such as carbon nanotubes (CNT) or graphene flakes (GF), the conductive gels retain their viscoelastic nature from a carbon loading of 0 to 2% (FIG. 11K). When metal microparticles, such as those from tungsten, are added to the viscoelastic alginate matrix, the conductive gels retain their viscoelastic nature from 0 to 66.7% weight-tungsten loaded, both when the gels are frozen at −20° C. (FIG. 11L), and when the gels are frozen at −80° C. (FIG. 11M).

FIGS. 11N-11P are images depicting the microstructure of viscoelastic microporous conductive hydrogels (exemplary viscoelastic conductive materials of the invention). These structural images taken by a scanning electron microscope (SEM) are shown. The 3 different hydrogels described in FIGS. 11K-11M are compared. The dimensions of the pores are thus shown.

FIG. 11N is an image of a viscoelastic microporous conductive hydrogel that is loaded with carbon materials (exemplary conductive filler) of higher aspect ratio.

FIGS. 11O and 11P are images of viscoelastic microporous conductive hydrogels that are loaded with tungsten-microparticle (exemplary conductive filler) at the same loading amount, where the hydrogel in FIG. 11O is frozen at −20° C. and (c) at −80° C. More pores can be seen when freezing at −80° C. The size of pores is smaller when freezing at −80° C.

The comparison between hydrogels loaded with carbon materials of higher aspect ratios (FIG. 11N) and tungsten microparticles (FIGS. 11O and 11P) is also visible.

Figure 11L:
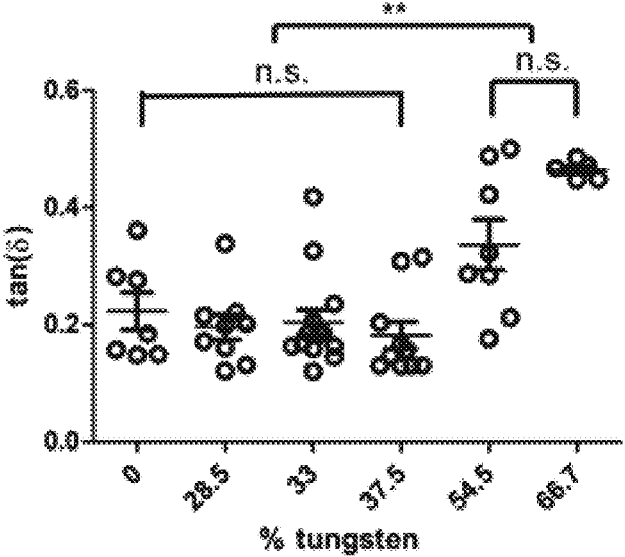
Figure 11M:
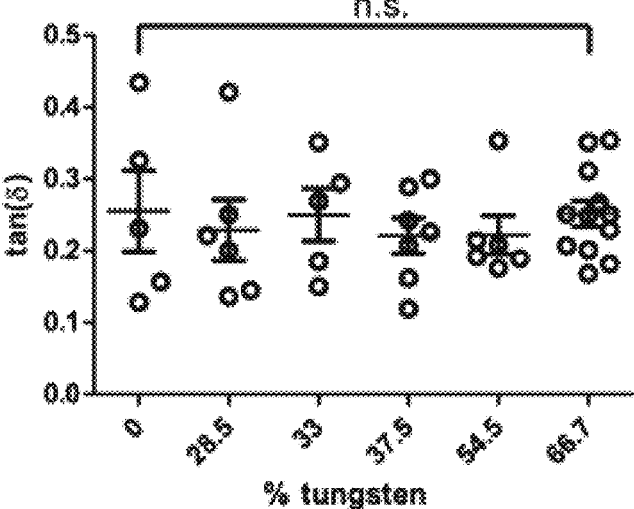
Figure 11N:
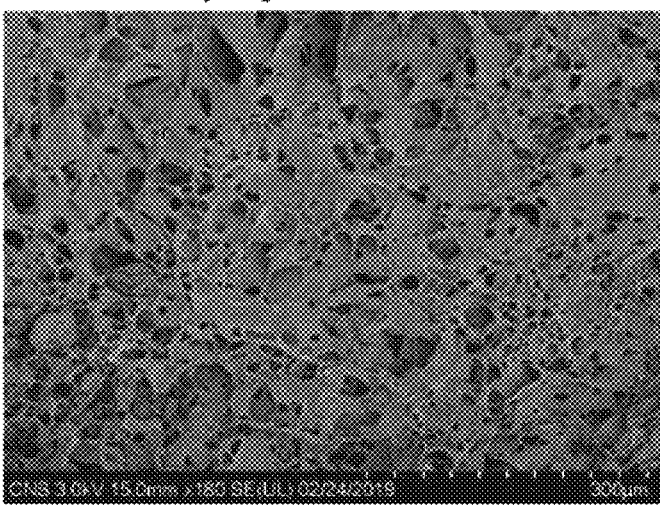
Figure 11O:
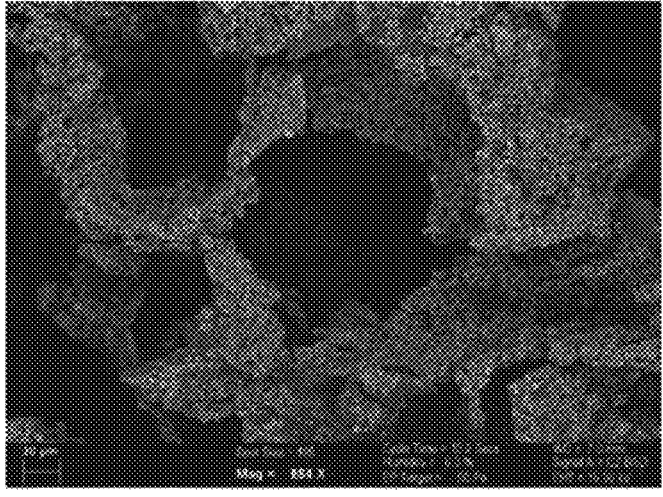
Figure 11P:
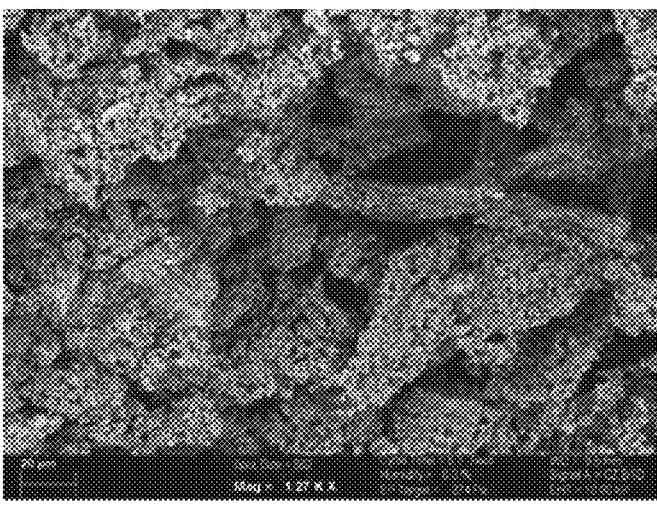
Figure 11Q:
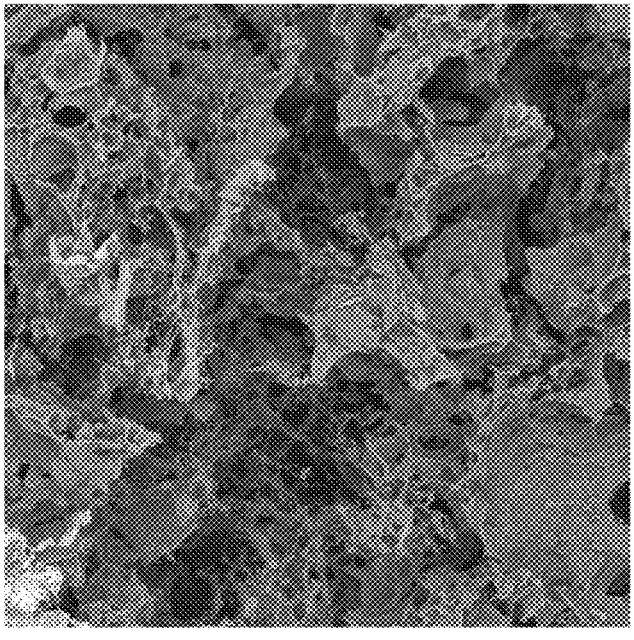
Figure 11R:
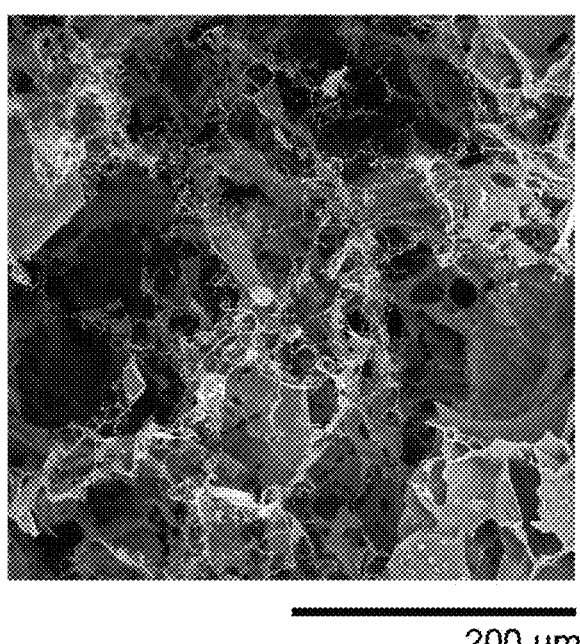

FIGS. 11Q and 11R are images of viscoelastic microporous conductive hydrogels (exemplary viscoelastic conductive materials) that are loaded with graphene flakes and carbon nanotube (exemplary conductive filler). The microporous hydrogels in FIGS. 11Q and 11R are click-cryogels.

Figure 12:
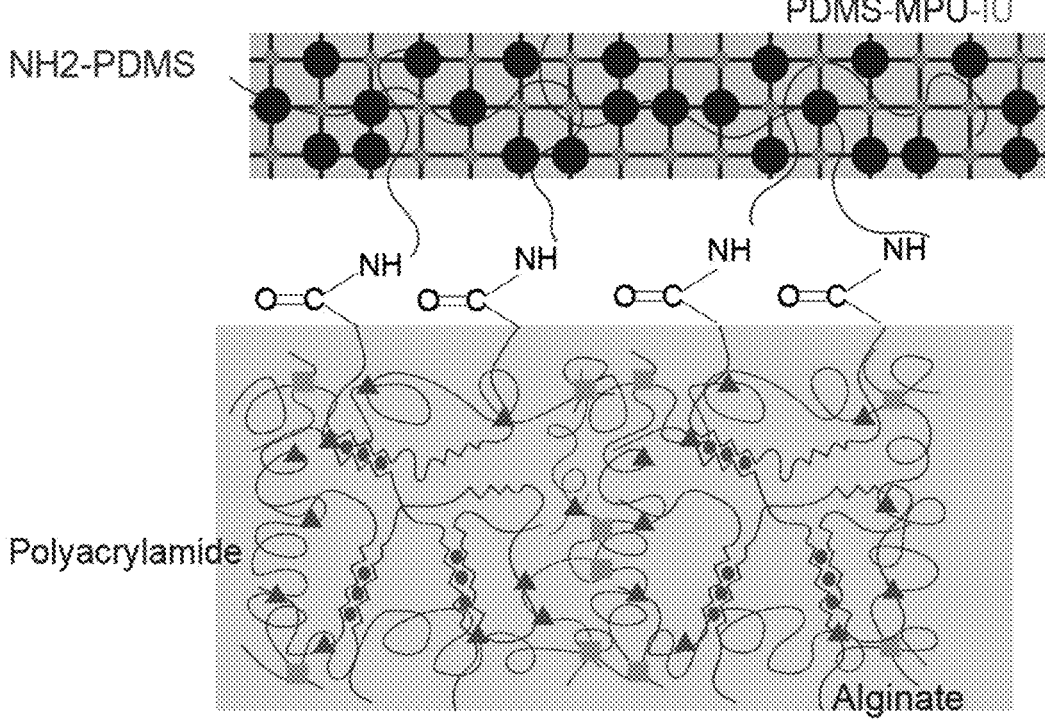

FIG. 12 is a schematic showing chemical composition of electrically insulating exemplary encapsulation bilayer. The two layers that compose the exemplary encapsulation bilayer are a layer of tough gel, made of a polyacrylamide (dark grey chains)-alginate (light purple chains) interpenetrating network (bottom, purple region) (, and a self-healing polydimethylsiloxane with interpenetrating amine-terminated polydimethylsiloxane (top, pink). Carbodiimide chemistry covalently crosslinks these two layers.

Figures 13A, 13B:
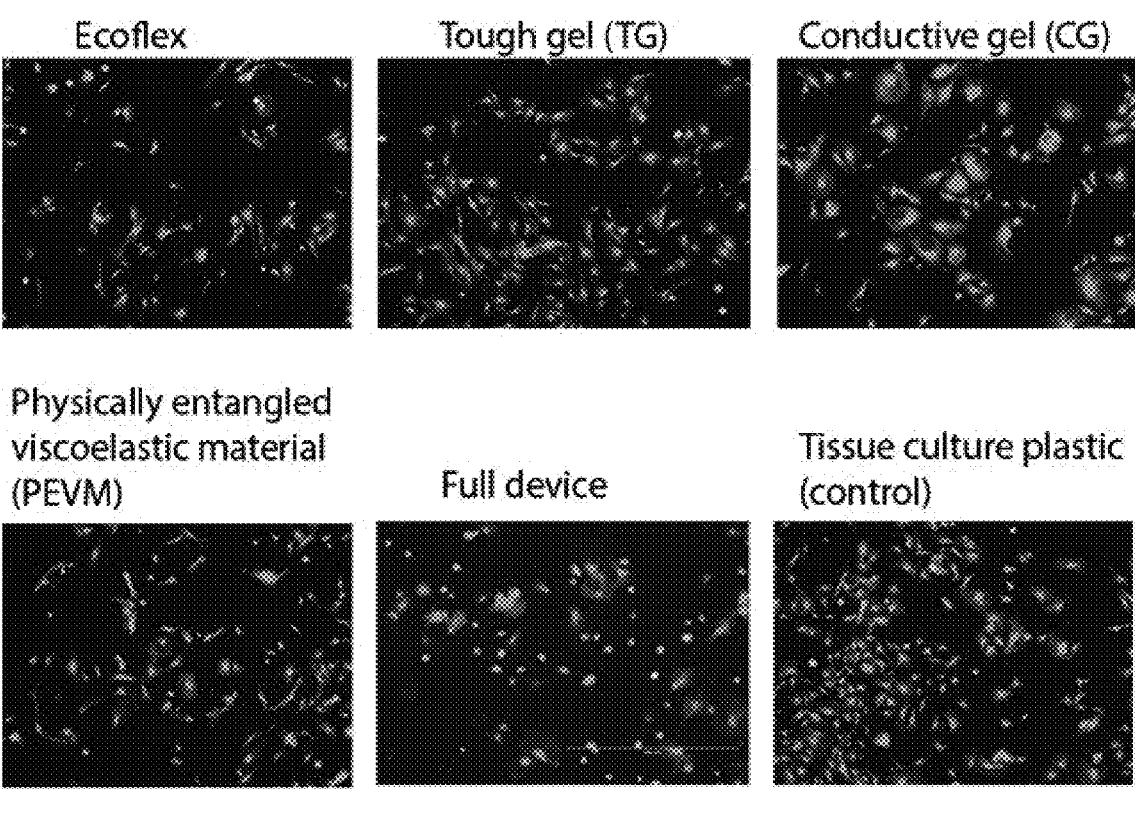

FIGS. 13A and 13B are images and a graph depicting cell viability with various exemplary materials of the invention.

FIG. 13A include photographs of primary rat astrocytes, seeded on tissue culture plastic, with various materials added to each well and then stained for live (green, calcein-AM)/dead (red, ethidium homodimer-1).

FIG. 13B is a graph depicting the quantification of the viability of cells co-cultured with each material. Cells quantified over n=10 random field images, mean and standard deviation are plotted.

Figure 14:
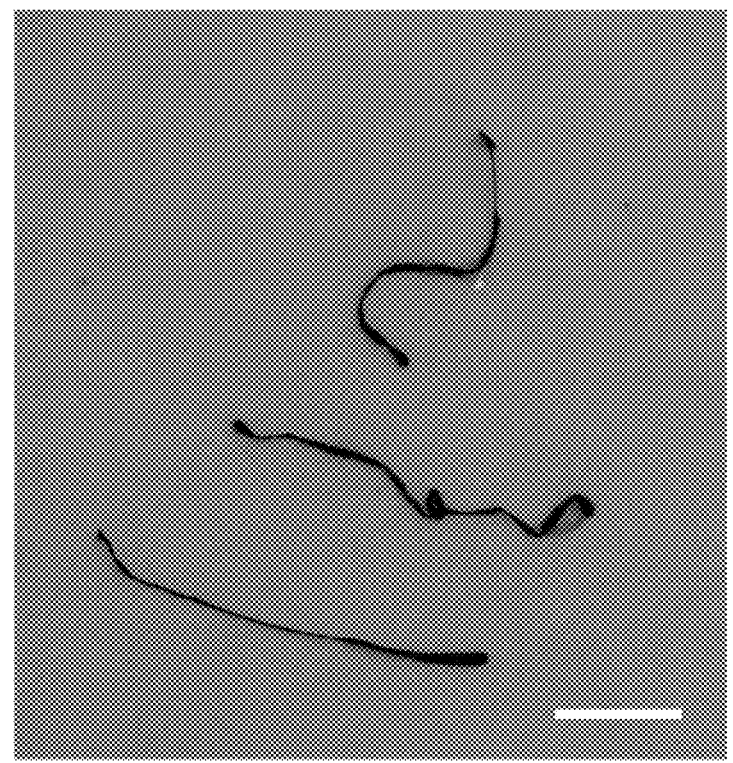

FIG. 14 is an image depicting free-standing exemplary viscoelastic conductive tracks of the invention. FIG. 14 is a photograph of the exemplary viscoelastic conductive tracks removed from the mold. The track can be easily handled to be curled into an S shape (top), and a knot can even be tied (middle) without fracture or any damage the material. Scale bar: 5 mm.

Figure 15:
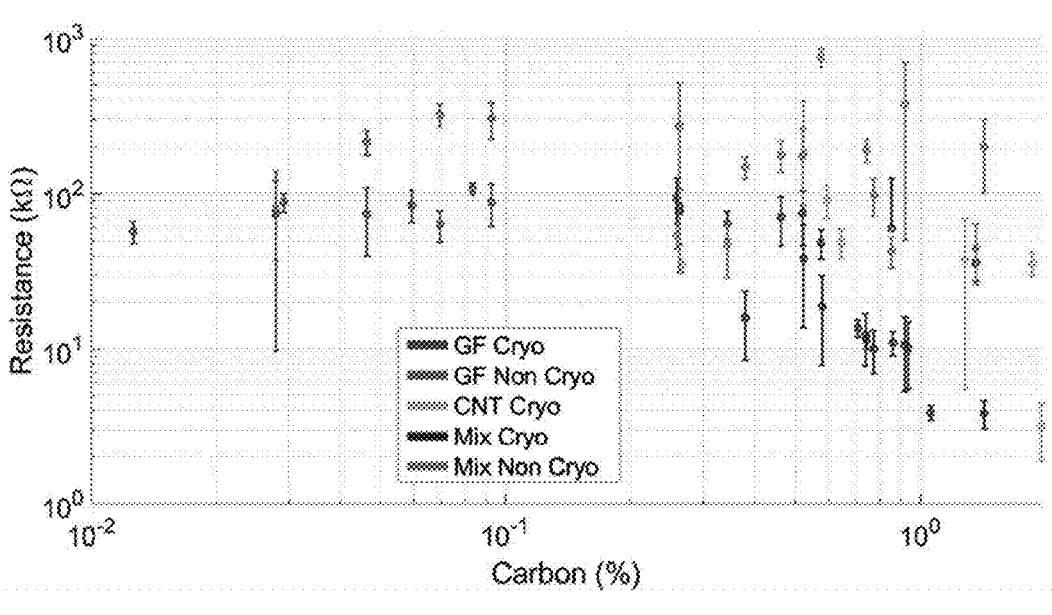

FIG. 15 is a graph depicting the resistance data of exemplary viscoelastic conductive composite of the invention. The graph depicts electrical resistance characterization of microporous conductive gels (exemplary viscoelastic conductive composite of the invention), where an alginate matrix has either graphene flakes (GF, blue), carbon nanotubes (CNT, yellow), or both (mix, purple). The same compositions of the GF and the mix, with nanopores (red, green respectively), are plotted as well. Each gel was the same dimension: 15 mm×500 µm×200 µm.

Figure 16:
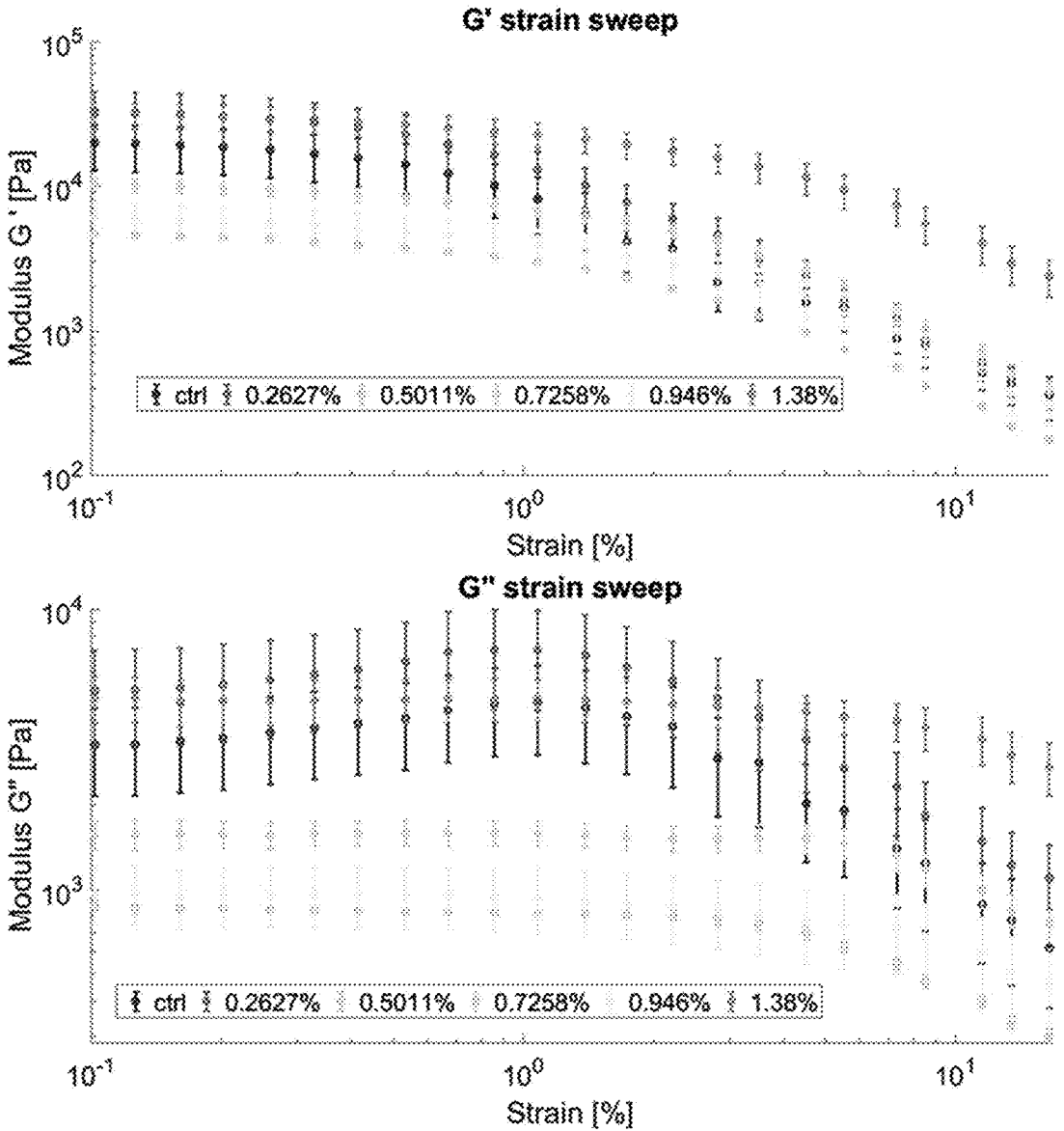

FIG. 16 includes graphs depicting mechanical properties of conductive hydrogels (exemplary viscoelastic conductive composite of the invention). Alginate microporous conductive hydrogels with carbon nanotubes and graphene flakes, at various total carbon concentrations ranging from 0% (control) to 1.4% weight-percentage, are mechanically characterized with a rheometer to evaluate the G' (top) and G" (bottom) at 1 Hz. The amount of carbon added has no significant impact on either mechanical property.

FIG. 17 includes schematics depicting process flow of device fabrication.

FIGS. 18A-18K are images and graphs depicting exemplary viscoelastic electrode array characterization and in vivo validation of the fully viscoelastic device on mouse heart and on rat cortex.

Figure 18A:
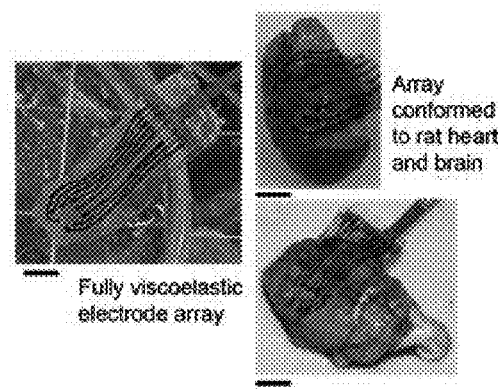

FIG. 18A is a photograph of the fully assembled exemplary viscoelastic electrode array, 6 mm×20 mm×250 µm, with 8 electrodes with d=700 µm with a 1.5 mm pitch (left, scale bar: 3 mm), and in contact with a fresh rat heart (right, top, scale bar: 2 mm) and rat brain (right, bottom, scale bar: 3 mm).

Figure 18B:
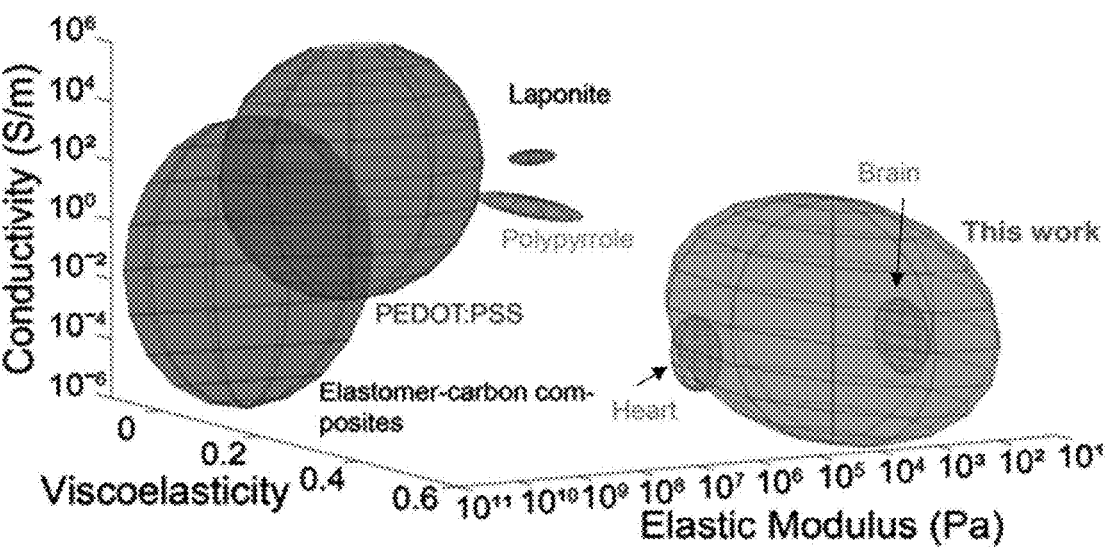

FIG. 18B is a graph depicting quantification of the elastic modulus (Pascals), conductivity (S/m), and viscoelasticity (tan(δ)), of various tissues and exemplary viscoelastic conductive composition of the invention. Rat heart and brain represent the targeted physiologic stiffness and viscoelasticity. The alginate-based conductors (exemplary viscoelastic conductive composite) fabricated in this study are shown. Values for other conductive composites reported in the literature are also represented, using the reported ranges for each variable. The values in the illustration taken from the literature are shown in Table 2.

Figure 18C:
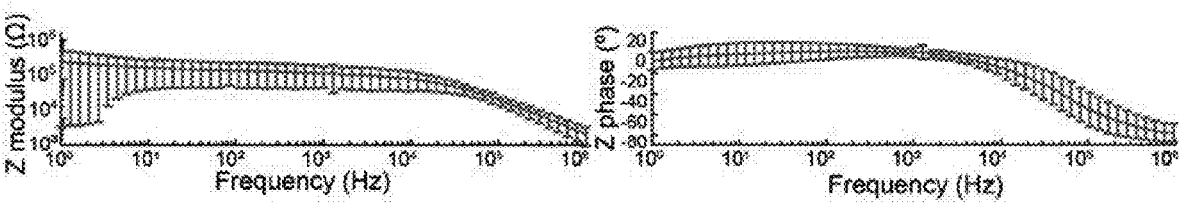

FIG. 18C include graphs depicting electrical impedance spectroscopy (EIS) data of five exemplary viscoelastic electrode arrays, from five distinct batches, measured in PBS showing the impedance modulus (left) and impedance phase (right) over a frequency sweep from 1 MHz to 1 Hz. Mean and s.d. of each device plotted, over all 40 of the electrodes.

Figure 18D:
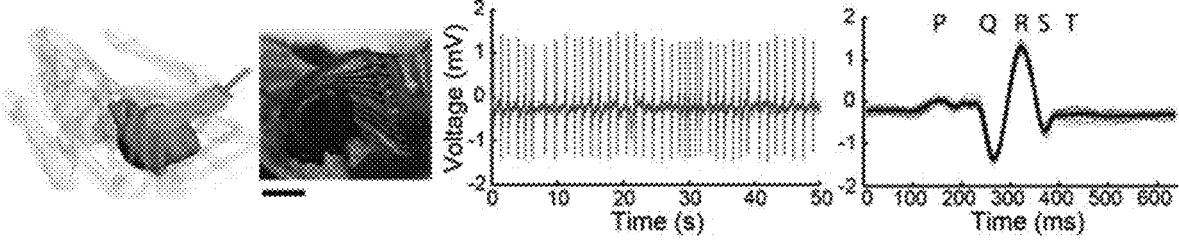

FIG. 18D includes schematic, photograph and graphs depicting an exemplary viscoelastic electrode array. The photograph depicts that the exemplary electrode array conformed to the surface of a mouse heart (second from the left, scale bar: 3 mm). Acute electrical activity recorded in vivo from the mouse heart with three electrodes, with the filtered electrocardiogram (EKG) (right, top), and superimposed average (black) of all the beats (right, bottom). Individual cycles are shown in light blue.

Figure 18E:
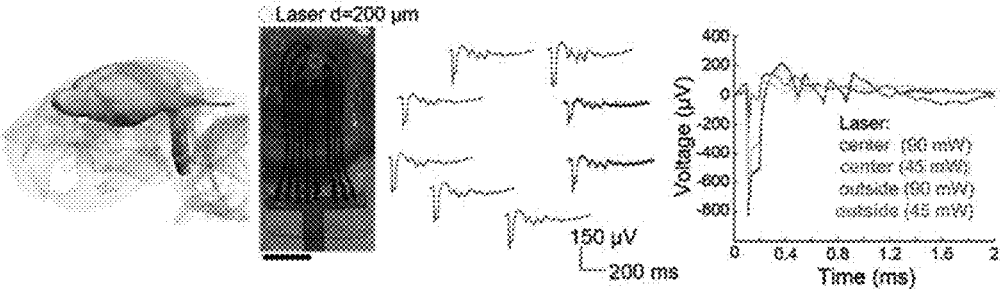

FIG. 18E includes schematic, photograph and graphs depicting an exemplary viscoelastic electrode array. The photograph depicts the exemplary viscoelastic electrode array on top of the exposed dura of a Thy1 rat cortex (left, scale bar: 4 mm), with added circles to show where stimulation from a laser was applied (either at the blue circle: center of device, or brown circle: lateral edge of device). Acute electrical activity recorded in vivo, epidurally from the cortical surface after stimulation by blue light laser. Each electrode depolarization is shown by each respective electrode tracing, as the average and standard deviation over the recording session (top, right). Comparison of the electrical activity recorded by a single channel as the laser position changed from the center of the device (blue curves) to the lateral edge, and as the laser power changed from 90 mW (dark blue and brown traces) to 45 mW (light blue and brown traces).

Figure 18F:
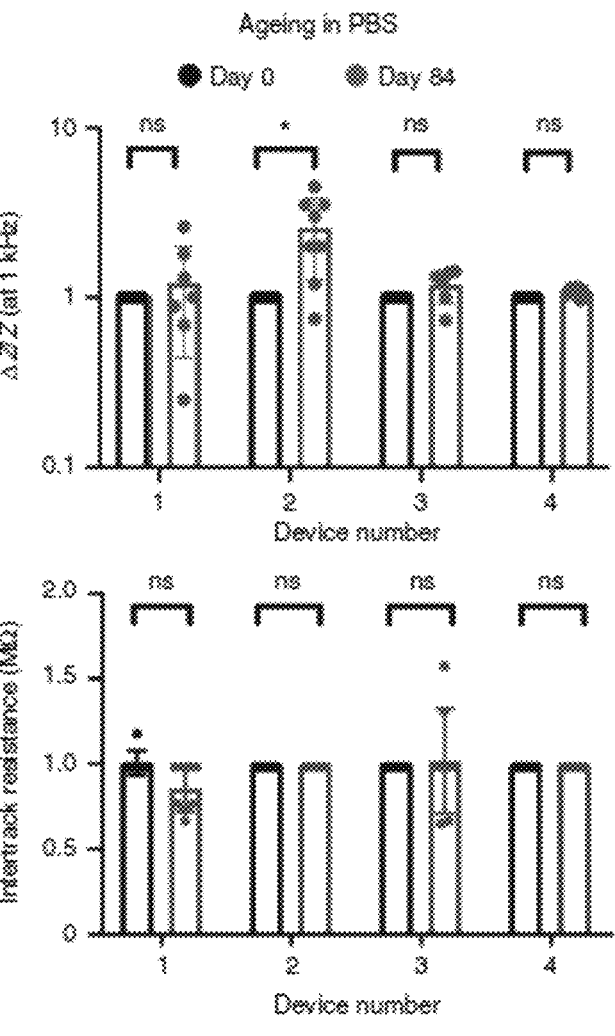

FIG. 18F are graphs depicting comparison of the electrode impedance of four arrays at 1 kHz before and after ageing in PBS for 84 days (top). The impedance for each electrode is normalized to the impedance value before ageing. Intertrack resistance between adjacent electrodes, plotted before and after ageing in PBS (n=4 independent devices; bottom). The numerical data are presented as mean±s.d. (one-way ANOVA and Tukey's HSD post hoc test; *P<0.05 (P=0.02), n.s. P>0.05.

Figure 18G:
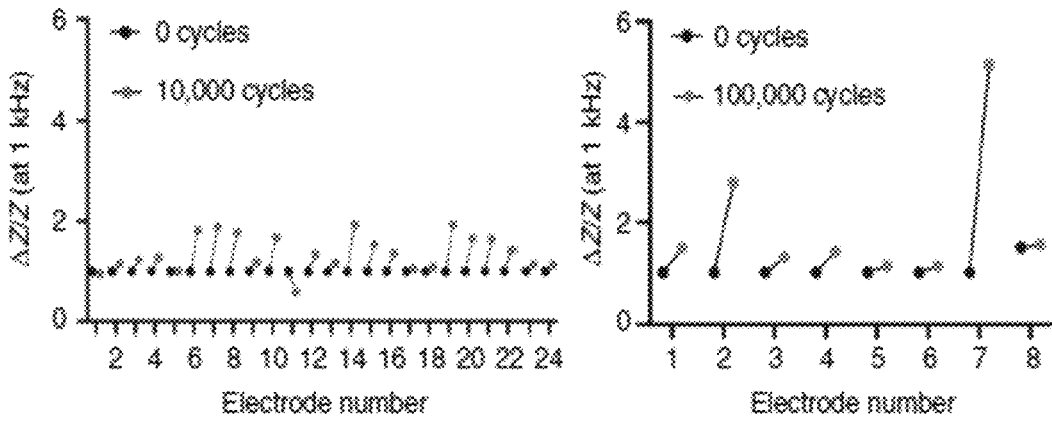

FIG. 18G are graphs depicting multiaxial mechanical cycling of the viscoelastic arrays, at 11%-equivalent biaxial strain, with the relative change in impedance (AZ/Z) at 1 kHz plotted for each electrode. Three devices were cycled 10,000 times (left) and one device was cycled 100,000 times (right).

Figure 18H:
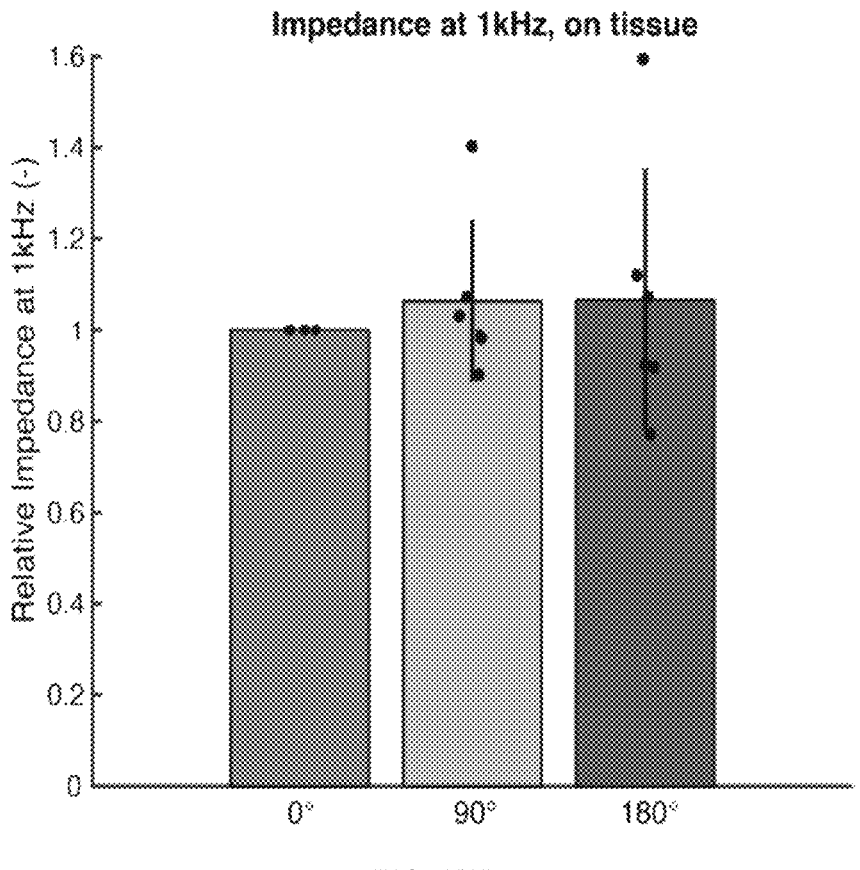

FIG. 18H are graphs depicting impedance at 1 kHz of viscoelastic array bent at various angles on a rat brain. Electrodes from a viscoelastic array were put in contact with a fresh rat brain, and the impedance recorded. The device and tracks were bent 0, 90 and 180° and the relative change in impedance was noted. Mean and s.d. plotted, with n=6 independent devices and tracks placed and impedance measured on the rat heart, n.s. differences between the different angles compared.

Figure 18I:
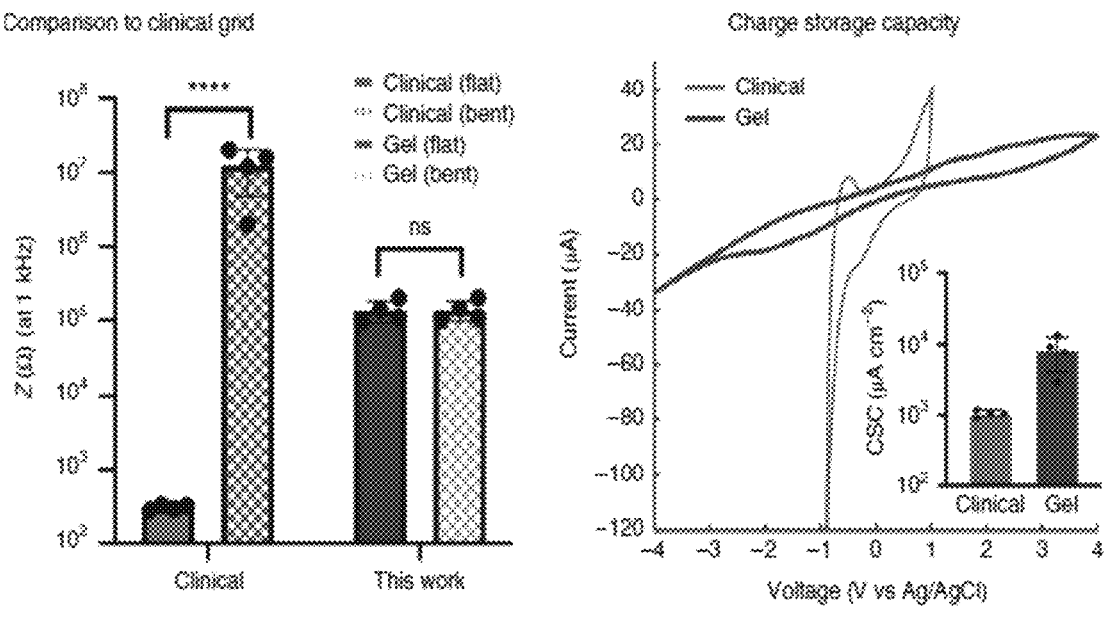

FIG. 18I are graphs depicting cyclic voltammetry of an electrode from a commercial grid and from the viscoelastic array developed in the present disclosure. Inset: the bar graph shows the CSC extracted from each electrode (n=4 per device) and compared for four electrodes from each array. The mean and s.d. of each electrode are plotted.

Figure 18J:
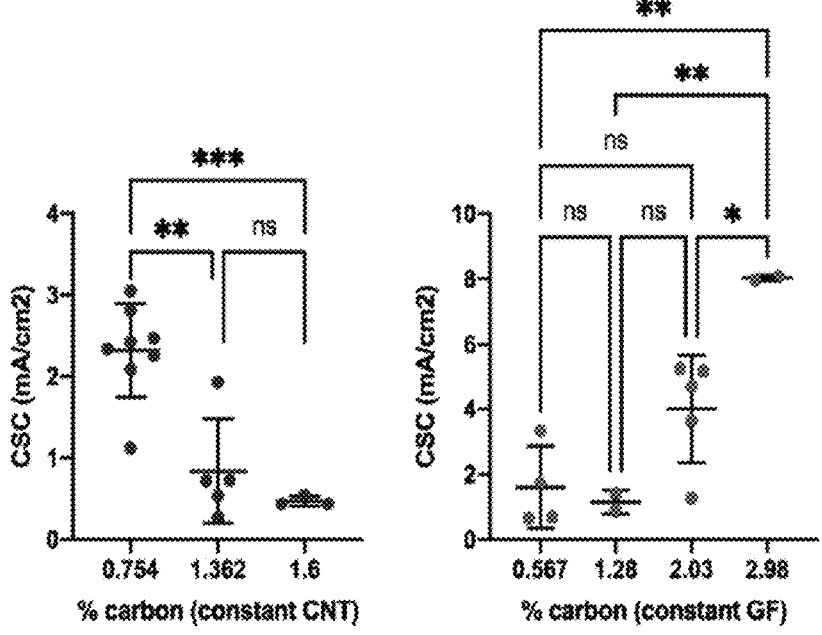

FIG. 18J are graphs depicting charge storage capacity is affected by the amount of GF and/or CNT added. By changing the relative concentration of GF (left: constant CNT, changing amounts of GF) or CNT (right: constant GF, changing mounts of CNT), the charge storage capacity (CSC) of a device can be tuned. At least 3 electrodes in each device are measured. Numerical data are presented as mean±s.d. (one-way ANOVA and Tukey's HSD post hoc test, *p<0.001, p<0.01, *p<0.05, and non-significant, n.s., p>0.05), with n=4-8 independent tracks measured per condition, [left graph] p()=0.0011, p(*)=0.0007 [right graph], p(**)=0.0016, 0.0027, p(*)=0.0238.

Figure 18K:
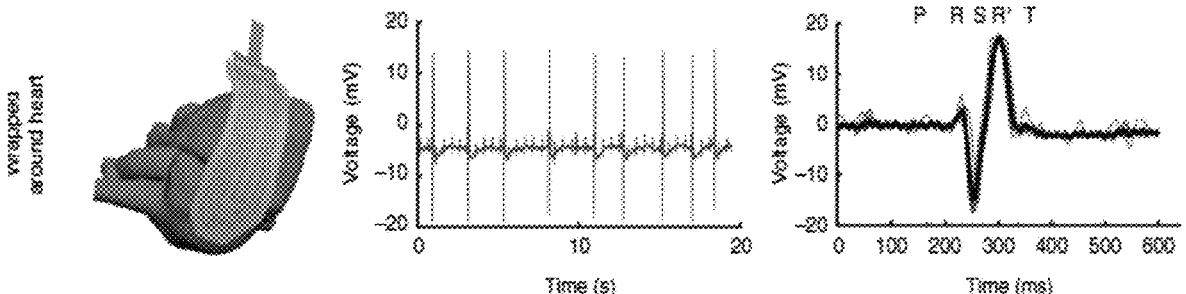

FIG. 18K includes schematic, photograph and graphs depicting an exemplary viscoelastic electrode array. The photograph depicts that the exemplary viscoelastic electrode array was wrapped almost 360° around the surface of a mouse heart and remaining conformed (left). Acute electrical activity recorded in vivo from the mouse heart with three electrodes, showing the filtered ECG (middle) and superimposed average (black) of all the beats (right). Individual cycles are shown in light blue.

Figure 19:
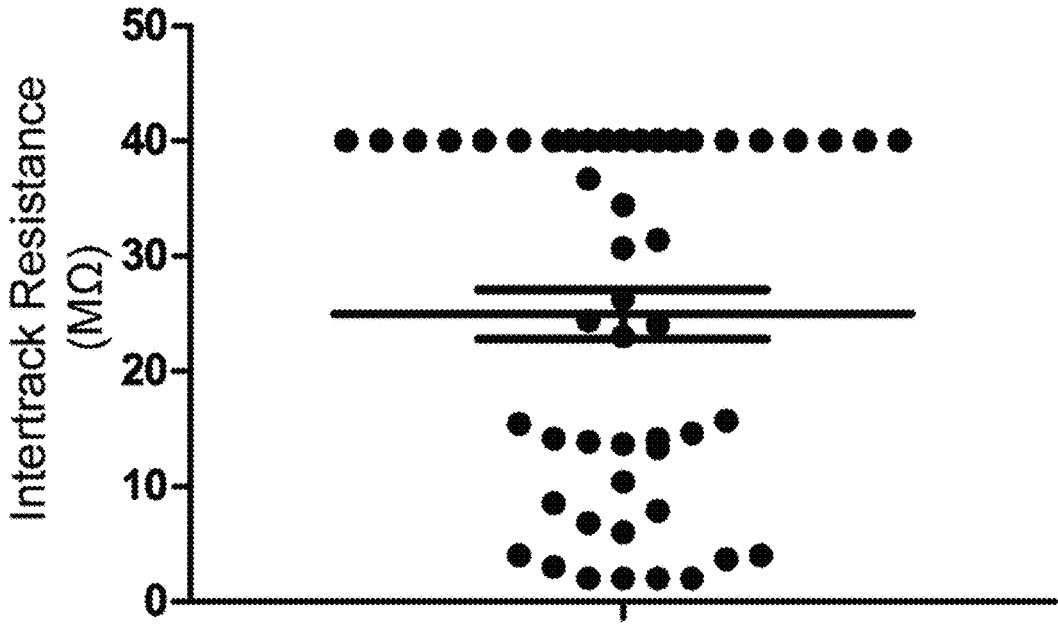

FIG. 19 is a graph depicting intertrack resistance of exemplary viscoelastic electrode arrays. Resistance measurements between adjacent tracks were taken. The intertrack resistance ranged from 2-40 MΩ. Plotted are the resistance values over five viscoelastic electrode arrays. In all cases, the intertrack resistance was more than 10 times greater than the electrical impedance of any track on the device.

Figure 20:
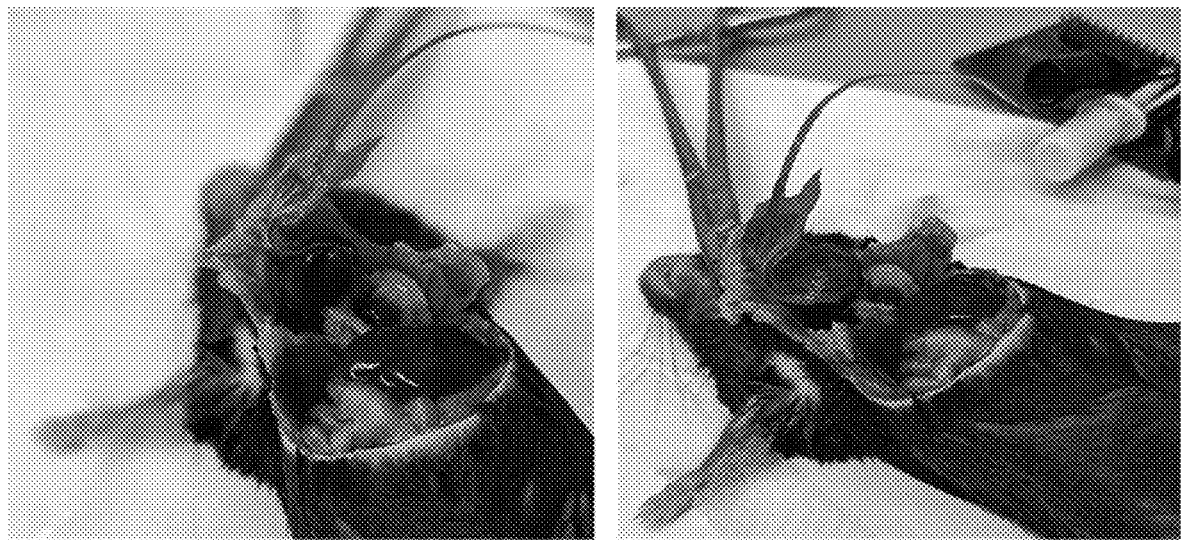

FIG. 20 includes images depicting in vivo positioning of the exemplary viscoelastic electrode array on the mouse cardiac surface. Photographs were taken to show the experimental setup of the EKG with the mouse open heart surgery (left) and the device placed on the exposed epicardial surface (right). The array can be bent more than 180 degrees without losing functionality or failing mechanically.

Figure 21:
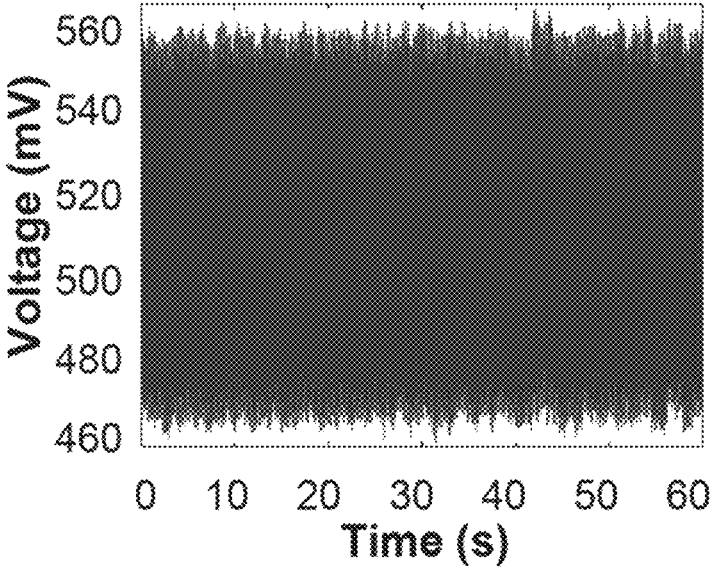

FIG. 21 is a graph depicting recording with the EKG set-up of the mouse liver. Voltage-time plot of the electrical signal was measured from the liver, using the EKG setup used to record from the heart, to validate that the signals from the heart. No EKG signal was recorded from liver. The absence of electrical recording from the liver validates the signals from the heart are related to the cardiac tissue.

FIG. 22 includes images depicting in vivo positioning of the exemplary viscoelastic electrode array on the rat cortical surface. Photographs were taken to show the device placed on the exposed cortical surface (top), with the laser shining (middle) to stimulate the cortex, and the conformable nature of the array (bottom).

Figure 23:
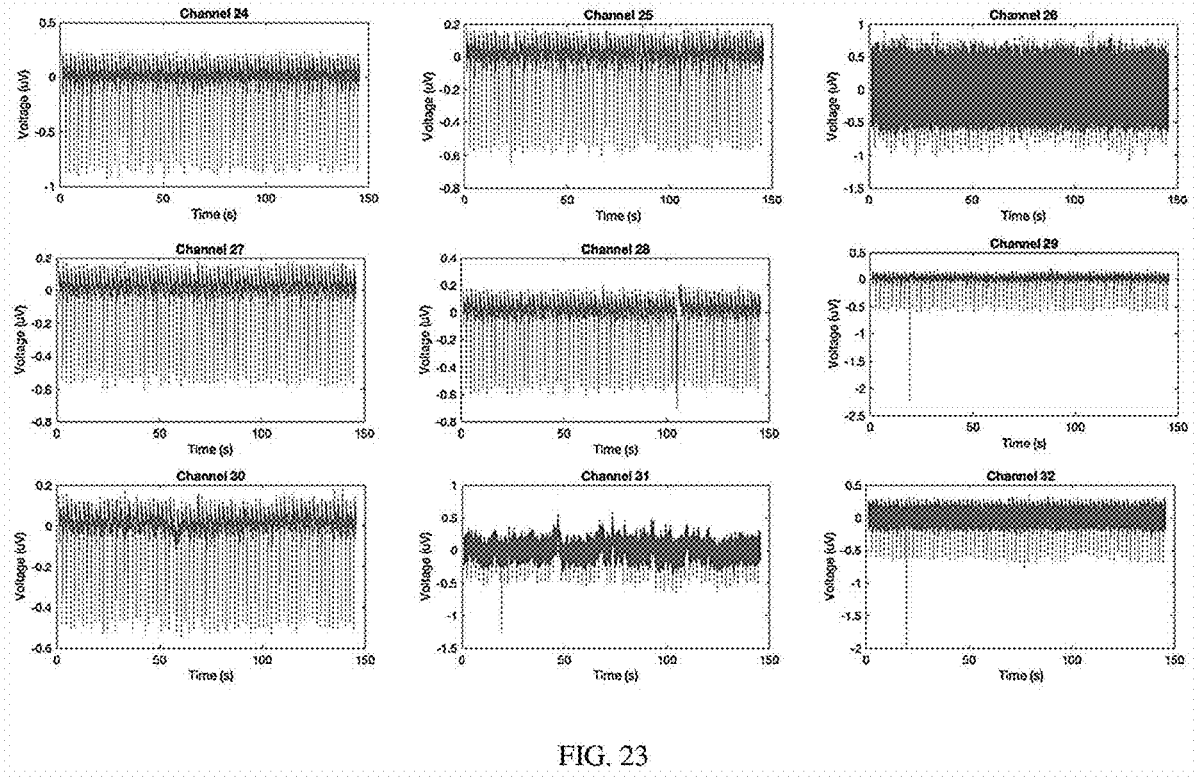

FIG. 23 includes graphs depicting raw signals (before filtered) from the neural setup. Channel 26 was not connected (it corresponded to the center position of the 3×3 grid).

FIG. 24 includes graphs depicting pulse duration change, and laser power intensity adjustment, on recorded neural signals. Pulse duration of 5 ms (top), and 10 ms (bottom), with varying intensity powers of the laser (black: 90 mW, grey: 70 mW, light grey: 50 mW), were compared. In both cases the laser was directed to the center of the device. Plotted is the averaged signal over the 2 minute recording session, and all traces are compared from the same electrode on the same device.

Figure 25:
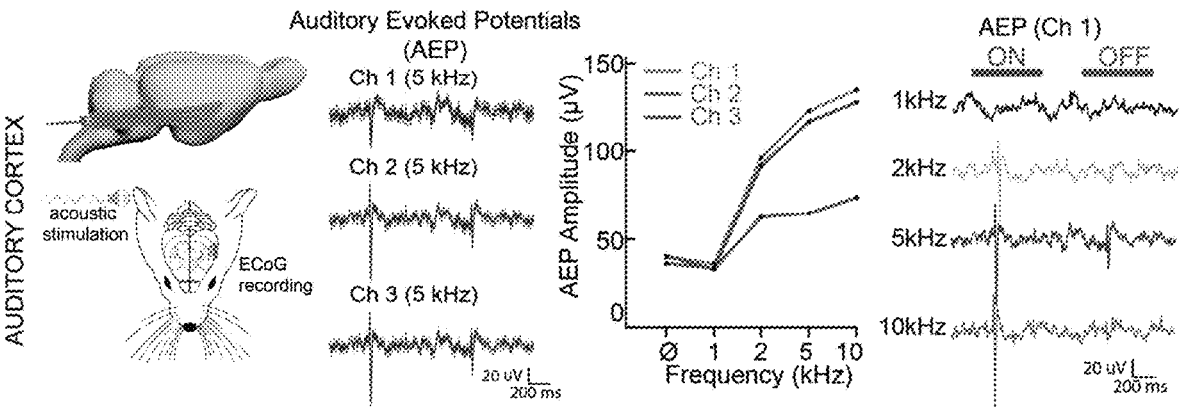

FIG. 25 includes a schematic view of the viscoelastic array, bent by more than 90° to reach the auditory cortex of a rat brain (top, far left). Schematic of the set-up for recording from the auditory cortex (bottom, far left). ECoG, electrocorticogram. Acute electrical activity recorded in vivo, epidurally from the auditory cortical surface from each of the three electrodes (Ch) of the array when an acoustic tone of 5 kHz was applied (left). In addition to recording AEPs from each channel, an independent frequency tuning profile of each channel was obtained (right). Tone burst stimulation (duration of 1 s) was performed, and the AEPs from Ch 1 were recorded for four applied acoustic tones (1, 2, 5 and 10 kHz; far right). 'ON' and 'OFF' of the tone burst are indicated above the AEP traces.

Figure 26:
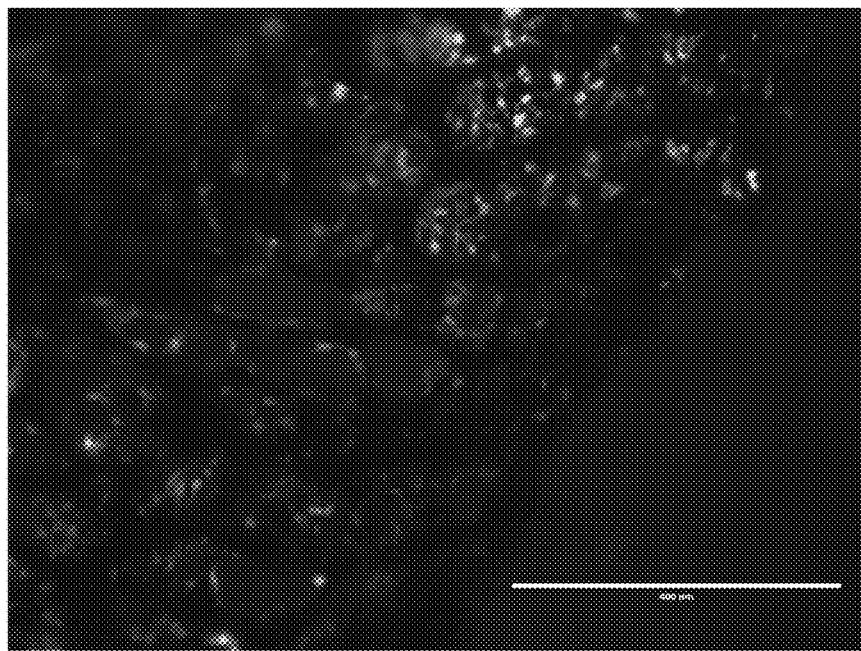

FIG. 26 is an image of an exemplary conductive viscoelastic composite of the present disclosure (in black-forming a porous structure) with D1 MSC (mesenchymal stem cells), in green. The image shows that gels had a 100% cell viability. Additionally, the cells were able to 'hug' the wall of the viscoelastic conductor, and followed the porous structure of the composite (as opposed to making a continuous sheet of cells and covering the entire space, they are only at the walls of the conductor).

FIG. 27 includes images depicting viscoelastic conductive composites of the present disclosure which were fabricated from an alginate IPN in order to enable stretchability (>300%) of the viscoelastic conductors, while still remaining electrically conductive. The composite was prepared by adding conductive fillers to an alginate-polyacrylamide solution, which was crosslinked as previously described (Sun et al. *Nature,* 489, 133-136 (2012)). The conductive fillers did not prevent the gels from crosslinking, and were able to incorporate into the gel to make similarly conductive formulations that were still viscoelastic. When the gel was fabricated (FIG. 27, left) and then stretched (FIG. 27, middle) over multiple cycles, it still remained conductive and functional. When the relative change in resistance (e.g. the resistance of the gel when stretched, compared to the resistance of the gel unstretched) was measured, to its initial length (e.g. $\lambda/\lambda_0$ of 2 means that the gel is stretched 2× its initial length), it was found that there was less than a 2× increase in resistance. (FIG. 27, right)

DETAILED DESCRIPTION

I. Definition

In order that the present invention may be more readily understood, certain terms are first defined. Unless otherwise defined herein, scientific and technical terms used in connection with the present invention shall have the meanings that are commonly understood by those of ordinary skill in the art. The meaning and scope of the terms should be clear, however, in the event of any latent ambiguity, definitions provided herein take precedent over any dictionary or extrinsic definition.

In addition, it should be noted that whenever a value or range of values of a parameter are recited, it is intended that values and ranges intermediate to the recited values are also part of this invention.

The use of the terms "a" and "an" and "the" and similar referents in the context of describing the invention (especially in the context of the following claims) are to be construed to cover both the singular and the plural (i.e., one or more), unless otherwise indicated herein or clearly contradicted by context. The terms "comprising, "having," "including," and "containing" are to be construed as open-ended terms (i.e., meaning "including, but not limited to") unless otherwise noted. Recitation of ranges of values herein are merely intended to serve as a shorthand method of referring individually to each separate value recited or falling within the range, unless otherwise indicated herein, and each separate value is incorporated into the specification as if it were individually recited.

The term "about" or "approximately" usually means within 5%, or more preferably within 1%, of a given value or range.

As used herein, the term "subject" includes any subject who may benefit from detecting an electric signal, e.g., electrophysiological signal, using an electrode of the invention. The term "subject" includes animals, e.g., vertebrates, amphibians, fish, mammals, non-human animals, including humans and primates, such as chimpanzees, monkeys and the like. In one embodiment of the invention, the subject is a human.

The term "subject" also includes agriculturally productive livestock, for example, cattle, sheep, goats, horses, pigs, donkeys, camels, buffalo, rabbits, chickens, turkeys, ducks, geese and bees; and domestic pets, for example, dogs, cats, caged birds and aquarium fish, and also so-called test animals, for example, hamsters, guinea pigs, rats and mice.

II. Compositions of the Invention

The present invention is based upon, at least in part, the discovery that viscoelastic electrode array according to the invention can match the mechanical properties of soft tissues and conform to the complex geometry thereof.

Accordingly, the present invention features viscoelastic compositions that match the viscoelastic properties of tissues. As used herein, a "viscoelastic composition" refers to any compositions disclosed herein that are viscoelastic. The viscoelastic composition includes, but is not limited to, the viscoelastic conductive material, viscoelastic insulate film, viscoelastic outer layer, or viscoelastic encapsulation composition disclosed herein. The viscoelastic composition of the invention can be non-biodegradable or biodegradable. In one aspect, the present invention provides viscoelastic conductive composites including a viscoelastic conductive material and a conductive filler, the viscoelastic conductive material having viscoelastic property that matches the viscoelastic property of a tissue. In another aspect, the present invention provides viscoelastic encapsulation composition including a viscoelastic insulate film; and a viscoelastic outer layer.

The present invention also features the method of making the viscoelastic compositions and the methods of using the viscoelastic compositions, e.g., making electrode arrays for detecting electric signal of various tissues.

The compositions and methods of the present invention provide advantages over the prior art. For example, fully viscoelastic electrode array can be made from the viscoelastic composition of the invention, exhibiting similar mechanical properties to soft biological tissues. The viscoelastic conductive materials, e.g., alginate hydrogels, of the invention exhibit highly tunable physical properties, where both the viscoelasticity and stiffness can be independently varied. The viscoelastic compositions of the invention are also biocompatible. Neural cell responses to the viscoelastic compositions of the invention were favorable, with minimal astrocyte activation in vitro and with sustained signal-to-noise ratio recordings in vivo, especially as compared to those observed with the materials in the prior art. Further, the design of viscoelastic electrode array using the viscoelastic compositions of the invention and the array fabrication process are facile and fast (<3 days) and do not require high temperatures, harsh chemical etchants, or thin-film photolithographic technologies. In contrast, the existing surface electrode arrays that monitor the electrophysiology of tissues do not match the mechanical properties of the tissues, leading to poor and/or limited device conformability and significant inflammatory responses.

As described herein, the viscoelastic conductive composite of the invention, which include a viscoelastic conductive material and a conductive filler, is viscoelastic. Accordingly, the viscoelastic conductive track and the viscoelastic electrode of the present invention made from the viscoelastic conductive composite are themselves fully viscoelastic.

In contrast, viscoelastic insulation layer, such as that described in the art, e.g., US2019/0106544A1, has been described to be integrated with an existing metal array of electrodes for forming a device. However, such a device is not fully viscoelastic as the metal array is not viscoelastic.

Furthermore, the viscoelastic electrode array of the invention disclosed herein are highly tunable. The viscoelastic conductive composite used herein can be adjusted, e.g., in the amount, shape, and type of the viscoelastic conductive material and the conductive filler, among other things, to adjust conductivity, viscoelasticity, and other properties of the viscoelastic electrode. The viscoelasticity of the viscoelastic compositions of the invention, e.g., alginate hydrogel, can be adjusted by adjusting the molecular weight of the chains. The stiffness of the viscoelastic compositions of the invention, e.g., the alginate hydrogel, can be adjusted by adjusting the amount of crosslinker used. Additionally, some viscoelastic compositions of the invention, e.g., the alginate hydrogels, are porous, e.g., nanoporous or microporous. The porosity of the materials can be adjusted to affect the mechanical properties.

Accordingly, various viscoelastic compositions disclosed herein, e.g., alginate hydrogel, can be adjusted to match more than one properties of a tissue, such as the modulus, the viscoelasticity, among other things.

In some embodiments, the viscoelastic electrode array of the present invention comprises an viscoelastic outer layer. The viscoelastic outer layer is made from a viscoelastic composition disclosed herein. In some embodiments, the viscoelastic outer layer can be made from the same viscoelastic conductive material, e.g., alginate hydrogel that is used to make the viscoelastic conductive composite. The outer layer can be a different viscoelastic composition, e.g., an IPN hydrogel. Advantageously, the outer layer is highly tunable as described above. Accordingly, this viscoelastic outer layer, which is in contact with the tissues and can match the various properties of a specific tissue.

Also advantageously, the thickness of the outer layer can also be adjusted. Thus, an exemplary viscoelastic electrode array of the invention, which includes a viscoelastic outer layer can, have a thickness that matches the space for placing the viscoelastic electrode array of the invention. For example, the thickness of the viscoelastic electrode array can be up to a few hundred micrometer, such as about 200 to about 300 μm as compared to the typical thickness of 4-20 μm of commonly used electrode array in the art which is instead composed of plastic materials. These commonly used electrodes, which are based on plastic material, but not on a viscoelastic conductive material as disclosed herein, e.g., a viscoelastic hydrogel, are also not fully viscoelastic. In the meantime, the viscoelastic outer layer can also be very soft (having a low storage modulus: G'), the bending stiffness of viscoelastic outer layer is lower as compared other commonly used viscoelastic materials in the art, such as those described in US2019/0106544A1. The viscoelastic outer layer is thus highly conformable but also facile to be manipulated in a clinical context. For example, an exemplary viscoelastic electrode can be handled, e.g., to be placed on the tissue, and/or to be repositioned on the tissue, with ease.

Furthermore, most currently available electrode array are made of hydrophobic encapsulation layers. In contrast, in some embodiments of the present invention, the exemplary viscoelastic electrode array of the invention can include an outer layer that is hydrophilic. Such a viscoelastic electrode array can "stay" in place on the surface of a tissue by the surface tension of the tissue (a hydrophilic surface). In addition, it is typical that there is a gap of variable thickness between hydrophobic, e.g., the currently available electrode array, and hydrophilic materials, e.g., the hydrophilic tissue. In contrast, the exemplary viscoelastic electrode array of the invention that includes the hydrophilic viscoelastic outer layer can contact the tissue intimately with little or no gap between the viscoelastic outer layer and the tissue.

Additionally, in some embodiments, the viscoelastic electrode array may further comprise an adhesive layer attached to the viscoelastic outer layer. The viscoelastic electrode array can adhere to a tissue surface. The adhesive layer that can adhere to tissue surface has been described in U.S. Patent Publication No. 2019/0091367A1 and International Patent Application Publication No. WO2020/077173, the contents of each of which are incorporated herein by reference.

A. Viscoelastic Conductive Composite

In one aspect, the present invention provides an viscoelastic conductive composite. The viscoelastic conductive composite includes a viscoelastic conductive material and a conductive filler, wherein the viscoelastic conductive material has a viscoelastic property that matches the viscoelastic property of a tissue.

The term "match," "matching," and the like, as used herein, refer to that one or more viscoelastic properties of a viscoelastic composition, e.g., viscoelastic conductive material, viscoelastic insulate film, are similar to one or more viscoelastic properties of a tissue. For example, a viscoelastic composition may have a ratio of the loss modulus to the storage modulus that is similar to a tissue, such as brain or heart. It does not require the viscoelastic composition to have the same value in a viscoelastic property to match the viscoelastic property of the tissue. In some embodiments, a viscoelastic composition matches a viscoelastic property of a tissue when the value of the viscoelastic property, e.g., loss modulus, storage modulus, or the ratio of loss modulus to storage modulus, of the viscoelastic composition falls within the same order of magnitude of the value of the viscoelastic property of the tissue. In certain embodiments, a viscoelastic composition matches a viscoelastic property of a tissue when the value of the viscoelastic property, e.g., loss modulus, storage modulus, or the ratio of loss modulus to storage modulus, of the viscoelastic composition is within about 1% to about 300% of the value or range of the viscoelastic property of a tissue. In some embodiments, a viscoelastic property of a viscoelastic composition matches a tissue when the value or range of the viscoelastic property falls within about 300%, about 200%, about 100%, about 50%, about 40%, about 30%, about 20%, about 10%, about 5%, or about 1% of the value or range of the viscoelastic property of a tissue.

A viscoelastic composition is not required to match all the viscoelastic properties of a tissue to be a matching materials. For example, a viscoelastic composition may match the viscoelastic property of a tissue if they have similar ratio of loss modulus to storage modulus, but the loss modulus and/or the storage modulus can be significantly different.

As used herein, viscoelastic property includes the loss modulus, the storage modulus, the ratio of the loss modulus to the storage modulus, or any combination thereof.

The methods to measure the viscoelastic property of a viscoelastic composition are well known in the art. Such methods are described herein in the Examples, e.g., Examples 1 and 2, of the present disclosure. Further, the viscoelastic property of a viscoelastic composition, such as a hydrogel material, and one or more tissue are well documented in the art, such as the literature cited in the present disclosure, in particular, the Examples, e.g., Example 5, of the present disclosure. Accordingly, one of ordinary skill in the art could readily choose an appropriate viscoelastic composition for making the viscoelastic conductive composite of the invention.

Moreover, as demonstrated in FIG. 26, the conductive viscoelastic composite of the present disclosure not only does not have cytotoxic effects, cells can attach to the composite and be able to function (e.g., divide, form connections) while sitting on the composite. Put differently, the cells can sense the mechanical properties of the conductive viscoelastic composite of the present disclosure. As such, the conductive viscoelastic composite of the present disclosure is not only conductive, biocompatible, but also can be used to study the properties of cells on their environments and in turn regulate the behavior of cells through mechanics.

Furthermore, the conductive viscoelastic composite of the present disclosure is also stretchable (>300%) while remaining electrically conductive. FIG. 27 shows a conductive viscoelastic composite fabricated from an alginate IPN together with viscoelastic conductive fillers. The conductive fillers did not prevent the gels from crosslinking, and were able to incorporate into the gel to make similarly conductive formulations that were still viscoelastic.

Various viscoelastic compositions, e.g., the viscoelastic conductive material and the viscoelastic outer layer of the present invention are biocompatible. As used herein, the term "biocompatible" is intended to describe any material which upon implantation does not elicit a substantial detrimental response in vivo, e.g., immune response, such as inflammation, toxicity, or injury.

i. Viscoelastic Conductive Material

Any viscoelastic conductive material that matches the viscoelastic property of one or more tissue of an animal is encompassed in the invention. In some embodiments, the viscoelastic conductive material is a polymer based viscoelastic conductive material, such as a modified elastomer. In certain embodiments, the polymer-based viscoelastic conductive material may comprise a silicone polymer, such as polysiloxanes, e.g., polydimethylsiloxane.

The conductivity of the viscoelastic conductive material of the invention is between about $10^{-4}$ S/m and about $10^{-3}$ S/m. The conductivity of the viscoelastic conductive material is generally not strong enough for the electrophysiological recording. In some embodiments, the viscoelastic conductive material of the invention has an ionic conductivity. In contrast, the conductivity of the described viscoelastic conductive composite of the invention is between $10^{-1}$ S/m and $10^3$ S/m, and is strong enough for electrophysiological recording and stimulation.

In certain embodiments, the conductive filler of the invention, which has a conductivity that is strong enough for electrophysiological recording, is incorporated in the viscoelastic conductive material to form the viscoelastic conductive composite. The conductive filler may have a conductivity that is at least about 10 times, e.g., about 20 time, about 50 times, about 100 times, about 1,000 times, about 10,000 times, or more, of the conductivity of the viscoelastic conductive material. Accordingly, a viscoelastic electrode array can be made of a viscoelastic conductive composite. The viscoelastic electrode array makes contact with a tissue to record the electric signal. The viscoelastic electrode array contacts the tissue with little or no gap due to, at least partly, its viscoelasticity.

ii. Viscoelastic Hydrogel

In certain embodiments, the viscoelastic conductive material is a hydrogel. A hydrogel is a polymer gel comprising a network of crosslinked polymer chains. A hydrogel is usually a composition comprising polymer chains that are hydrophilic. The network structure of hydrogels allows them to absorb significant amounts of water. Hydrogel are sometimes found as a colloidal gel in which water is the dispersion medium. In certain embodiments, hydrogels are highly absorbent (they can contain over 99% water) natural or synthetic polymers that possess a degree of flexibility very similar to natural tissue, due to their significant water content. Hydrogels have been used for therapeutic applications, e.g., as vehicles for in vivo delivery of therapeutic agents, such as small molecules, cells and biologics. Hydrogels are commonly produced from polysaccharides, such as alginates, or polypeptides, such as gelatins. The polysaccharides or polypeptides may be chemically manipulated to modulate their properties and properties of the resulting hydrogels. As used herein and depending on context, a hydrogel may sometimes be referred to as "gel."

The hydrogel may be constructed out of a number of different rigid, semi-rigid, flexible, gel, self-assembling, liquid crystalline, or fluid compositions such as peptide polymers, polysaccharides, synthetic polymers, hydrogel materials, ceramics (e.g., calcium phosphate or hydroxyapatite), proteins, glycoproteins, proteoglycans, metals and metal alloys. The compositions are assembled into hydrogels using methods known in the art, e.g., injection molding, lyophilization of preformed structures, printing, self-assembly, phase inversion, solvent casting, melt processing, gas foaming, fiber forming/processing, particulate leaching or a combination thereof.

In some embodiments, the hydrogel is a biocompatible polymer matrix. Examples of materials which can form hydrogels include alginates and alginate derivatives, gelatin, collagen, agarose, natural and synthetic polysaccharides, poly amino acids such as polypeptides particularly poly (lysine), and hyaluronic acid, polyesters such as polyhydroxybutyrate and poly-epsilon.-caprolactone, polyanhydrides; polyphosphazines, poly(vinyl alcohols), poly (alkylene oxides) particularly poly(ethylene oxides), poly (allylamines)(PAM), poly(acrylates), modified styrene polymers such as poly(4-aminomethylstyrene), pluronic polyols, polyoxamers, poly(uronic acids), poly(vinylpyrrolidone), polylactic acid, polyglycolic acid, poly(lactic-co-glycolic acid) (PLGA) polymers, poly(ethylene glycols), and copolymers of the above, including graft copolymers. Synthetic polymers and naturally-occurring polymers such as, but not limited to, alginate, gelatin, collagen, chitosan, fibrin, hyaluronic acid, agarose, pullulan, scleroglucan, chitin, elsinan, xanthan gum, curdlan, dextran, gellan, levan, emulsan, cellulose, and laminin-rich gels may also be used.

In certain embodiments, the hydrogel is non-biodegradable. In some embodiments, the hydrogel is biodegradable.

In some embodiments, the hydrogels are ionically crosslinked. Ionic crosslinking involves the association of polymer chains by noncovalent interactions, in particular, ionic crosslinking. A crosslinked hydrogel network is formed when molecules containing opposite charges are blended, e.g., polyelectrolyte solution and multivalent ions (crosslinking agent). The ions of opposite charges electrostatically attract each other giving rise to a crosslinked polymeric network. Exemplary ionic crosslinking agents include, but are not limited to, metal ions, such as dicationic metal ion, e.g., $Ca^{2+}$, $Mg^{2+}$, $Mn^{2+}$, $Be^{2+}$, $Sr^{2+}$, $Ba^{2+}$, or $Ra^{2+}$. In some embodiments, the crosslinking agent is a calcium salt, including, but not limited to $CaSO_4$, $CaCl_2$, $Ca(NO_3)_2$, or $CaCO_3$. As used in this disclosure, the term "crosslinking agent" and the term "crosslinker" can be used interchangeably.

Ionically crosslinked hydrogels were known in the art and have been described, for example, at U.S. Patent Publication No. 2014/0079752A, U.S. Pat. No. 9,387,276, the contents of each of which are incorporated herein by reference in their entireties.

To make an ionically crosslinked hydrogel, a polymer solution, e.g., sodium alginate solution, is mixed with a crosslinking agent solution, e.g., a $CaSO_4$ solution. The polymer solution, usually a solution of a salt of the polymer, such as a sodium salt, has a concentration of the polymer (w/v) of about 0.1% to about 10%, e.g., about 0.1%, about 0.2%, about 0.5%, about 1%, about 1.5%, about 2%, about 2.5%. In certain embodiments, the contraction of the polymer is about 1% to about 2%, e.g., about 1%, about 1.1%, about 1.2%, about 1.3%, about 1.4%, about 1.5%, about 1.6%, about 1.7%, about 1.8%, about 1.9%, or about 2.0%. The crosslinking agent is usually prepared as a stock solution with high concentration, e.g. 7.5 M solution. An appropriate amount of the stock solution of the crosslinking agent is added to the polymer solution to reach an appropriate final concentration. The final concentration of crosslinking agent has a concentration of between about 0.5 mM to about 200 mM, e.g., about 0.5 mM, about 1 mM, about 2 mM, about 5 mM, about 10 mM, about 20 mM, about 50 mM, about 100 mM, about 150 mM, or about 200 mM. In certain embodiments, the final concentration of crosslinking agent has a concentration of between about 0.5 mM to about 20 mM, e.g., about 0.5 mM, about 0.6 mM, about 0.7 mM, about 0.8 mM, about 0.9 mM, about 1.0 mM, about 1.1 mM, about 1.2 mM, about 1.3 mM, about 1.4 mM, about 1.5 mM, about 1.5 mM, about 1.6 mM, about 1.7 mM, about 1.8 mM, about 1.9 MM, about 2.0 mM, about 2.1 mM, about 2.2 mM, about 2.3 mM, about 2.4 mM, about 2.5 mM, about 2.6 mM, about 2.7 mM, about 2.8 mM, about 2.9 mM, about 3.0 mM, about 3.1 mM, about 3.2 mM, about 3.5 mM, about 3.7 mM, about 4.0 mM, about 4.2 mM, about 4.5 mM, about 4.7 mM, about 5.0 mM, about 5.5 mM, about 6.0 mM, about 6.5 mM, about 7.0 mM, about 7.5 mM, about 8.0 mM, about 8.5 mM, about 9 mM, about 9.5 mM, about 10 mM, about 11 mM, about 12 mM, about 13 mM, about 14 mM, about 15 mM, about 16 mM, about 17 mM, about 18 mM, about 19 mM, or about 20 mM.

In some embodiments, the hydrogels are covalently cross-linked. In some embodiments, a monomer polymer may be first modified to contain one or more functional groups. A covalent bond forms between the functional group to cross-link the polymers under appropriate condition. Exemplary functional groups include, but are not limited to, acrylate, methacrylate, amino, vinyl, aldehyde, thiol, silane, carboxyl, azide, alkyne. In some particular embodiments, the hydrogel is made from covalently crosslinking methacrylated alginate. Covalently crosslinked hydrogels were known in the art and have been described in U.S. Pat. No. 9,675,561, the contents of which are incorporated herein by reference. In certain embodiments, a polymer may interact with a cross-linking agent, which may include two or more functional groups to interact with the polymer molecule. For example, glutaraldehyde is such a crosslinking agent, including two carbonyl group which can condenses amines via Mannich reactions.

In certain embodiments, the hydrogel is crosslinked using click chemistry, with these materials referred to as click-hydrogels and/or click-cryogels. A click hydrogel or cryogel is a gel in which cross-linking between hydrogel or cryogel polymers is facilitated by click reactions between the polymers. Each polymer may contain one of more functional groups useful in a click reaction. Given the high level of specificity of the functional group pairs in a click reaction, active compounds can be added to the preformed device prior to or contemporaneously with formation of the hydrogel device by click chemistry. Non-limiting examples of click reactions that may be used to form click-hydrogels include Copper I catalyzed azide-alkyne cycloaddition, strain-promoted as size-alkyne cycloaddition, thiol-ene photocoupling, Diels-Alder reactions, inverse electron demand Diels-Alder reactions, tetrazole-alkene photo-click reactions, oxime reactions, thiol-Michael addition, and aldehyde-hydrazide coupling. Non-limiting aspects of click hydrogels are described in Jiang et al. (2014) Biomaterials, 35:4969-4985, the entire content of which is incorporated herein by reference.

In various embodiments, a click alginate is utilized (see, e.g., US Patent Publication No. 20170189581A1, hereby incorporated by reference in its entirety).

The viscoelasticity and stiffness of the viscoelastic hydrogel can be adjusted. The stiffness of the viscoelastic hydrogel can be adjusted by varying the concentration of the crosslinking agent, e.g., $Ca^{2+}$. By increasing the concentration of the crosslinking agent, the stiffness of the viscoelastic hydrogel increases. The viscoelasticity of the viscoelastic hydrogel can be adjusted by varying the molecular weight of the polymer that form the hydrogels. By decreasing the molecular weight, the viscoelasticity of the viscoelastic hydrogel increases, i.e. the ratio of loss modulus to storage modulus increases. Accordingly, the stiffness and viscoelasticity of the viscoelastic hydrogel can be independently tuned to match a particular tissue.

In some embodiments, the hydrogel is a covalently cross-linked hydrogel. The viscoelasticity of the hydrogel can be adjusted by changing various factors. In some embodiments, the linker/spacer in the covalent network can be changed to adjust the viscoelasticity of the hydrogel. For example, longer PEG spacer generally results in a more viscoelastic hydrogel). Similar to ionically crosslinked hydrogel, changing the initial molecular weight or length of the polymer monomer, e.g., alginate, would also affect viscoelasticity. The methods for making viscoelastic covalently crosslinked hydrogels are known in the art, such as those described in Chaudhuri et al., Hydrogels with tunable stress relaxation regulate stem cell fate and activity, Nat. Mater. 15(3): 326-34 (2016); Chaudhuri et al., Effects of extracellular matrix viscoelasticity on cellular behavior, Nature, 584: 535-46 (2020), the contents of each of which are incorporated herein by reference. For example, non-ideally cross-linked polymer networks, such as polymer monomer cross-linked to just beyond the gel point, form materials with incomplete crosslinking that allow for loss and creep, properties of viscoelastic hydrogel. Varying the concentrations of monomer and crosslinker, or the inclusion of non-cross-linked polymers into crosslinked polymer gel enables the formation of a set of gels with the same storage modulus, but varying loss moduli.

Similar to the ionically crosslinked hydrogel, the stiffness of the covalently crosslinked hydrogel can be increased by increasing the crosslinking between polymers. For example, an alginate monomer can be methacrylated and covalently crosslinked. Increasing the degree of the methacrylation of the alginate monomer increases the crosslinking degree between polymers, which leads to increasing stiffness.

In certain embodiments, the molecular weight of the polymer can be varied by subject the polymer to treatment. For example, alginate polymer may be subject to gamma-irradiation to reduce the weight-averaged molecular weight.

In certain embodiments, the viscoelastic hydrogel, e.g., alginate hydrogel, of the present invention may have a viscoelasticity of about 0.1 to about 0.5 (the ratio of loss modulus to storage modulus). In some embodiments, the viscoelastic hydrogel, e.g., alginate hydrogel, of the present invention may be very soft, having an elastic modulus of about 100 Pa to about 1000 kPa.

In certain embodiments, the viscoelastic hydrogels comprise meshes having a diameter of less than about 10 nm. The term "mesh," as used herein, refers to the spacing between individual polymers in hydrogel, which is in the scale of nanometers. Such a hydrogel is sometimes referred to as "nanoporous" hydrogel in this disclosure or as comprising "nanopores".

In some embodiments, the viscoelastic hydrogel is microporous. A microporous viscoelastic hydrogel comprises pores with a diameter in the range of about 1 μm to about a few hundred micrometer, e.g., about 100 μm, about 200 μm, about 300 μm, about 400 μm, or about 500 μm. In certain embodiments, the viscoelastic hydrogels include pores that have a diameter of about 1 μm to about 150 μm. Methods of preparing porous hydrogel products are known in the art. (See, e.g., U.S. Pat. No. 6,511,650, incorporated herein by reference). As used herein and depending on the context, the term "diameter" refers to the largest length between two points of a 2D or 3D structure. For example, a diameter of a cross-section refers to the largest length between two points on the surface of the cross-section. In another example, a diameter of a microsphere or a pore refers to the largest length between two points on these 3D structure. The use of the term "diameter" does not imply that the 2D or 3D structure has a particular shape.

In certain embodiments, the size of the pores may be adjusted by varying the size of porogens. In some embodiments, the porogen can be made from a material that has a different solubility than the polymer used to fabricate the viscoelastic hydrogel. Thus, the porogen can be readily removed and leave pores at its location using an appropriate choice of solvent. In some embodiments, the porogen can be made from a material that degrades more rapidly than that used to form the viscoelastic hydrogel. Thus, the porogen degrades faster, leaving behind pore in the viscoelastic hydrogel. In some embodiments, the porogen can be made from a material with a lower melting temperature than that of the viscoelastic hydrogel, so a change in temperature can be used to solubilize the porogen and remove it without impacting the bulk gel. The methods for making porous hydrogel using porogen is well known in the art and has been described in US Patent Publication US 2014/0079752 A1, the contents of which is incorporated herein by reference.

In some embodiments, the size of the pores may be controlled by varying the temperature under which the hydrogel is formed as described in detail below (see description below for cryogel).

The viscoelastic hydrogel has a porosity of about 50% to about 97%. As used herein, the term "porosity" refers to the ratio of the volume of micropores (i.e., the pores that have a diameter of about 1 μm to about a few hundred micrometer) to the total volume of the hydrogel. In some embodiments, the viscoelastic hydrogel has a porosity of about 78% to about 95%. The porosity of a hydrogel can be adjusted by varying various factors, including the inclusion of porogens, crosslinking in a partially frozen state, post-gelation processing such as lyophilization or laser treatment and other approaches. In some embodiments, the porosity of the hydrogel can be adjusted by varying the temperature at which the hydrogel are formed as discussed in detail below (see description below for cryogel). The porosity of a microporous hydrogel can be measured using methods known in the art. In some embodiments, the porosity is measured by the change in mass after water in the fully hydrated hydrogel is wicked away. Using this method, the porosity of a hydrogel can be expressed as follows:

$$porosity = (weight\ of\ fully\ hydrated\ hydrogel - weight\ of\ hydrogel\ with\ water\ wicked\ away) / weight\ of\ fully\ hydrated\ hydrogel \times 100\%.$$

iii. Viscoelastic Cryogel

In some embodiments, the viscoelastic hydrogel is a cryogel. Cryogels are a class of materials with a highly porous interconnected structure that are produced using a cryotropic gelation (or cryogelation) technique. Cryogels also have a highly porous structure. Cryogels are characterized by high porosity, e.g., at least about 50%, about 55%, about 60%, about 65%, about 70%, about 75%, about 80%, about 85%, about 90%, about 95%, about 97% or more pores with thin pore walls that are characterized by high density of polymer crosslinking. The walls of cryogels are typically dense and highly cross-linked. In some embodiments, the wall of the hydrogel/cryogel has a thickness of about 850 nm to 950 nm. In certain embodiments, the wall of the hydrogel/cryogel has a thickness of about 879 nm to 915 nm.

In certain embodiments, cryogelation comprises a technique in which polymerization-crosslinking reactions are conducted in quasi-frozen reaction solution. During freezing of the monomer, e.g., alginate solution, the monomers are expelled from the ice concentrate within the channels between the ice crystals, so that the reactions only take place in these unfrozen liquid channels. After polymerization and, after melting of ice, a porous material is produced whose microstructure is a negative replica of the ice formed. Ice crystals act as porogens. Pore size is tuned by altering the temperature of the cryogelation process. For example, the cryogelation process is typically carried out by quickly freezing the solution at −20° C. Lowering the temperature to, e.g., −80° C., would result in more ice crystals and lead to smaller pores. In general, cryogelation at a lower temperature leads to smaller pores.

Non-limiting examples of cryogelation techniques are described in U.S. Patent Application Publication No. 20140227327, the entire content of which is incorporated herein by reference.

iv. Viscoelastic Alginate Hydrogel

In certain embodiments, the viscoelastic hydrogel of the invention comprises an alginate hydrogel. Alginates are versatile polysaccharide based polymers that may be formulated for specific applications by controlling the molecular weight, rate of degradation and method of scaffold formation. Alginate polymers are comprised of two different monomeric units, (1-4)-linked β-D-mannuronic acid (M units) and α L-guluronic acid (G units) monomers, which can vary in proportion and sequential distribution along the polymer chain. Alginate polymers are polyelectrolyte systems which have a strong affinity for divalent cations (e.g., $Ca^{+2}$, $Mg^{+2}$, $Ba^{+2}$) and form stable hydrogels when exposed to these molecules. See Martinsen A., et al., Biotech. & Bioeng., 33 (1989) 79-89). For example, calcium cross-linked alginate hydrogels are useful for dental applications, wound dressings chondrocyte transplantation and as a matrix for other cell types. Without wishing to be bound by theory, it is believed that G units are preferentially cross-linked using calcium crosslinking, whereas click reaction based crosslinking is more indiscriminate with respect to G units or M units (i.e., both G and M units can be crosslinked by click chemistry). Alginate scaffolds and the methods for making them are known in the art. See, e.g., US Patent Publication No. US20180326073A1, the entire contents of which are incorporated herein by reference.

The alginate polymers useful in the context of the present invention can have an average molecular weight from about 20 kDa to about 500 kDa, e.g., from about 20 kDa to about 40 kDa, from about 30 kDa to about 70 kDa, from about 50 kDa to about 150 kDa, from about 130 kDa to about 300 kDa, from about 230 kDa to about 400 kDa, from about 300 kDa to about 450 kDa, or from about 320 kDa to about 500 kDa. In one example, the alginate polymers useful in the present invention may have an average molecular weight of about 32 kDa. In another example, the alginate polymers useful in the present invention may have an average molecular weight of about 265 kDa. In some embodiments, the alginate polymer has a molecular weight of less than about 1000 kDa, e.g., less than about 900 Kda, less than about 800 kDa, less than about 700 kDa, less than about 600 kDa, less than about 500 kDa, less than about 400 kDa, less than about 300 kDa, less than about 200 kDa, less than about 100 kDa, less than about 50 kDa, less than about 40 kDa, less than about 30 kDa or less than about 25 kDa. In some embodiments, the alginate polymer has a molecular weight of about 1000 kDa, e.g., about 900 Kda, about 800 kDa, about 700 kDa, about 600 kDa, about 500 kDa, about 400 kDa, about 300 kDa, about 200 kDa, about 100 kDa, about 50 kDa, about 40 kDa, about 30 kDa or about 25 kDa. In one embodiment, the molecular weight of the alginate polymers is about 20 kDa.

The term "alginate", used interchangeably with the term "alginate polymers", includes unmodified alginate or modified alginate. Modified alginate includes, but not limited to, oxidized alginate (e.g., comprising one or more algoxalate monomer units) and/or reduced alginate (e.g., comprising one or more algoxinol monomer units). In some embodiments, oxidized alginate comprises alginate comprising one or more aldehyde groups, or alginate comprising one or more carboxylate groups. In other embodiments, oxidized alginate comprises highly oxidized alginate, e.g., comprising one or more algoxalate units. Oxidized alginate may also comprise a relatively small number of aldehyde groups (e.g., less than 15%, e.g., 14,%, 13%, 12%, 11%, 10%, 9%, 8%, 7%, 6%, 5%, 4%, 3%, 2%, 1%, 0.9%, 0.8%, 0.7%, 0.6%, 0.5%, 0.4%, 0.3%, 0.2% 0.1% or less aldehyde groups or oxidation on a molar basis). The term "alginate" or "alginate polymers" may also include alginate, e.g., unmodified alginate, oxidized alginate or reduced alginate. The term "alginate" also includes a salt of alginate, such as sodium alginate.

v. Conductive Filler

Any suitable conductive filler can be used to form an viscoelastic conductive composite of the invention. Exemplary conductive fillers include, but are not limited to, metals, conductive polymers, and carbon-based materials.

Exemplary metals include, but are not limited to, copper, gold, silver, tungsten, or platinum. Exemplary conductive polymers include, but are not limited to, polyacetylene, polyphenylene vinylene, polypyrrole, polythiophene, polyaniline, and polyphenylene sulfide. Exemplary carbon-based conductive fillers include, but are not limited to, conductive carbon black, carbon nanotube, graphene flake, graphite, graphite ink, graphene, or graphene ink. In some embodiments, the carbon nanotube includes single wall or multi-walled nanotubes.

The conductive filler is generally a microparticle or a nanoparticle. As used herein, the term "microparticle" refer to particles having a size between about 1 μm and about 1000 μm in at least one dimension. The term "nanoparticle," as used herein, refers to particles having a size between about 1 nm and 1000 nm in any dimension. The microparticle or the nanoparticle of the invention can be in any shape, including, but not limited to, sphere, tube, rod, or sheet. The microparticle or nanoparticle can also have an irregular shape.

In some embodiments, the conductive filler comprises a metal conductive filler, which may be in a shape of a microsphere. As used herein, the term "microspheres" refers small spherical particle, with diameters in the micrometer range. In certain embodiments, the metal microsphere has a diameter of about 1 to about 50 μm.

In some embodiments, the conductive filler comprises a carbon based conductive filler. In certain embodiments, the carbon based conductive filler comprises a graphene flake or a carbon nanotube. The graphene flake may be in a shape of a sheet.

The carbon nanotube may be in the shape of tube with high aspect ratio. The term "aspect ratio," as used herein, refer to the ratio of the length of a microparticle to the diameter of the cross-section of thereof. In certain embodiments, the carbon nanotube may have an aspect ratio of about 25:1 to about $1.5 \times 10^8$:1. In certain embodiments, the carbon nanotube may have an aspect ratio of about 150:1 to 160:1.

vi. Incorporation of Conductive Filler into Viscoelastic Conductive Material

The viscoelastic conductive composite of the invention comprises a viscoelastic conductive material and conductive filler. In certain embodiments, the conductive filler is incorporated into the viscoelastic conductive material. The overall viscoelastic conductive composite of the invention has a conductivity greater than about 0.001 S/m. Higher conductivity, in general, results in larger signal/noise ratio. In some embodiments, the conductivity of the viscoelastic conductive composite is greater than about 0.1 S/m. In some embodiments, the conductivity of the viscoelastic conductive composite is greater than about 1 S/m. In certain embodiments, the viscoelastic conductive composite of the invention may have a conductivity between about 10 S/m to about 35 S/m.

In certain embodiments, the viscoelastic conductive material comprises a crosslinked polymer, e.g., hydrogel. To incorporate the conductive filler into the viscoelastic crosslinked polymer, the conductive filler is mixed with the polymer prior to the crosslinking. After crosslinking, the conductive filler microparticles make contact with each other and form a percolating path. The term "percolating path," as used herein, refers to the conductive path formed by the conductive filler microparticles that can conduct electricity. The term "percolation," as used herein, refers to the amount of conductive filler microparticles, e.g., carbon nanotube, needed in a viscoelastic conductive material, e.g., hydrogel, to have an electrically conductive path.

In some embodiments, the viscoelastic conductive material comprises a porous hydrogel/cryogel. To incorporate the conductive filler into the porous hydrogel/cryogel, the conductive filler, e.g., carbon nanotubes, graphene flakes, or metal microparticles, is mixed with the polymer, e.g., alginate, before the crosslinking. During the crosslinking and the formation of the pores, the conductive filler microparticle are distributed in the wall of the pores. Thus, the conductive filler microparticles are "concentrated" in the walls of the pores. With the same amount of the conductive filler loaded in a viscoelastic hydrogel, the high porosity of the hydrogel, the more "concentrated" conductive filler in the wall, and thus, the higher conductivity value of the overall viscoelastic conductive composite.

The conductive fillers are incorporated into the viscoelastic conductive material in such an amount that the overall viscoelastic conductive composite has the similar viscoelasticity and/or stiffness of the viscoelastic conductive material as the matrix of the viscoelastic conductive composite of the invention. The conductive filler, e.g., metal microparticles, can be loaded in an amount up to about 5%, 10%, 15%, 20%, 25%, 30%, 35%, 40%, 45%, 50%, 55%, 60%, 65%, 70%, 75%, 80%, or 85% (weight/weight) of the viscoelastic conductive material, e.g., hydrogel. In certain embodiments, the conductive filler, e.g., metal microparticles, can be loaded in an amount at least about 0.01%, 0.02%, 0.05%, 0.1%, 5%, 10%, 15%, 20%, 25%, 30%, 35%, 40%, 45%, 50%, 55%, 60%, 65%, 70%, 75%, 80%, or 85% (weight/weight) of the viscoelastic conductive material, e.g., hydrogel. In certain embodiments, the conductive filler comprises a metal microparticle (e.g., copper, gold, silver, tungsten, or platinum) and the viscoelastic conductive material comprises a hydrogel, and the amount of the metal microparticle loaded can be up to about 5%, 10%, 15%, 20%, 25%, 30%, 35%, 40%, 45%, 50%, 55%, 60%, 65%, 70%, 75%, 80%, or 85% of the hydrogel without significantly affecting the mechanical properties, e.g., the viscoelasticity and/or stiffness, of the hydrogel and the overall viscoelastic conductive composite of the invention. In certain embodiments, the conductive filler comprises a metal microparticle (e.g., copper, gold, silver, tungsten, or platinum) and the viscoelastic conductive material comprises a hydrogel, and the amount of the metal microparticle loaded is at least about 0.01%, 0.02%, 0.05%, 0.1%, 5%, 10%, 15%, 20%, 25%, 30%, 35%, 40%, 45%, 50%, 55%, 60%, 65%, 70%, 75%, 80%, or 85% of the hydrogel without significantly affecting the mechanical properties, e.g., the viscoelasticity and/or stiffness, of the hydrogel and the overall viscoelastic conductive composite of the invention. In certain embodiments, the conductive filler comprises a carbon based conductive filler, e.g., nanotube and/or graphene flake, and the viscoelastic conductive material comprises a hydrogel, and the total amount of the carbon based conductive filler loaded can be up to (or at least) about 0.05%, 0.1%, 0.2%, 0.3%, 0.4%, 0.5%, 0.6%, 0.7%, 0.8%, 0.9%, 1%, 1.5%, 2%, 2.5%, 3%, 3.5%, 4% of the hydrogel without significantly affecting the mechanical properties, e.g., the viscoelasticity and/or stiffness, of the viscoelastic conductive material and the overall viscoelastic conductive composite of the invention.

In some embodiments, more than one type, e.g., 2, 3, 4, or more, of conductive filler can be incorporated in the viscoelastic conductive composite. For example, the viscoelastic conductive composite may include both carbon nanotube and graphene flake, and the amount of each of them can be up to (or at least) about 0.1%, 0.2%, 0.3%, 0.4%, 0.5%, 0.6%, 0.7%, 0.8%, 0.9%, 1%, 1.5%, 2%, 2.5%, 3%, 3.5%, 4% of the hydrogel without significantly affecting the mechanical properties, e.g., the viscoelasticity and/or stiffness, of the viscoelastic conductive material and the overall viscoelastic conductive composite of the invention.

In some embodiments, the viscoelastic conductive composite may include two conductive fillers, one is metal microparticles and the other is a carbon based conductive filler (carbon nanotube or graphene flake). The amount of each of them is described above. In some embodiments, the viscoelastic conductive composite may include three conductive fillers, one is metal microparticles and the other two are carbon nanotube and graphene flake. The amount of each of them is described above.

B. Viscoelastic Conductive Track

The present invention provides viscoelastic conductive track that is made from the viscoelastic conductive composite of the invention.

The viscoelastic conductive track is generally configured as a conductive wire. The viscoelastic conductive track can also be configured into any appropriate shape depending on the application. The diameter of the cross section of an viscoelastic conductive track may range from about 80 μm to about a few micrometer, e.g., about 5 mm. The length of the viscoelastic conductive track can be adjusted depending on the application. As described herein, the viscoelastic conductive track of the invention can be highly viscoelastic, soft, and easy to be manipulated. For example, the viscoelastic conductive track of the invention can be bend without significantly affecting the mechanical properties thereof.

The viscoelastic conductive track has a distal end and a proximal end. In certain embodiments, an electrode is attached to the distal end of the conductive track. The electrode can be any suitable electrode recognized in the art. The electrodes for recording electrical signal of a tissue is well known in the art, such as described in Hong & Lieber, Novel electrode technologies for neural recordings, Nat. Rev. Neurosci., 20(6): 330-345 (2019).

In some embodiments, the electrode disclosed herein is viscoelastic.

In certain embodiments, the electrode is made from a viscoelastic conductive composite of the invention, which includes one or more conductive fillers incorporated in the viscoelastic conductive material, e.g., hydrogel, of the invention. In some embodiments, the electrode can be made separately using different viscoelastic conductive material and/or different conductive filler from the viscoelastic conductive material and/or conductive filler for making the viscoelastic conductive track. In some embodiments, the viscoelastic conductive material and/or the conductive filler for making the electrode are the same to the viscoelastic conductive material and/or the conductive filler for making the viscoelastic conductive track. In some embodiments, the electrode can be made separately and attached to the viscoelastic conductive track. In some embodiments, the electrode is a protrusion of the viscoelastic conductive track at the distal end thereof.

The electrode can be any suitable size or shape depending on the application.

The viscoelastic conductive track can be made using any suitable methods. In some embodiments, the viscoelastic conductive track can be transfer printed, extruded, or 3D printed.

C. Viscoelastic Electrode Array

The present invention provides a viscoelastic electrode array. The viscoelastic electrode array comprises at least one viscoelastic conductive track of the invention.

In some embodiments, the viscoelastic electrode array disclosed herein is stretchable.

In some embodiments, the viscoelastic electrode array further comprises a connector attached to a proximal end of the viscoelastic conductive track.

In certain embodiments, the viscoelastic electrode array further comprises a first viscoelastic insulate film; and a second viscoelastic insulate film. The first viscoelastic insulate film comprises at least one opening configured to accommodate the electrode of the at least one viscoelastic conductive track. The first viscoelastic insulate film and the second viscoelastic insulate film electrically insulate the at least one electrode. The at least one viscoelastic conductive track is located between the first viscoelastic insulate film and the second viscoelastic insulate film.

In some embodiments, the electrode array further comprises a first viscoelastic outer layer and a second viscoelastic outer layer. The first viscoelastic outer layer is attached to the first viscoelastic insulate film and comprises at least one opening configured to accommodate the electrode of the at least one viscoelastic conductive track. The second viscoelastic outer layer is attached to the second viscoelastic insulate film. The first viscoelastic outer layer, the first viscoelastic insulate film, the viscoelastic conductive track, the second viscoelastic insulate film, and the second viscoelastic outer layer is arranged in the following order, with the viscoelastic conductive track located innermost: the first viscoelastic outer layer-the first viscoelastic insulate film-the viscoelastic conductive track-the second viscoelastic insulate film-the second viscoelastic outer layer.

The viscoelastic insulate film and the viscoelastic outer layer forms a viscoelastic encapsulation composition. The viscoelastic film, the viscoelastic outer layer, and viscoelastic encapsulation composition are described in detail elsewhere herein.

The viscoelastic insulate film insulate the viscoelastic conductive track from each other if a viscoelastic electrode array include more than one viscoelastic conductive tracks. The viscoelastic insulate film also insulate the viscoelastic conductive track from a tissue. The opening on the viscoelastic insulate film and/or viscoelastic outer layer allows the electrode at the distal end of the viscoelastic conductive track to make contact with the tissue to record the electrical signal. The opening on the viscoelastic insulate film and/or viscoelastic outer layer can be made by any appropriate methods. In some embodiments, the opening is created by laser etching.

The viscoelastic insulate film and/or the viscoelastic outer layer provide support for the viscoelastic electrode array. The viscoelastic insulate film and/or the viscoelastic outer layer can also provide a platform for arranging the electrodes. The electrodes in the viscoelastic electrode array may be arranged in any suitable format depending on the application. For example, the electrodes may be arranged in 1×2, 2×2, 2×3, 3×3, 3×4, 4×4, 4×5, 5×5, 5×6, or 6×6 matrix or any other suitable matrix.

The viscoelastic electrode array that include at least one of the viscoelastic insulate film and/or the viscoelastic outer layer may be in any suitable shape and size depending on the application.

In some embodiments, the viscoelastic electrode array includes the viscoelastic insulate film and/or the viscoelastic outer layer. The thickness of the viscoelastic insulate film and/or the viscoelastic outer layer may be adjusted. Accordingly, the viscoelastic electrode array may have an overall thickness that is suitable for the application. For example, if the viscoelastic electrode array is made to detect an electrical signal of a tissue that has small space around the tissue, the overall thickness of the viscoelastic electrode array may be smaller.

In some embodiments, the viscoelastic electrode array includes at least one stimulation electrode and at least one recording electrode.

Electrical stimulation initiates a functional response by depolarizing the membranes of excitable cells. Depolarization is achieved by the flow of ionic current through at least one electrode, which is in close proximity to the target tissue.

Intracellularly, the electrodes directly record the firing of action, resting and postsynaptic potentials. When a neuron fires, current flows in and out through excitable regions in the axons and cell body of the neuron. This creates potential fields around the neuron. An electrode near a neuron can detect these extracellular potential fields, creating a spike.

D. Viscoelastic Encapsulation Composition

The present invention provides a viscoelastic encapsulation composition. The viscoelastic encapsulation composition comprises a viscoelastic insulate film and a viscoelastic outer layer. The viscoelastic insulate film comprises a self-healing elastomer.

The viscoelastic outer layer can be any viscoelastic compositions as described above herein, e.g., the viscoelastic hydrogel as described above. In some embodiments, the viscoelastic outer layer comprise an interpenetrating networks (IPN) hydrogel composition, comprising a first polymer network and a second polymer network, and wherein the first polymer network comprises a first polymer that is covalently crosslinked and the second polymer network comprises a second polymer that is ionically crosslinked. The viscoelastic insulate film is covalently bonded to the viscoelastic outer layer. The IPN hydrogel composition is sometimes referred to as "tough gel" in this disclosure.

The viscoelastic insulate film is formed using the elastomer material. The elastomer material can comprise and/or involve a flexible polymer backbone. The flexible polymers include, but are not limited to, polydimethylsiloxane (PDMS), polyethyleneoxide (PEO), Perfluoropolyether (PFPE), polybutylene (PB), poly(ethylene-co-1-butylene), poly(butadiene), hydrogenated poly(butadiene), poly(ethylene oxide)-poly(propylene oxide) block copolymer or random copolymer, and poly(hydroxyalkanoate), with a particular ratio of at least a first type of moieties that provide a first number of dynamic bonds resulting from interactions between the first type of moieties (e.g., hydrogen or other bonding sites with relatively strong bonds) and a second type of moieties that provide a second number of dynamic bonds resulting from interactions between the second type of moieties (e.g., hydrogen or other bonding sites of a weaker bonding strength than the first number of hydrogen or other binding sides or with relatively weak bonds) in polymer chains, and films formed therefrom. As may be appreciated, dynamic bonds include or refer to bonds that can be reformed, once broken due to mechanical forces, at room temperature or elevated temperature, such as hydrogen bonds, metal-ligand bonds, guest-host interactions, and/or supramolecular interactions. Such films exhibit self-healing, are tough, and are stretchable, consistent with one more embodiments and/or one or more mechanisms described herein. In specific aspects, the polymer film can include a polydimethylsiloxane (PDMS) polymer backbone with a particular ratio of 4,4'-methylenebis(phenyl urea) (MPU) and isophorone bisurea (IU). In such aspects, the first moieties include 4,4'-methylenebis(phenyl urea) (MPU) and the second moieties include isophorone bisurea (IU), although embodiments are not so limited.

The self-healing elastomer has been described in U.S. Patent Publication No. 2019/0106544A1, the contents of which are incorporated herein by reference in its entirety.

The interpenetrating networks (IPN) hydrogel composition comprises a first polymer network that is covalently crosslinked and a second polymer network that is ionically or physically crosslinked.

In certain embodiments, the first polymer in the first polymer network of the composition of the invention is selected from the group consisting of polyacrylamide, poly (hydroxyethylmethacrylate) (PHEMA), poly(vinyl alcohol) (PVA), polyethylene glycol (PEG), polyphosphazene, collagen, gelatin, poly(acrylate), poly(methacrylate), poly (methacrylamide), poly(acrylic acid), poly(N-isopropylacrylamide) (PNIPAM), poly(N,N-dimentylacrylamide), poly(allylamine) and copolymers thereof. In one embodiment, the first polymer is polyacrylamide.

The IPN hydrogel may be biodegradable or non-biodegradable. The covalent crosslinking agent of the first polymer network may be non-biodegradable or biodegradable. In certain embodiments, the first polymer network comprises a first polymer that is covalently crosslinked with a covalent crosslinking agent selected from the group consisting of N,N-methylenebisacrylamide (MBAA), a methacrylate crosslinker, N,N'-dicyclohexylcarbodiimide (DCC), 1-ethyl-3-(3-dimethylaminopropyl)carbodiimide (ECC), N-hydroxysuccinimide, N-hydroxysulfosuccinimide, glutaraldehyde, and a transglutaminase. In one embodiment, the covalent crosslinking agent is N,N-methylenebisacrylamide (MBAA). In other embodiments, the first polymer network comprises a first polymer that is covalently crosslinked with a biodegradable covalent crosslinking agent selected from the group consisting of a poly(ethylene glycol) acrylate, a gelatin acrylate, a hyaluronic acid acrylate, an alginate acrylate, and poloxamer (PEG-PPG-PEG) diacrylate. In one embodiment, the biodegradable covalent crosslinking agent is selected from the group consisting of a poly(ethylene glycol) diacrylate (PEGDA), a gelatin methacrylate (GelMA), a methacrylated alginate (AlgMA), hyaluronic acid methacrylate, and poloxamer (PEG-PPG-PEG) diacrylate. In one embodiment, the biodegradable covalent crosslinking agent is a PEGDA having a molecular weight of about 250 to about 20,000 Da.

In certain embodiments, the first polymer network comprises a first polymer that is covalently crosslinked with a biodegradable covalent crosslinking agent selected from the group consisting of a poly(ethylene glycol) acrylate, a gelatin acrylate, a hyaluronic acid acrylate, an alginate acrylate, and poloxamer. The biodegradable IPN hydrogel has been described in WO2020/077173, the entire contents of which are incorporated herein by reference.

In some embodiments, the second polymer in the second polymer network of the composition of the invention is selected from the group consisting of alginate, pectate, carboxymethyl cellulose, oxidized carboxymethyl cellulose, hyaluronate, chitosan, κ-carrageenan, ι-carrageenan and λ-carrageenan, wherein the alginate, carboxymethyl cellulose, hyaluronate chitosan, κ-carrageenan, t-carrageenan and λ-carrageenan are each optionally oxidized; wherein the alginate, carboxymethyl cellulose, hyaluronate chitosan, κ-carrageenan, t-carrageenan and λ-carrageenan optionally include one or more groups selected from the group consisting of methacrylate, acrylate, acrylamide, methacrylamide, thiol, hydrazine, tetrazine, norbornene, transcyclooctene and cyclooctyne. In one embodiment, the second polymer is alginate. Modified alginates, such as but not limited to the modified alginates, functionalized alginates, oxidized alginates (including partially oxidized alginates), and oxidized/reduced alginates described in US Publication Nos. US20170119892A1, US20180326073A1, the disclosures of which are both incorporated herein by reference in their entireties.

In some embodiments, the alginate comprises a mixture of a high molecular weight alginate and a low molecular weight alginate. In one embodiment, the ratio of the high molecular weight alginate to the low molecular weight alginate is about 5:1 to about 1:5, about 4:1 to about 1:4, about 3:1 to about 1:3, about 2:1 to about 1:2, or about 1:1. In a specific embodiment, the ratio of the high molecular weight alginate to the low molecular weight alginate is about 1:1.

In some embodiments, the second polymer network comprises a second polymer that is ionically crosslinked with an ionic crosslinking agent selected from the group consisting of $CaCl_2$, $CaSO_4$, $CaCO_3$, hyaluronic acid, and polylysine. In one embodiment, the ionic crosslinking agent is $CaSO_4$.

Further disclosures of IPN hydrogels may be found in U.S. Pat. No. 9,387,276B2, the contents of which are incorporated herein by reference in its entireties.

The viscoelastic insulate film is electrically insulate in nature. As used herein, the term "electrically insulate" refers to the property of a material that allows little to none electric current flow therethrough under the voltage for the application, in which the material is used. In some embodiments, the viscoelastic insulate film has an impedance that is at least about 10 times greater, e.g., about 20 times, about 50 times, about 100 times, about 200 times, about 500 times, about 1,000 times, or more, than that of the viscoelastic conductive track. In some embodiments, the viscoelastic insulate film has an electric resistance greater than at least about 1 MΩ, e.g., about 2 MΩ, about 5 MΩ, about 10 MΩ, about 20 MΩ, about 40 MΩ or more, between viscoelastic conductive track under hydrated condition. In certain embodiments, the viscoelastic insulate film has an electric resistance of about 2 MΩ to about 40 MΩ between viscoelastic conductive track under hydrated condition.

In some embodiments, the viscoelastic insulate film can self-heal. Accordingly, when the viscoelastic conductive track is place between two viscoelastic insulate films, the two viscoelastic insulate film "self-heal," i.e., seal between the two viscoelastic insulate films, thereby insulating the viscoelastic conductive track from other viscoelastic conductive track and/or tissue.

In some embodiments, the viscoelastic insulate film is covalently bonded to the viscoelastic outer layer. The viscoelastic insulate film can be covalently bonded to the viscoelastic outer layer using suitable chemistry. In some embodiments, the viscoelastic insulate film is covalently bonded to the viscoelastic outer layer using carbodiimide chemistry. In certain embodiments, the viscoelastic insulate film is covalently bonded to the viscoelastic outer layer using click chemistry.

To covalently bond the viscoelastic insulate film to the viscoelastic outer layer, the viscoelastic insulate film may further comprise a flexible polymer monomer, and the monomer is functionalized with appropriate functional group, e.g., amine group. The viscoelastic outer layer is treated to be reactive to the functional group, e.g., coated with EDC and sNHS. The functional group on the flexible polymer monomer reacts with the treated viscoelastic outer layer to create covalent bond.

In some embodiments, the viscoelastic insulate film comprises polydimethylsiloxane which is then physically entangled with amine-terminated PDMS monomer to provide surface-exposed amine groups to which the viscoelastic hydrogel, comprising alginate, e.g., the alginate hydrogel or the IPN hydrogel, with surface carboxyl groups could conjugate.

In some embodiments, both the viscoelastic insulate film and the viscoelastic outer layer are stretchable.

The thickness of the viscoelastic insulate film and the viscoelastic outer layer can be adjusted depending on the application. The viscoelastic outer layer can be of any appropriate thickness depending on the application. The viscoelastic outer layer may have about the same thickness to the viscoelastic insulate film. The viscoelastic outer layer may also be thinner or thicker than the viscoelastic insulate film. In some embodiments, the viscoelastic outer layer has a greater thickness than that of the viscoelastic insulate film. For example, the viscoelastic outer layer can have a thickness that is at least about 2 times, about 4 times, or about 10 times, or more of the thickness of the viscoelastic insulate film. The viscoelastic encapsulation composition may have a mechanical property this is more similar to the viscoelastic outer layer when the viscoelastic outer layer has a greater thickness than the viscoelastic insulate film. For example, the viscoelastic encapsulation composition may have an elastic modulus that is closer to the value of the viscoelastic outer layer and much lower than that of the viscoelastic insulate film on its own.

In some embodiments, the viscoelastic outer layer comprises a viscoelastic IPN hydrogel. The mechanical properties, such as viscoelasticity and stiffness, of the IPN hydrogel can be similarly adjusted as the viscoelastic hydrogel described elsewhere herein. By adjusting the amount/concentration of the crosslinking agent, e.g., calcium and the type of polymer, e.g., alginate that is used for making the IPN, the mechanical properties of the IPN hydrogel can be similarly modified.

In certain embodiments, the viscoelastic outer layer may further comprises an adhesive layer. As used herein, the term "adhesive layer" refers to a layer or a surface that is form by applying an adhesive polymer to a surface of the IPN hydrogel. The viscoelastic electrode array comprising an adhesive layer can adhere to a tissue.

In certain embodiments, the adhesive polymer in a composition in accordance with various aspects of the invention and embodiments thereof is a high density primary amine polymer. In one embodiment, the high density primary amine polymer is selected from the group consisting of chitosan, gelatin, collagen, polyallylamine, polylysine, and polyethylenimine. In a specific embodiment, the high density primary amine polymer is chitosan.

In some embodiments, the adhesive layer in a composition in accordance with the various aspects of the invention and embodiments thereof is attached to the IPN via a coupling agent. In some embodiments, the coupling agent comprises a first carboxyl activating agent, such as a carbodiimide. Non-limiting examples of carbodiimide include 1-ethyl-3-(3-dimethylaminopropyl)carbodiimide (EDC, EDAC or EDCI), dicyclohexylcarbodiimide (DCC) and diisopropylcarbodiimide (DIC). In some embodiments, the coupling agent further includes a second carboxyl activating agent. Non-limiting examples of the second carboxyl activating agent is selected from the group consisting of N-hydroxysuccinimide (NHS), N-hydroxysulfosuccinimide (sulfo-NHS), hydroxybenzotriazole (HOBt), dimethylaminopyridine (DMAP), Hydroxy-3,4-dihydro-4-oxo-1,2,3-benzotriazine (HOOBt/HODhbt), 1-Hydroxy-7-aza-1H-benzotriazole (HOAt), Ethyl 2-cyano-2-(hydroximino) acetate, Benzotriazol-1-yloxy-tris(dimethylamino)-phosphonium hexafluorophosphate (BOP), Benzotriazol-1-yloxy-tripyrrolidino-phosphonium hexafluorophosphate, 7-Aza-benzotriazol-1-yloxy-tripyrrolidinophosphonium hexafluorophosphate), Ethyl cyano(hydroxyimino)acetato-O2)-tri-(1-pyrrolidinyl)-phosphonium hexafluorophosphate, 3-(Diethoxy-phosphoryloxy)-1,2,3-benzo[d]triazin-4(3H)-one, 2-(1H-Benzotriazol-1-yl)-N,N,N',N'-tetramethylaminium tetrafluoroborate/hexafluorophosphate, 2-(6-Chloro-1H-benzotriazol-1-yl)-N,N,N',N'-tetramethylaminium hexafluorophosphate), N-[(5-Chloro-1H-benzotriazol-1-yl)-dimethylamino-morpholino]-uronium hexafluorophosphate N-oxide, 2-(7-Aza-1H-benzotriazol-1-yl)-N,N,N',N'-tetramethylaminium hexafluorophosphate, 1-[1-(Cyano-2-ethoxy-2-oxoethylideneaminooxy)-dimethylamino-morpholine]-uronium hexafluorophosphate, 2-(1-Oxy-pyridin-2-yl)-1,1,3,3-tetramethylisothiouronium tetrafluoroborate, Tetramethylfluoroformamidinium hexafluorophosphate, N-Ethoxycarbonyl-2-ethoxy-1,2-dihydroquinoline, 2-Propanephosphonic acid anhydride, 4-(4,6-Dimethoxy-1,3,5-triazin-2-yl)-4-methylmorpholinium salts, bis-Trichloromethylcarbonate, and 1,1'-Carbonyldiimidazole. Further disclosures of IPN hydrogels with adhesive layer may be found in US Patent Publication No. 20190091367A1 and International Patent Application Publication No. WO 2020/077173, the contents of each of which are incorporated herein by reference in their entireties.

III. Methods of the Invention

A. Methods of Making Viscoelastic Electrode Array

The present invention provides methods of making a viscoelastic electrode array of the invention. The methods for making the components of a viscoelastic electrode array is described elsewhere herein, such as in the description of the compositions of the invention and the Examples.

In some embodiments, a viscoelastic electrode array comprises a first viscoelastic outer layer, a first viscoelastic insulate film, at least one viscoelastic conductive track with an electrode, a second viscoelastic insulate film, and a second viscoelastic outer layer. The method of making such an exemplary viscoelastic electrode array is exemplified in FIG. 17.

As shown in FIG. 17, to make one or more exemplary viscoelastic conductive tracks with an electrode, a plastic positive mold of one or more the viscoelastic conductive tracks were 3D printed. A soft elastomer material, such as Ecoflex 0030, is casted on the positive mold to make a flexible, negative of the mold to pattern the viscoelastic conductive tracks. The flexible, negative mold is release from the positive mold and filled with materials for making the viscoelastic conductive material of the invention, such as alginate polymers and crosslinking agents mixed with conductive fillers. The filled mold is moved to the freezer and lyophilized to crosslinking the polymers to create a microporous viscoelastic conductive composite, such as a viscoelastic conductive composite comprising the conductive fillers incorporated in the alginate hydrogel. Alternatively, the crosslinking takes place under room temperature to create nanoporous gels.

To make an exemplary viscoelastic encapsulation composition, viscoelastic outer layer, e.g., tough gel and viscoelastic insulate films, e.g., physically entangled viscoelastic insulate films (PEVM), are first made. The viscoelastic insulate film is covalently bonded to the viscoelastic outer layer using suitable chemistry, e.g., carbodiimide chemistry. Openings are created on the first viscoelastic encapsulation composition (the top encapsulation layer) at particular sites using a suitable method, e.g., laser etching. The viscoelastic conductive tracks are transferred onto the viscoelastic insulate film side of the second viscoelastic encapsulation composition (the bottom encapsulation piece). The first viscoelastic encapsulation composition is aligned on the viscoelastic conductive tracks, such that the electrodes are exposed. A connector can be added to the electrodes.

B. Method of Using Viscoelastic Electrode Array

The present invention provides methods of using a viscoelastic electrode array of the invention to detect a signal of a tissue, comprising contacting the viscoelastic electrode array of the invention with the tissue. The signal of the issue can be an electric signal or any signal that can be converted to an electrical signal.

In some embodiments, the issue is selected from the group consisting of central nervous system, peripheral nervous system, cardiac tissue, musculoskeletal tissues and skin.

IV. Kits

Any of the compositions described herein may be comprised in a kit. In a non-limiting example, the kit comprises an viscoelastic conductive composite of the invention. In certain embodiments, the kit includes an viscoelastic conductive track. In some embodiments, the kit includes the viscoelastic electrode array described elsewhere herein. In a non-limiting example, the kit includes a device including a viscoelastic electrode array, and other reagents and/or instrument for electrophysiological recording.

The kit may further include reagents or instructions for electrophysiological recording using the viscoelastic electrode array described elsewhere herein.

The components of the kits may be packaged either in aqueous media or in lyophilized form. The container means of the kits will generally include at least one vial, test tube, flask, bottle, syringe or other container means, into which a component may be placed, and preferably, suitably aliquoted. Where there are more than one component in the kit (labeling reagent and label may be packaged together), the kit also will generally contain a second, third or other additional container into which the additional components may be separately placed. The kits may also comprise a second container means for containing a sterile, pharmaceutically acceptable buffer and/or other diluent. However, various combinations of components may be comprised in a vial. The kits of the present invention also will typically include a means for containing the compositions of the invention, e.g., the viscoelastic electrode array, and any other reagent containers in close confinement for commercial sale.

When the components of the kit are provided in one and/or more liquid solutions, the liquid solution is an aqueous solution, with a sterile aqueous solution being particularly preferred. However, the components of the kit may be provided as dried powder(s). When reagents and/or components are provided as a dry powder, the powder can be reconstituted by the addition of a suitable solvent. It is envisioned that the solvent may also be provided in another container means.

The present invention is further illustrated by the following examples, which should not be construed as limiting. The entire contents of all of the references cited throughout this application are hereby expressly incorporated herein by reference.

EXAMPLES

Example 1. Materials and Methods

The following Materials and Methods were used in the studies described in Examples 2-5.

Animal tissue samples. Sprague Dawley rats (females, 24 weeks of age, Charles River Lab) were euthanized in compliance with National Institutes of Health and institutional guidelines. Hearts were explanted immediately after euthanasia and rinsed with 1× phosphate-buffered saline (PBS, Gibco ThermoFisher), before being tested with a Discovery HR-2 rheometer (TA Instruments). Young lamb (6-8 weeks of age) whole brains were obtained from the local butcher shop, within 2 hours of the animal being sacrificed. Samples were kept at room temperature and tested within 12 hours of purchasing the tissue.

Preparation of the alginate hydrogel substrates. Sodium alginate with a high molecular weight (Protanal LF 10/60) was purchased from FMC Biopolymer and used to prepare the ionically crosslinked alginate gels (Rowley, J. A., et al. Alginate hydrogels as synthetic extracellular matrix materials, *Biomaterials* 20, 45-53 (1999).), as well as the tough interpenetrating networks (Sun, J. Y. et al. Highly stretchable and tough hydrogels. *Nature* 489, 133-136 (2012)), both as have been described previously. Briefly, ionically crosslinked alginate hydrogels were prepared by dissolving sodium alginate in deionized water to yield a 2% weight/volume (w/v) solution of the alginate. A 0.75 M calcium sulfate (calcium sulfate dihydrate ≥99%, Sigma-Aldrich C3771) slurry was mixed with an appropriate amount of the alginate solution, and the resulting solution cast between glass plates with a thickness of 1 mm, or in a machined polycarbonate mold (McMaster Carr). The tough gel network was prepared by mixing a pre-gel solution consisting of 12% wt. PAAm (polyacrylamide, Sigma-Aldrich 738743), 2% wt. sodium alginate, 0.34% wt. MBAA (N,N-methylenebisacrylamide, Sigma-Aldrich 146072), 0.076% wt. TEMED (N,N,N',N'-tetramethylethane-1,2-diamine, ThermoFisher Scientific 110-18-9), with a solution of 0.75 M calcium sulfate slurry and APS (ammonium persulfate, Sigma-Aldrich A3678). The components were thoroughly mixed and cast into an acrylic mold (McMaster Can) that was machined to have rectangles of defined thicknesses, ranging from 100 um to 1 mm. Hydrogels were immediately covered with a glass plate (McMaster Carr) coated with an adhesive Teflon sheet (3M) and left in a sealed environment for at least 6 hours to fully crosslink. After crosslinking was complete, the gels were removed from the mold and left in a 2 mM solution of calcium chloride (calcium chloride dihydrate, Sigma-Aldrich 208290) to swell for 30 minutes, then rinsed with deionized water, and finally stored in a petri dish sealed with parafilm.

For cell culture studies, sterile alginate (LF 10/60) was used to fabricate gels. For certain studies, the polymer was irradiated by a 5 Mrad cobalt source to produce lower-molecular weight (MW) alginate, as previously described (Rowley, J. A., et al., supra). RGD-alginate was prepared by coupling the oligopeptide GGGRGDSP (Peptides International) to the sterile high-MW and low-MW alginate using carbodiimide chemistry, as previously described (Chaudhuri, O. et al. Hydrogels with tunable stress relaxation regulate stem cell fate and activity. 15, 326-334 (2016)), and the final obtained material was dried, stored at −20° C. until further use. To form substrates for cell experiments, alginate was weighed into separate sterile scintillation vials. An appropriate media (AGM for astrocyte experiments, PNGM for neuron experiments) was added to each vial so that the concentration of the alginate was 2.5% w/v. A stir bar was added to each vial, and the vials were left overnight on a stir plate to allow the contents to dissolve completely.

Sterilized calcium sulfate slurry was added to a sterile scintillation vial as well, and diluted 5× in the corresponding media. Using a P1000 tip, 800 μl of alginate dissolved in AGM was dispensed into the nozzle of a 3 ml syringe (BD Disposable Syringe, Fisher Scientific). In a second 3 ml syringe, calcium slurry and a respective amount of media was added so that the total volume of the syringe was 200 μl. More calcium sulfate was added for the stiff (8 kPa) gels, and less for the soft (1 kPa) gels. The contents of were mixed 6 times, and then the gels were deposited between two glass slides, with a thickness of 1 mm, and allowed to crosslink for 2 hours. Disks of the hydrogel were fabricated with an 12 mm biopsy punch, and transferred to well plates which were prefilled with the respective media. After an hour, the gels had reached equilibrium and the medium was exchanged.

The Matrigel-alginate interpenetrating network gels were fabricated as previously described (Chaudhuri, O. et al. Extracellular matrix stiffness and composition jointly regulate the induction of malignant phenotypes in mammary epithelium. *Nat. Mater.* 13, 970-978 (2014)). Briefly, reduced growth-factor, phenol-free Matrigel (Corning, lot number 0083005) was thawed on ice in 4° C. for 5 hours. Alginate dissolved in PNGM was aliquoted into 1.7 ml sterile Eppendorf tubes and kept on ice, such that the total volume of the alginate and Matrigel would be 800 µl and the final concentration of Matrigel would be 5 mg/ml. Using a P1000 tip, an appropriate amount of Matrigel was added to each tube containing alginate and the contents were pipetted up and down 30 times, slowly, so that no air bubbles would be introduced. The tube was kept on ice to prevent thermal gelation of the Matrigel. Calcium sulfate and PNGM were added to a syringe, and stored on ice. The alginate-Matrigel mix was added to pre-chilled syringes, slowly, with a P1000. A Luer lock was used to couple the two syringes, and the contents mixed 6 times before immediately dispensing on a plastic Petri dish. A glass slide was used to flatten the gel and create a uniform surface. The gels were left in an incubator at 37° C. to completely crosslink. A 8 well Millicell EZ slide (Millipore) was taken apart in aseptic conditions, and the 8 well plastic grid was stored in a sterile petri dish. The plastic grid was used to punch out gels from the bulk alginate-Matrigel, and each gel was placed into a single well of a new, sterile Millicell EZ slide, so that there were 4 gels for each condition. 200 µl of media was added to each well, so that the gels could reach equilibrium. After one hour, the media was fully exchanged and the gels were left in an incubator overnight.

Preparation of agarose brain samples. MRI data from a healthy porcine brain (used with permission of NeuroScience Associates of Knoxville, Tennessee NSALabs.com, April 2018) was used to print a plastic version of the tissue (Formlabs Form 2 3D printer, Formlabs standard resin). Ecoflex 0030 (Smooth-On, Reynolds Advanced Materials) was molded around the printed plastic and left overnight to fully crosslink. The plastic printed mock brain was removed from the mold, leaving the negative mold composed of the elastomer. Agarose powder (≥99%, Sigma-Aldrich 9012-36-6) was mixed with water to make a 0.25% w/v solution, and microwaved three times, before being cast in the negative mold. The mold and agarose were left at 4° C. to allow the agarose to crosslink, and the agarose model was then removed from the mold. In certain studied, a drop of food coloring dye (McCormick, local grocery store) was added to the agarose solution before casting to provide contrast.

Assessing substrate color conformability and movement. Yellow agarose porcine brain models were prepared as described above. Alginate gels were prepared as per above, and dyed by dispensing a layer of water with blue hydrophilic dye (McCormick food coloring, from the local grocery store) directly onto the gels. Ecoflex 0030 films were spin coated spin coated (Laurell Technologies, Model WS-650-23) at 400 rpm to create films that were ~100 µm in diameter. Polyimide films of 25 µm were purchased (DuPont Kapton) and were cleaned by washing the surface 3 times with methanol (Sigma-Aldrich), followed by 3 times with water, and then left to dry. All substrate materials were laser cut to 10 mm×20 mm rectangles. The Ecoflex and polyimide were colored by painting a uniform layer of the blue hydrophobic silicone pigment (Smooth-On, Reynolds Advanced Materials) on the surface. All 3 substrate materials were subsequently implanted at two locations of the brain models: one at the anterior portion of one hemisphere at a region of low radius of curvature, and the second around the posterior portion of one hemisphere at a region of high radius of curvature. Every sample was placed medially-laterally, that is starting at the midline side and gently lowering towards the lateral portions of the brain. At all times, the tweezers used to handle the substrates were at the lateral end of the substrates and every sample was lowered onto the models with no adjustments nor application of pressure to conform.

The alginate substrates were placed, left in place for 90 seconds; the minimum amount of time needed to place and photograph. The Ecoflex and polyimide samples were left on the agarose brain for 5 minutes to allow ample time for dye transfer to the underlying brain models. The area of close contact between a substrate and brain model was determined by removing the substrates and quantifying the extent of blue dye transfer from the substrate to the brain model; the number of blue pixels present on images of the brain model was assessed with ImageJ, and compared relative to a control sample subject to no placement of substrates.

To explore long-term movement and conformability, substrates of alginate (300 µm) and Ecoflex 0030 (150 µm) were prepared, with the thicknesses chosen so the bending stiffness of each substrate, D, $$D = \frac{Eh^3}{12(1-v^2)}$$

was approximately the same. Table 1 below shows the bending stiffness calculation of plastic, elastic and viscoelastic films.

TABLE 1

| Bending stiffness calculation of plastic, elastic and viscoelastic films. | | | |
|---|---|---|---|
| Material | Thickness, h (µm) | Elastic modulus, E (kiloPascals, kPa) | Bending stiffness, D (Pa m³) |
| Ecoflex 0030 | 100 | 70 | $7.8 \times 10^{-9}$ |
| | 200 | 70 | $6.2 \times 10^{-8}$ |
| Polyimide | 25 | 2,000,000 | $3.5 \times 10^{-6}$ |
| Alginate | 100 | 1 | $1.1 \times 10^{-10}$ |
| | 250 | 1 | $1.7 \times 10^{-9}$ |
| PDMS Sylgard 184 | 100 | 2,000 | $2.2 \times 10^{-7}$ |

Each substrate material was randomly assigned for placement on a hemisphere (right or left) of the agarose brain models and placed on the posterior most portion of the brain. A hydrophobic dye was used to mark the original location of all corners of the substrate relative to the brain. Each agarose brain was placed in a petri dish, which was chosen so that when a lid was applied, the lid would be in contact with and gently compress the substrate film, as to mimic the skull. All dishes were sealed with parafilm and placed on an orbital shaker (VWR Digital Shaker), set at 37° C. and a speed of 100 rpm to mimic the micromotion of the brain. The dishes were left untouched for 14 days, after which the parafilm was removed and the brain models photographed with the substrates, and with the substrates removed. The substrates were also photographed upon removal from the brain models to determine if they flowed over the two weeks to conform to where they were placed.

Cell culture studies. Primary rat cortical astrocytes (Lonza, verified by the manufacturer to be negative for mycoplasma), were thawed and cultured in AGM (Astrocyte Growth Medium BulletKit, Lonza). Half of the medium was changed every 4-5 days until the cells reached 100% confluency. Primary rat cortical neurons (Lonza, E18,19, verified by the manufacturer to be negative for mycoplasma) were thawed before use. PNGM (Primary Neuron Growth Medium BulletKit, Lonza) was used to culture the cells, which were used directly after thawing.

Primary rat astrocytes (Lonza) in flasks were removed at P6, using 0.25% trypsin/EDTA (Sigma-Aldrich, washed once in AGM, resuspended in fresh AGM and seeded on top of the preformed gels a density of 40,000 cells/cm$^2$. The cells were left for 30 minutes in an incubator at 37° C. to begin to attach to the gels, after which the remainder of AGM was added to each well, dropwise and to the outer portion of the well avoid disruption to the attached astrocytes. The cells were imaged every day, for 5 days, with an upright light microscope.

Primary rat neurons (Gibco) were thawed directly before use, following manufacturer's guidelines, without centrifugation and by suspending the cells with gentle mixing by a P1000 pipette. Neurons were seeded on top of the preformed alginate-Matrigel IPN at a density of 62,500 cells/well (90,000 cells/cm$^2$). The cells were left for 15 minutes in an incubator at 37° C. to begin to attach to the gels, after which the remainder of NBM was gently added to each well, dropwise and to the corner of each well, so that the total volume of media was 400 Five hours after seeding the neurons, half the NBM was carefully removed and fresh 200 µl was added. The neurons were imaged every day, for 8 days, with an upright light microscope (EVOS).

Immunostaining. The astrocytes were incubated in 4% paraformaldehyde for 15 minutes at room temperature and washed several times using HBSS supplemented with 10 mM of CaCl$_2$. For antibody staining, the cells were permeabilized with 0.1% Triton X-100 in HBSS for 8 minutes, washed 6 times with HBSS with added calcium, and then incubated with blocking buffer (5% goat serum, 1% bovine serum albumin). Then, the cells and gels were incubated with an antibody against GFAP (Abcam, ab33922, concentration 1:300) overnight at 4° C. The next day, the samples were incubated with a fluorescently labeled secondary antibody (Alexa488, Abcam 1:500) for 1 hour at room temperature. Staining for cell nuclei was performed with Hoechst 33342 (concentration 1:1000) for 10 minutes, at which point the samples were transferred to slides. Mounting media (Prolong Gold Glass Antifade, Invitrogen) was added, and a coverslip placed on top of the gels. Images were taken with a Leica SP5×MP Inverted Confocal microscope at 4×, 10×, 20×, 40× oil, and 63× oil magnification. More than 10 random fields were taken per sample.

Fabrication of the viscoelastic insulation materials. Physically entangled viscoelastic material (PEVM) was used to fabricate the insulation materials. In brief, amine-terminated polydimethylsiloxane (NH$_2$-PDMS-NH$_2$, aminopropyl terminated polydimethysiloxane, 100-120 cSt, Gelest), methylenebis(phenyl isocyanate) (MPI, Sigma-Aldrich, 0.4 eq), and isophorone diisocyanate (IPDI, Sigma-Aldrich, 0.6 eq) were reacted as described previously to synthesize PDMS-MPU-IU, a robust self-healing material (Kang, J. et al. Tough and Water-Insensitive Self-Healing Elastomer for Robust Electronic Skin. *Adv. Mater.* 30, (2018)). Then, PDMS-MPU-IU was dissolved in chloroform (CHCl$_3$, anhydrous, ≥, 99%, Sigma-Aldrich) and placed on a shaker (ThermoFisher Scientific) overnight to create a uniform viscous solution. NH$_2$-PDMS-NH$_2$ monomer was dissolved in CHCl$_3$ and then added to the solution of dissolved PDMS-MPU-IU. The resulting solution was dispensed evenly onto the surface of a cleaned (methanol, Sigma-Aldrich), untreated polyethylene terephthalate (PET, Sigma-Aldrich) film and left to crosslink for three hours at room temperature under ambient conditions. Then, the film was placed in an oven at 65° C. to remove any traces of CHCl$_3$. The presence of exposed amine functional groups was confirmed using FTIR (Bruker Hyperion 3000 FTIR Microscope), for peaks around 3400 cm$^{-1}$.

Fabrication of the encapsulation materials. To fabricate the material used for both the bottom and top encapsulation pieces of the overall assembly, the tough gel and the PEVM film were covalently coupled using carbodiimide chemistry. EDC (N-(3-dimethylaminopropyl)-N'-ethylcarbodiimide hydrochloride, Sigma-Aldrich) and sNHS (N-hydroscysulphosucinimide, ThermoFisher Scientific) were combined in a 1:1 ratio and a 0.1M MES (2-(N-morpholino)ethanesulfonic acid, Sigma-Aldrich) buffer adjusted to pH 6 was added so that the concentration of each EDC and sNHS was 0.033 mg/µl. The resulting solution was dispensed onto the surface of the tough gel. The coated side of the tough gel was lowered onto the unmodified PEVM film and firmly pressed to remove any air bubbles. A glass slide was then placed on top of the hydrogels and the dish sealed with parafilm and left overnight. The attached PEVM-gels were released from the PET film subsequently and stored until further use.

Fabrication of the conductive gels. Both nanoporous and microporous conductive gels were fabricated and the initial steps of fabrication were the same. A solution of 2% w/v alginate was combined with either a pre-suspended aqueous solution of graphene flakes (GF, 1.39 mg/ml, produced by exfoliation of graphite with a pyrene compound, and characterized in a previous study (McManus, D. et al. Water-based and biocompatible 2D crystal inks for all-inkjet-printed heterostructures. *Nat. Nanotechnol.* 12, 343-350 (2017)), and/or carbon nanotubes (CNT, NC3100 Nanocyl). Once all additives were combined, the total contents were briefly vortexed and then placed in a sonicator bath (Grainger Industrial Supplies) for an extended time (>16 minutes). To form nanoporous gels, a dispensed amount of conductive gel solution was placed in a bath of 100 mM calcium chloride (calcium chloride dihydrate, Sigma-Aldrich) for a minimum of 15 minutes before rinsing with deionized water.

To fabricate the microporous conductive gels, MCG, the well-mixed solution is dispensed onto a clean surface and rapidly moved to a freezer (−20° C., or −80° C.). After 4 hours, the frozen gels are moved to a lyophilizer (Freezone, Labconco) and left overnight. Once removed from the lyophilization tube, the dried gels are crosslinked with 100 mM calcium nitrate (Sigma-Aldrich) in ethanol and left for at least 30 minutes. The gels are then rinsed with 100% ethanol and dried again.

To characterize the electrical behavior of the gels, 5 mm×15 mm×300 um conductive gels were cast in 3D printed molds (Stratasys printer, Objet 30 pro). To fabricate electrical tracks that were integrated in a complete device, the gels were cast in 3D printed molds that were 300 µm×15 mm×200 µm with a pad, 600 µm×4 mm, and 700 µm diameter electrodes.

Patterning the encapsulation layer. A Helix 75 W laser (Epilog CO2 Laser Cutter) was used to create openings of the encapsulation layer at the sites in which it was desired to have electrodes. The beam, 127 µm in diameter, was focused relative to the top-most layer of the sample to be cut, and the power was adjusted between 7-16% depending on the thickness of the layer, and the specific type of gel, with a speed at 30%, and a frequency of 420 Hz. All files were drawn in CoralDRAW (Graphic Design Software), and printed as hairline (vector) features. The power can be adjusted further to cut just the gel, or just the PEVM layer, while the speed and frequency are kept constant.

Assembly of the complete device. AutoCAD (Autodesk) software was used to design a positive mold of the electrical components (pads, tracks, and electrode sites) with the same dimensions as the final design. The track and pads were extruded 200 μm, while the electrode sites were extruded an additional 400 μm taller. Pieces were printed with a clear rigid photopolymer resin (PolyJet, Stratasys) using an Objet 30 pro 3D printer (Stratasys). A second piece with just the electrode sites was also designed, and the electrodes were extruded 5 mm. This "guard" piece was printed using a blue tough resin (Formlabs). All printed pieces were placed in an oven at 50° C. to completely dry before using. Uncross-linked PEVM solution was drop casted over the guard piece to form a thin layer around all the posts. After drying, the PEVM film was carefully peeled off to prevent any of the posts from breaking and to minimize the collapse of any of the PEVM channels.

Ecoflex 0030 (Smooth-On) was mixed in a 1:1 ratio of A:B, and a small amount of blue hydrophobic dye (Smooth-On, Silicone Pigment) was added. The Ecoflex was cast over the positive molds, and left at 65° C. to crosslink for two hours, at which time the elastomer was released from the 3D printed plastic to form a flexible negative mold of the design. Once the newly formed negative molds reached room temperature, the entire length of the tracks was filled with a uniformly suspended conductive gel formulation. As soon as the tracks of a mold were filled, the mold was either transferred to a freezer (for the MCG formulation) or flooded with a 100 mM calcium chloride solution to minimize the amount of additive separation. After the tracks were all crosslinked, using the NCG or the MCG method, the excess liquid was wicked away using a Kimwipe. The surface of the flexible mold was completely dried and then aligned with the PEVM-facing surface of the substrate housing material. By pressing gently on the flexible mold, and then slowly releasing the mold from the pad-to-elec-trode end, the crosslinked tracks were transfer printed onto the substrate. The PEVM guard piece was aligned over the elevated electrode sites, and pressed firmly onto the sub-strate piece to facilitate the adhesion of the two PEVM interfaces. A micropipette was used to carefully fill any spaces between the electrodes and the channels of the guard piece with the conductive gel formulation, and then a clean P10 tip was used to dispense a droplet of calcium chloride to crosslink the conductive gel to the electrode. Finally, a connector with a 1 mm pitch (designed by Laboratory Soft Bioelectronics Interface, EPFL) to match the pitch of the pads was aligned with the pads, and the encapsulation housing piece was aligned from the electrode sites, to the connector. The encapsulation layer covered the connector, and the assembled device was left for 24-48 hours to allow the PEVM layers to self-heal together. A large 2 mm×3 mm glass slide was left over the encapsulation piece to accelerate the self-healing process.

Mechanical testing. All tests were performed in ambient conditions. To measure the rheological properties of the tissue (lamb cortex, rat heart), and all synthetic materials (ionically crosslinked alginate, tough gel, agarose gels, conductive gel formulations), a Discovery HR-2 rheometer (TA Instruments) with a 20 mm flat plate geometry was used to test all samples with the same procedure file. The gap of the two plates was always greater than 2 mm (2430 μm on average), and all samples tested were trimmed as needed so that they did not spill over when compressed. The synthetic gels were cast in a 12 well non-tissue culture plate, as each of the wells were 20 mm in diameter. After setting the stage of the rheometer to 37° C. and waiting 10 seconds to reach equilibrium, a strain sweep test (at 1 Hz) was test on each sample followed by a frequency sweep test (at 0.5% strain).

No prestress was applied to any sample for any measure-ment If a sample failed to completely fill the gap spacing, it was discarded.

To evaluate the surface properties of the tissues and the hydrogels, a nanoindentator G200 (Keysight Technologies) with a flat punch (98 μm) tip was used. Once the tip was calibrated to a center block, the samples were placed in focus and at least 5 measurements per sample were taken, and no more than 10 measurements, to minimize potential effects of the sample drying. Each sample was placed onto a glass slide to facilitate movement and orientation during testing. After every 5 samples were tested, the tip was cleaned to remove any residues or aggregates from the previous samples.

Evaluation of the PEVM, Ecoflex, PEVM/TG composite, and tough gel films was also done with a tensile machine (Instron model 3342) with a 50N load cell. All samples were cut to the same gauge length of 5 mm, with a Helix 75 W laser (Epilog CO2 Laser Cutter) to minimize any edge roughness, at a power and speed level that prevented any damage to the film. Thin (25 μm) films of polyacrylic were placed on either side and at both ends of the rectangular samples to prevent slippage from the grips. First, the film was loaded on the upper grip fixture and then the Instron head was lowered until the bottom polyacrylic-covered portion of the sample fit into the lower grip fixture. After the films were secured, the load cell moved upwards at a rate of (1 mm/s) until the film fractured. The elongation (mm) and stress (MPa) were recorded. Using the initial linear region of the resulting stress-strain graph, the elastic modulus of each material was extracted.

Structural characterization. SEM of the samples was done using a Hitachi SU8230 Field Emission scanning electron microscope. The samples were completely dried, mounted on small SEM stubs (Ted Pella) with carbon tape (Ted Pella), and then 5 nm of Pt/Pd 80/20 (EMS 300T D Dual Head Sputter Coater, Quarum/EMS) was deposited on the surfaces at a current of 40 mA.

Porosity characterization. Conductive gels of various compositions were cast and crosslinked, predominately by the microCG method. The gels were placed in deionized water, and then onto a dry plastic dish to remove any excess water. The mass of the gels was measured in the hydrated state. Next, the water was wicked away with a Kimwipe to remove water from the pores. The gels were weighed again, and the difference in mass divided by the final mass gave the percentage porosity of the samples.

Resistance and conductivity characterization. The resis-tance of freestanding tracks with varying amounts of GF and/or CNT with dimensions of 400 μm×15 mm and a thickness of 200 μm was measured using a four-point probe method with a Hioki RM3544 Resistance Meter under ambient conditions. The conductivity was calculated using the following formula (Topsoe, H. *Geometric factors in four point resistivity measurement. Bulletin No.* 472-13. (1966)):

$$\sigma = \frac{s}{twR}$$

where $\sigma$ is the calculated conductivity (S/m), s is the spacing of the pins of the 4 point probe (2.54 mm), t is the thickness of the gel measured (250 μm), and w is the width of the gel (400 μm). To confirm the calculated $\sigma$ values, the resistance of a subset of larger samples (5 mm×15 mm×200 μm) was measured and the conductivity compared. Finally, molds with two large squares (8 mm×8 mm) connected by a thin track (300 μm in width) were filled with a subset of samples. Two L-shaped header pins (DigiKey) were cross-linked into each of the squares, and the sheet resistance of the thin line was calculated by connecting cable clips to each pin. The conductivity was then compared to the other two methods. A multimeter (Digilent Inc, Digikey) was used to measure the intertrack resistance using DC current.

Impedance characterization and cyclic voltammetry. A zero-insertion-force (ZIF) connector (designed by LSBI to match the pitch and dimensions of the corresponding ribbon cable connector) was connected to the free-end of the ribbon cable not connected to the device. The PalmSens4 (Palm-Sens, Netherlands) potentiostat was used to record the impedance of exposed electrode through the entire length of the electrical track (15-20 mm). The working electrode of the PalmSens was connected to a jumper cable that was able to clip to each respective pin of the ZIF. A platinum counter electrode (BioLogic) with a surface area of 0.7 $cm^2$ was used, and the device electrodes and counter were placed in a bath of PBS 1X. The impedance behavior was character-ized over a frequency sweep from 1 MHz to 1 Hz, with 10 points per decade. The PalmSens4 with the same set-up was also used to assess the electrode stability with cyclic volta-mmetry. 3 scans were performed at a rate of 0.1 V/s, with a range from −1V to 1V. This voltage range was increased to −4 to 4 V when determining the water window of some of the carbon-based conductive gel formulations.

Ageing of the arrays. Fully assembled arrays were placed in a Petri dish that contained PBS with 2 mM $CaCl_2$ (the $Ca^{2+}$ was added to prevent the alginate gels from dissoci-ating) and then sealed with parafilm to prevent the solution from drying out. After 84 days, the devices were removed and the impedance spectra and intertrack resistance were measured. The devices were placed such that the connector end, which plugs into the ZIF board, was not in contact with the saline solution, as this would have affected the function-ality of the pins.

A mouse was terminally anaesthetized and then intubated with a MiniVent ventilator for mice (Model 845). The fur was removed and blunt dissection performed to expose the muscle underneath. Each array was placed directly on top of the rib cage, and PBS was added to keep the array hydrated. The stroke volume was set to 250 μl and the stroke rate to 150-200 strokes min-1, and the array left for 90 min (~10,000 cycles) or 6 h (~100,000 cycles). Impedance spectra were measured after the cycling, and the impedance at 1 kHz was normalized to the impedance spectra at 1 kHz before cycling (Day 84/Day 0).

In vivo validation. All animal procedures were done in compliance with National Institute of Health and Institu-tional guidelines with approval by Harvard University Insti-tutional Animal Care and Use Committee, or the Veterinary Office of the canton of Geneva in Switzerland. For the cardiac studies, two 18 week old male mice were euthanized with $CO_2$ and then immediately placed on a warm pad with sterile gauze. The skin was cut slightly above the liver, and a cut was made along the sternum to completely expose the heart. A clean device was placed on the surface of the heart and connected to a custom-made PCB with 32 pins, into which the connector of the device was compatible. Clips were connected to the pins, and to the cut ends of a sensor cable electrode pad (CAB-12970 ROHS, SparkFun). The electrode cable connected to an AD8232 Heart Rate Monitor board (SparkFun), and the necessary pieces were soldered onto the board to create reliable electrical connections. The AD8232 Heart Monitor connected to a computer via USB connection, and a custom Matlab code was used to visualize and save each recording session. After the recordings, the files were processed using a custom Matlab code, with a Savitzky-Golay filter. The raw and filtered files were saved, and each EKG was superimposed, averaged, and saved. A control experiment was done by recording from the device in contact with air, and in contact with the exposed liver of the mouse.

The neural recordings were done in Geneva, Switzerland under the compliance with all relevant regulations. A W-Tg (Thy1-COP4/YFP) (NBRP 0685, Kyoto, Japan) transgenic female adult rat (~350 g body weight) was anesthetized with urethane (1.25 g $kg^{-1}$ body weight, dilution with saline) before being head-fixed into a stereotaxic frame (David Kopf Instruments). A small craniotomy was performed, and the described ECoG array was placed epidurally onto the cortical surface, such that the 8 electrodes were in intimate contact with the exposed tissue. The array had the same connector-PCB set-up described above, and the PCB was then connected to a pre-amplifier through a ZIF-clip head-stage adaptor (ZCA-OMN32, TDT). A diode-pumped solid-state blue laser (473 nm, Laserglow Technologies) was coupled with a FC/PC terminal, connected to a 200 μm core optical fiber (ThorLabs), to deliver optical stimulation. The fiber was placed at the center of the electrode grid, and positioned using a micromanipulator. A silver ground wire was fixed to the skull using a metallic screw. Optical stimulation was delivered through the transparent viscoelas-tic device, in order to stimulate the cortical surface. The laser frequency was 2 Hz, with a 5 or 10 ms duration, and the intensity varied from 35 to 90 mW. The differential record-ings triggered by the laser stimulation were performed with a custom code, implemented with a wireless amplifier sys-tem (Multichannel Systems Wireless W2100), at a sampling rate of 2 kHz, and a digital bandpass filter of 1-3000 Hz. The recorded signals were averaged over each individual optical pulse, across 13 recording sessions which were each ~2 minutes, and a heat map plotting the maximum intensity from each recorded channel was generated. The procedure was repeated for 2 viscoelastic arrays, changing the orien-tation of the device on the cortex as well as the location of the laser stimulation. A control experiment was done using an agarose model of a brain, and the set-up described above, to exclude any signal generation due to a photoelectric effect.

For the AEP measurements, a wild-type female adult rat (200 g body weight) was anaesthetized with a mix of ketamine (100 mg per kg body weight) and xylazine (10 mg per kg body weight, diluted with saline) before being head-fixed into a stereotaxic frame (David Kopf Instru-ments). After removing the temporal muscle, a small cran-iotomy was performed on the temporal lobe over the audi-tory cortex (anterior/posterior (A/P)=−2.7 to −5.8 mm, medial/lateral (M/L)=±6.4 to ±8.67 mm from bregma), the dura mater was removed and a smaller (three-electrode) viscoelastic ECoG device was placed subdurally onto the cortical surface such that the electrodes were in intimate contact with the exposed tissue. The ground was a metallic screw inserted over the frontal part of the brain through the skull. Differential recordings were performed with a wire-less amplifier system (Multichannel Systems Wireless W2100) at a sampling rate of 2 kHz over a frequency range of 1-90 Hz. The auditory stimulation was performed using a free-field speaker playing ~120 tone bursts at a frequency of 1 Hz (500 ms ON, 500 ms OFF) over multiple sessions varying the sound frequency (baseline, 1, 2, 5 and 10 kHz). The AEPs were averaged over all epochs per frequency to display the average and standard deviation for each experimental set. Three different sets of devices were tested sequentially.

For the muscular stimulation, C57BL/6J (Jackson Laboratory) 20-week-old female mice were anaesthetized with isoflurane and then cervically dislocated. The skin over the hindlimb was removed and the gastrocnemius exposed. An array was placed over the muscle and connected to a function generator (33210A, Keysight). A needle was inserted under the skin of the mouse. Pulses of 300 µs width and voltage intensities from 0 to 3 V were applied every 1, 2 or 5 s. The electrode that applied the stimulation was changed and/or the device was repositioned to stimulate either a single digit, the foot only, the ankle only, the entire limb (ipsilateral) only or both the ipsilateral and contralateral limbs. The stimulation was confirmed with at least three electrodes from three devices.

Statistical analysis. Statistical analysis was done with GraphPad Prism5 software. One-way ANOVA and Tukey HST post hoc tests were done to compare different conditions. 5-15 random fields of view, at least, for image comparisons were taken and quantified.

Example 2. Characterizing Tissues and Compatibility of Viscoelastic Conductive Materials Existing surface electrode arrays that monitor the electrophysiology of the brain and the heart do not match the mechanical properties of these tissues, leading to poor device conformability and significant inflammatory responses (Rubehn, et al. A MEMS-based flexible multi-channel ECoG-electrode array, *J. Neural Eng.* 6, 036003 (2009); Jackson & Zimmermann. Neural interfaces for the brain and spinal cord—Restoring motor function, *Nat. Rev. Neurol.* 8, 690-699 (2012); Conti, S. et al. First-in-human high-density endo-epicardial mapping and ablation through left minithoracotomy in a patient with unstable ventricular tachycardia requiring ECMO, *Hear. Case Reports* (2020) doi:10.1016/j.hrcr.2020.04.003; Boyle & Shivkumar, Epicardial interventions in electrophysiology, *Circulation* 126, 1752-1769 (2012); Tybrandt, K. et al. High-Density Stretchable Electrode Grids for Chronic Neural Recording. *Adv. Mater.* 30, (2018)); Hassler, C. et al. Polymers for neural implants. *J. Polym. Sci. Part B Polym. Phys.* 49, 18-33 (2011); Konerding, W. S., et al. New thin-film surface electrode array enables brain mapping with high spatial acuity in rodents. *Sci. Rep.* 8, 1-14 (2018)). Recent efforts focus on matching tissue stiffness (Lacour, S. P., et al. Materials and technologies for soft implantable neuroprosthesis. *Nat. Rev. Mater.* 1, (2016)), but all soft tissues exhibit viscoelasticity (Chaudhuri, O. et al. Hydrogels with tunable stress relaxation regulate stem cell fate and activity, 15, 326-334 (2016); Chaudhuri, O. et al. Extracellular matrix stiffness and composition jointly regulate the induction of malignant phenotypes in mammary epithelium, *Nat. Mater.* 13, 970-978 (2014); Budday, S. et al. Region- and loading-specific finite viscoelasticity of human brain tissue. *Pamm* 18, 3-4 (2018); Wang, Z. et al. Viscoelastic Properties of Cardiovascular Tissues in *Viscoelastic and Viscoplastic Materials* (InTech, 2016) doi:10.5772/64169), and this has not been addressed, to date, in the design of electrode arrays. It was demonstrated herein that exemplary multichannel electrode arrays according to the present invention, including the conductive track components, can be fabricated from viscoelastic conductive materials that match both the stiffness and stress relaxation behavior of neural and cardiac tissues. These arrays plastically deform to provide intimate contact with the underlying tissues, are compatible with interacting cells, exhibit high conductivity (>10 S/m), and allow for high precision monitoring of the electrical activity of both cardiac and neural tissues.

Figure 1A:
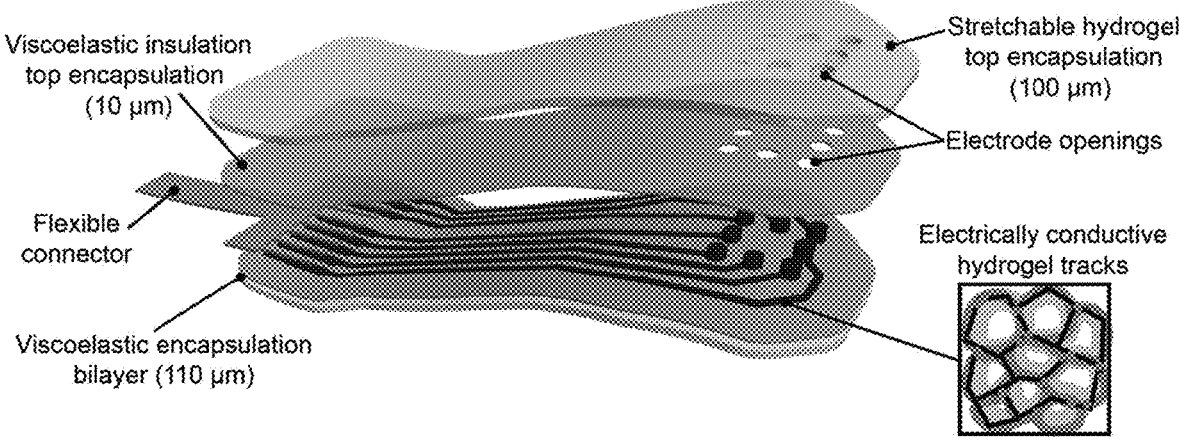
FIGS. 1A-1C are schematics depicting a viscoelastic surface array with tissue-compatible mechanics and electrical tracks composed of conductive hydrogels.
Figures 1B, 1C:
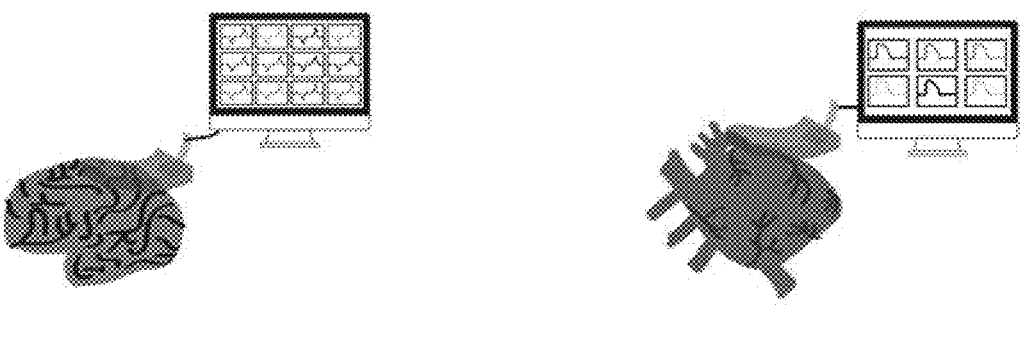

Implantable electrode arrays are widely used to record from and sense electrically active tissues, such as the brain and heart (Tolstosheeva, E. et al. A multi-channel, flex-rigid ECoG microelectrode array for visual cortical interfacing. *Sensors (Switzerland)* 15, 832-854 (2015); David-Pur, M., et al. All-carbon-nanotube flexible multi-electrode array for neuronal recording and stimulation, *Biomed. Microdevices* 16, 43-53 (2014); Luan, L. et al. Ultraflexible nanoelectronic probes form reliable, glial scar-free neural integration. Sci. Adv. 3, (2017). While intended to directly interface with tissues, existing devices are made from materials that have significantly different mechanical properties than organs. Previous studies have demonstrated that minimizing the mismatch in stiffness in turn reduces damage to underlying tissues (Lacour, et al., supra; Minev, I. R. et al. Electronic dura mater for long-term multimodal neural interface, *Science,* 347, 159-163 (2015)), yet all current arrays are elastic and have no viscous behavior. Tissues, particularly those in the nervous system, are instead viscoelastic, and unlike purely elastic materials, exhibit permanent deformations with applied stress (Budday, et al., supra; Wang et al., supra). It was hypothesized that one can fabricate fully viscoelastic arrays using electrically active viscoelastic tracks and electrodes that are surrounded by electrically insulating viscoelastic encapsulation layers (FIG. 1A). These fully viscoelastic arrays are expected to plastically deform to allow conformation to the complex geometry of soft tissues (FIGS. 1B and 1C), due to their ability to match the stiffness and viscoelasticity of contacting tissues.

Figures 2A, 2B:
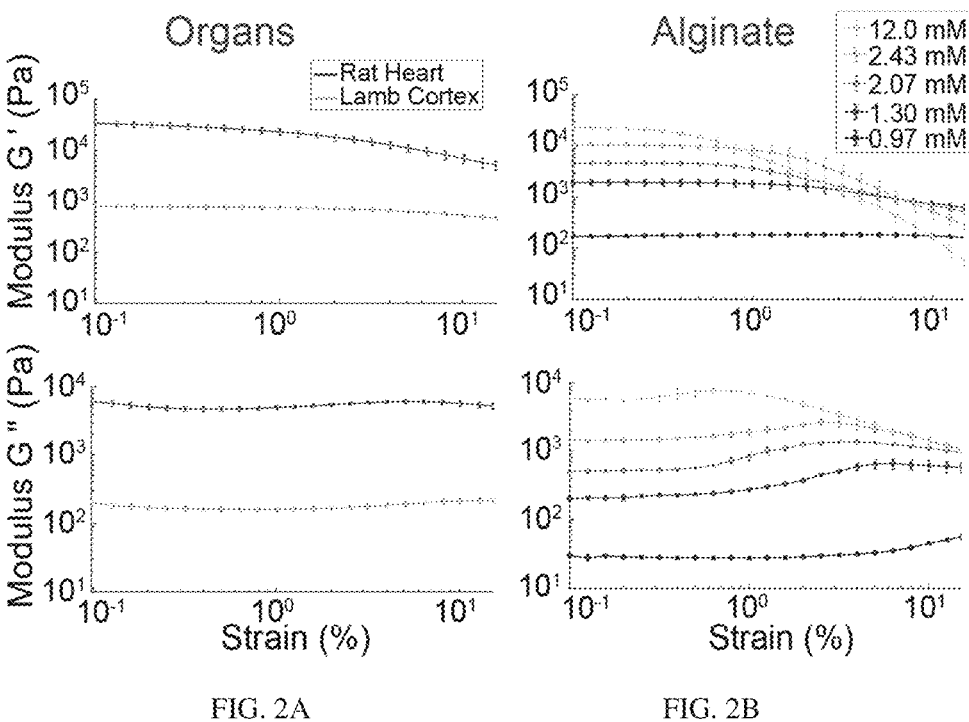
FIGS. 2A-2H are images and graphs depicting that an exemplary viscoelastic conductive material, i.e., alginate hydrogel, can match the viscoelastic properties of a tissue, e.g., the brain and the heart, conform to complex substrates, and are cell compatible.
Figure 3:
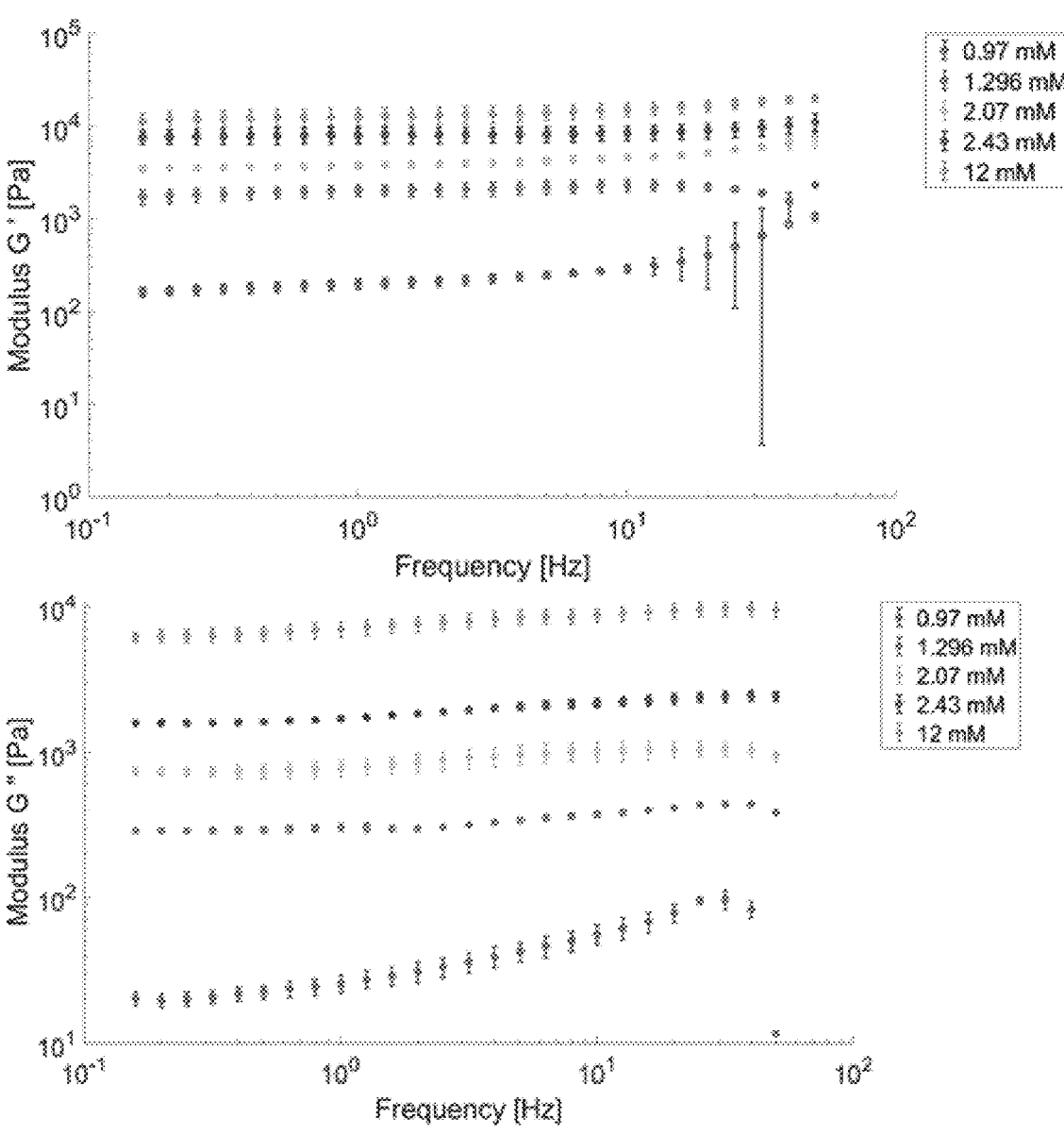
FIG. 3 includes graphs depicting the rheological properties of exemplary viscoelastic conductive materials, i.e., alginate gels: frequency sweep. Alginate gels with various concentrations of crosslinker were analyzed to determine G' (top) and G" (bottom) over a frequency sweep, at constant strain (0.5%). At higher frequency values, the softer gels exhibited slip with respect to the rheometer geometry and thus display variable properties.

The mechanical properties of fresh lamb brain and rat heart were first characterized as representative tissues to which the devices would be applied (FIG. 2A), and hydrogels then fabricated to match these viscoelastic properties (FIG. 2B). The storage modulus, G', was ~1 kPa at 0.1% strain for lamb cortex, while G' was ~30 kPa for rat heart; the loss modulus, G", for both tissues was approximately one order of magnitude lower, and both exhibited viscoelastic behavior as G' and G" were frequency dependent (FIG. 3). Hydrogels composed of alginate were used to match the viscoelastic properties of the tissues, as the value of G' could be tuned in a range from 100 Pa to 34 kPa by adjusting the crosslink density, and the gels exhibited a frequency dependent behavior (FIG. 3).

Figures 2C, 2D:
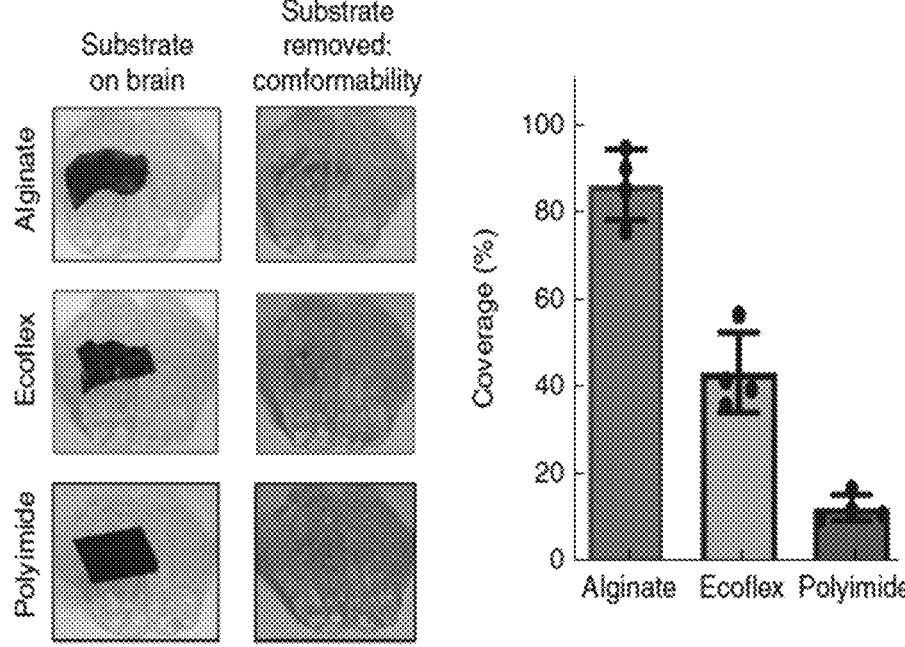

To determine the importance of the mechanical properties of devices on their ability to conform and provide close contact with tissues, substrates of plastic (polyimide), elastic (Ecoflex), and viscoelastic (alginate) materials with comparable values of bending stiffness (Table 1, supra) were each placed on a mock porcine brain made of agarose that exhibited similar mechanical properties to the fresh lamb brain (FIG. 4). The polyimide film did not conform to the underlying mock brain, while the Ecoflex substrate exhibited modest conformability. In contrast, the alginate substrate precisely followed the brain midline and conformed intimately around the site of placement (FIG. 2C). It was also easy-to-handle, remained smooth and did not fold over on itself. Inclusion of a surface dye on the substrates, prior to their placement, allowed their contact areas with the underlying brain model to be quantified via dye transfer. The alginate substrates exhibited a 2-fold increase in close contact, as compared to the other substrates (FIG. 2D). In addition to a higher area of close contact, the alginate substrates were able to contact many sulci of the brain. This assay was repeated using biological tissue instead of a mock brain, yielding similar results.

Figure 2E:
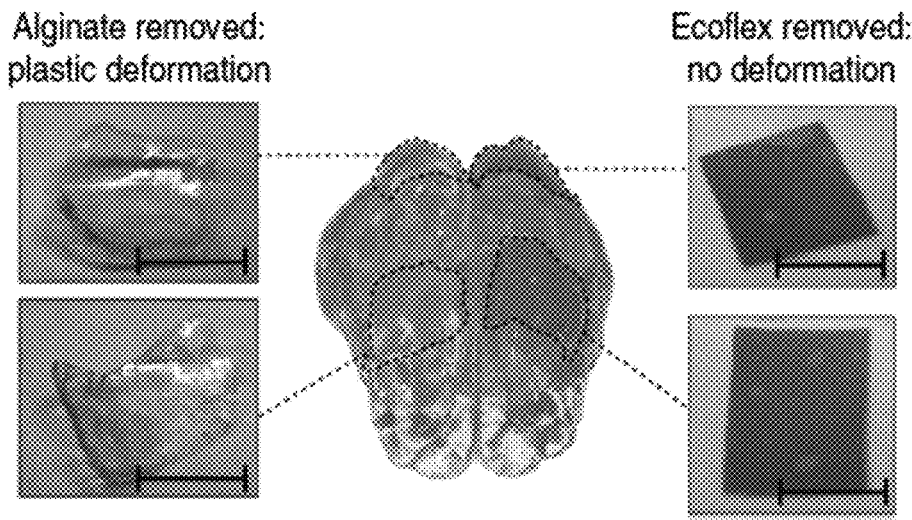
Figure 6A:
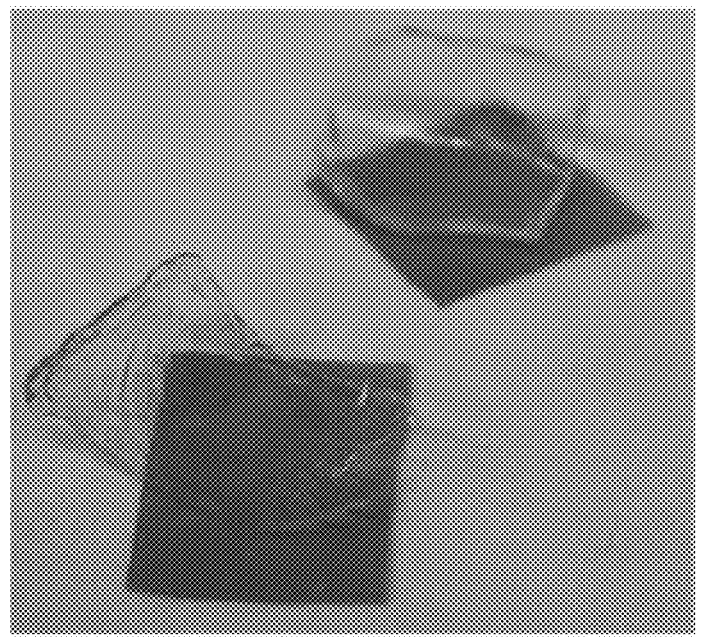
FIGS. 6A and 6B are images depicting substrates made from exemplary viscoelastic conductive material, e.g., alginate hydrogel, of the invention and elastic substrates removed from a mock agarose brain, and one hour later.
Figure 6B:
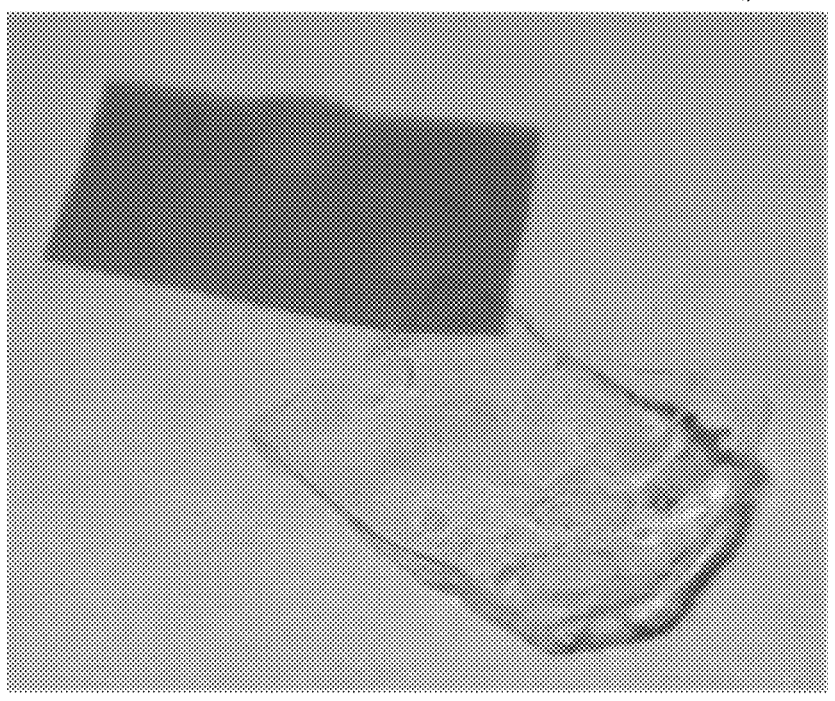

The ability of the elastomer and viscoelastic substrates to maintain contact over time without damaging the underlying mock tissues was subsequently compared. Two films of each substrate were planted on respective hemispheres of a mock brain, their initial positions marked, and then left on an orbital shaker for 2 weeks to mimic the micromotion of living tissues. At the end of the study, the alginate substrates had maintained their original locations, whereas the Ecoflex films had moved substantially and even delaminated from the gel surface (FIG. 5). There were no noticeable changes to either brain model hemisphere, suggesting that neither substrate resulted in significant compression of the underlying model tissues, likely due to the low bending stiffness of the substrates. Further, the Ecoflex film geometry was unchanged, as compared to its initial shape, upon removal from the brain model. However, the alginate film had plastically deformed to match the underlying geometry of each implantation site (FIG. 2E). A comparison of films initially placed on the posterior (smaller radius of curvature) and anterior (larger radius of curvature) portions of the brain confirmed the alginate film adjusted its shape according to the underling tissue. An hour post-removal from the brain and placement on a flat surface, the alginate had started to return to its initial shape (FIG. 6), and after 24 hours had recovered to its original dimensions. If a second gel was placed on top of the deformed gel, the recovery time was reduced to 3 h. The alginate substrate underwent over seven cycles of conformation and relaxation with no impact on the substrate.

Figure 2F:
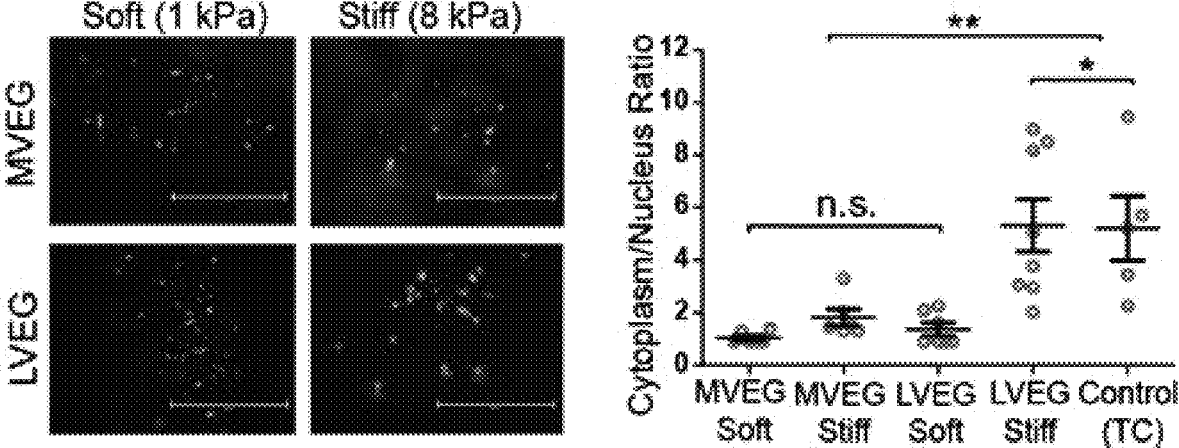
Figure 2G:
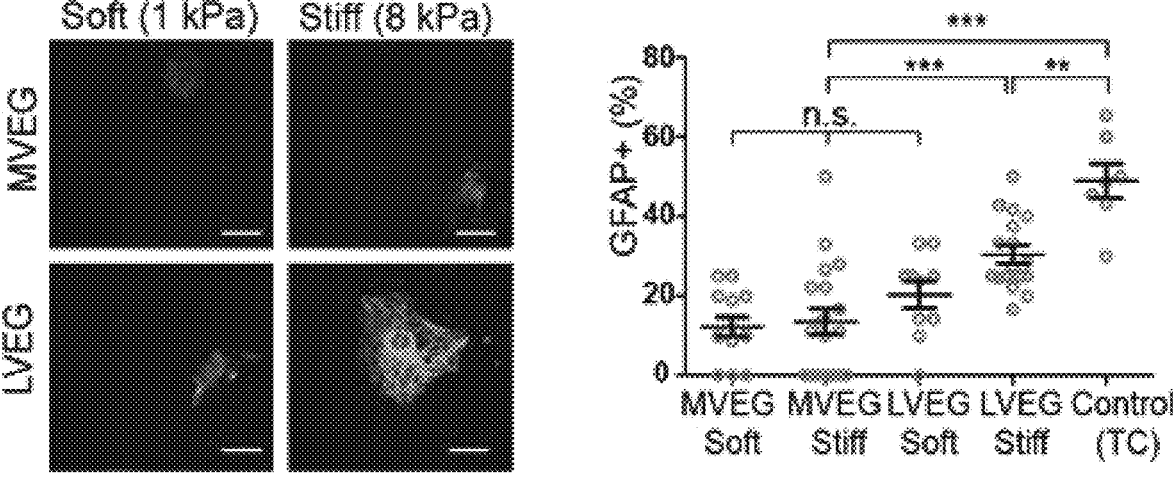
Figure 9:
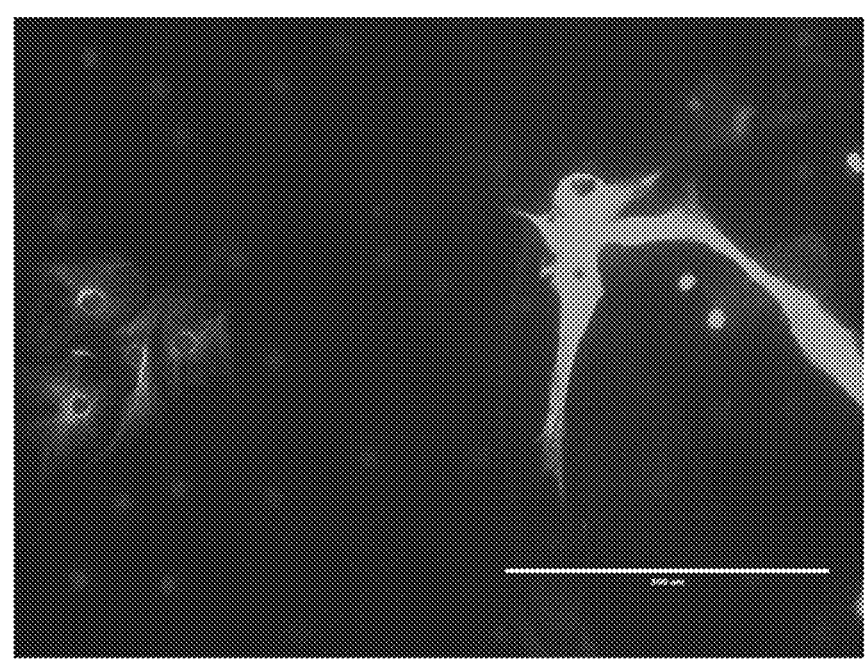
FIG. 9 is an image depicting astrocytes on tissue culture plastic (controls). Astrocytes grown on TC plastic were stained for GFAP and were imaged to evaluate percentage of activated astrocytes and ratio of cytoplasm to nucleus, respectively. Scale bars represents 200 μm.

Finally, to evaluate the importance of viscoelasticity of the substrate to contacting cells, neural cells were seeded on alginate hydrogels. By changing the molecular weight of the alginate polysaccharide, and the amount of crosslinker, RGD-alginate gels with lower (~1 kPa, soft) and higher storage moduli (~8 kPa, stiff), and less viscoelastic gels (LVEG, tan(δ)=0.13) and more viscoelastic gels (MVEG, tan(δ)=0.33) were fabricated (FIG. 7). Primary rat astrocytes were larger and had more processes on LVEG as compared to MVEG. Cells on LVEG morphologically resembled activated astrocytes on tissue-culture plastic control (FIG. 2F). Additionally, a larger fraction of the astrocytes on LVEG stained positive for glial fibrillary acidic protein (GFAP), compared to the cells on MVEG. The greatest percentage of GFAP-positive cells were found on plastic substrates. There were not significant differences for different gel stiffnesses with the same viscoelasticity, suggesting the viscoelasticity played a more important role than the magnitude of the elastic modulus in this cell response. In support of this possibility, the astrocyte cytoplasm to nucleus ratio (C:N) was calculated for cells on each substrate (FIG. 2G, FIG. 9). On the stiff LVEG, the astrocytes had a C:N comparable to those on tissue-culture plastic (control), whereas the cells on the softer cases and on more viscous gels, regardless of modulus, led to a significantly reduced C:N.

Figure 2H:
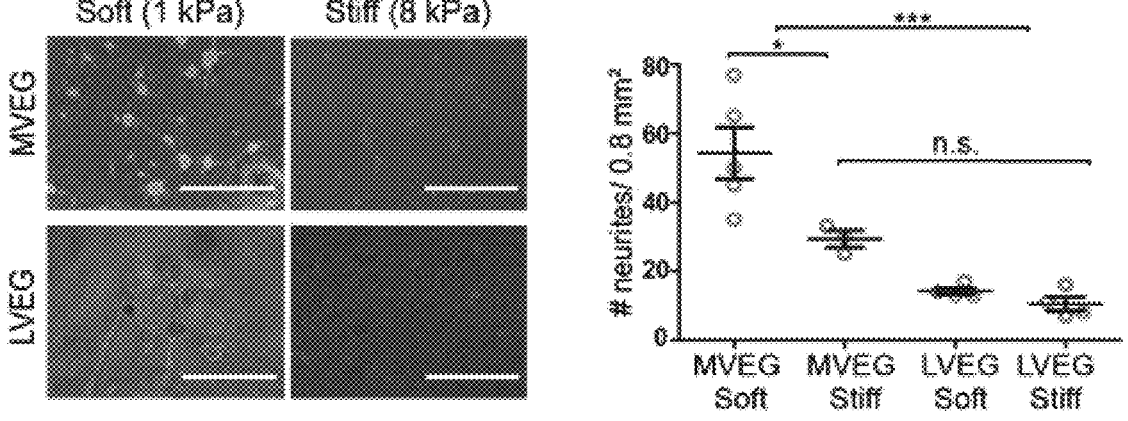
Figure 10:
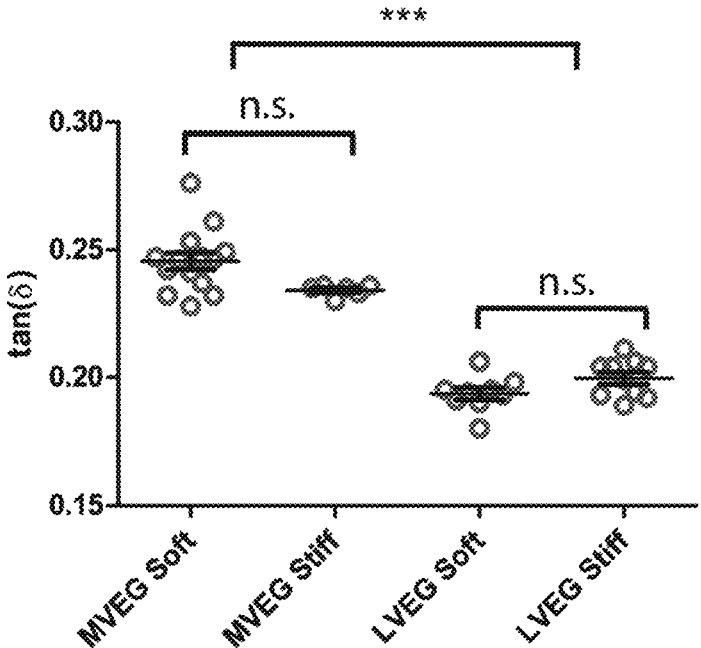
FIG. 10 is a graph depicting viscoelastic properties of an exemplary outer layer of the invention, high-molecular weight, low-molecular weight alginate-Matrigel interpenetrating networks (IPNs).

Similar studies were repeated with neurons, but as these cells did not adhere to purely RGD-alginate hydrogels, RGD-alginate-Matrigel interpenetrating networks (IPN) were used to probe the impact of viscoelastic substrate properties (Chaudhuri, O. et al. (2014), supra). As before, changing the molecular weight of the alginate and the amount of crosslinker in the gel resulted in LVEG and MVEG (FIG. 10). Primary neurons were found to significantly extend a higher density and longer neurites on the MVEG-soft gels within 72 hours of being seeded (FIG. 2H), and the MVEG-stiff gels had the next most expansive neurite network. Both MVEG substrates led to more neurites than either of the LVEG conditions, which again supports the relevance of matching the viscoelasticity of arrays to the underlying neural tissue and the use of soft MVEG for the surface array fabrication. Repeating these studies with a coculture of primary astrocytes and primary neurons led to similar findings.

Example 3. Fabrication and Characterization of a Viscoelastic Encapsulation Layer Based on the ability of viscoelastic gels to stably conform to model brain tissues, and their compatibility with neurons and astrocytes, a process to fabricate the encapsulation layer of the neural probes from viscoelastic substrates was developed. As the encapsulation layer must electrically insulate each electrode in the probes, and the ionically crosslinked alginate gels themselves do not provide electrical insulation, a thin (15 μm) layer of an insulating physically entangled viscoelastic material (PEVM) was covalently attached to a thicker (100 μm), alginate-based tough gel (TG) (Sun, et al., supra), such that the TG portions were the outermost layers and in direct contact with the tissue (FIG. 8A). The insulation layer is based on a previously reported self-healing polydimethylsiloxane (PDMS) (Kang, et al., supra), which was then physically entangled with amine-terminated PDMS monomer (Mn~5000) to provide surface-exposed amine groups to conjugate to the surface carboxyl groups of the TG (FIG. 12). The resulting films were highly deformable, as they could be strained to 1000% (FIG. 8B) and had an effective elastic modulus (E) that was 44 kPa, almost 20-fold less than that of pure PEVM films (FIG. 8C). These encapsulation materials had no detrimental impact on the viability of exposed astrocytes (FIGS. 13A and 13B). The encapsulation layers could be patterned with a $CO_2$ laser (Helix Epilog) to create openings at the desired electrode sites without compromising the attachment process of the two films. The patterned encapsulation layers could also be stretched without tearing at the interface of the laser patterned portions (FIG. 8B).

Example 4. A Novel, Ultra-Soft, Electrically Conductive and Highly Porous Hydrogel Preparation of the graphene flake dispersions. Aqueous 2D crystal dispersions were prepared via liquid-phase exfoliation in water, following the methodology developed in previous works. In short, graphite flakes were provided by Graphexel ltd, and 1-pyrenesulfonic acid sodium salt (PS1) (≥97.0%), were purchased from Sigma-Aldrich. For the preparation of the dispersions, 300 mg of bulk crystal powder was added to 100 mL of de-ionised (DI) water, in which 50 mg of PS1 was previously dissolved. The mixture was then sonicated at 600 W for 7 days using a Hilsonic bath sonicator. Afterwards, unexfoliated bulk material was removed by centrifuging the solution (Sigma 1-14 k refrigerated centrifuge) at 3500 rpm (903 g) for 20 minutes and afterwards collecting the supernatant containing well-dispersed nanosheets in water. The excess pyrene molecules are removed by 2-steps centrifugation (Sigma 1-14 k refrigerated centrifuge) at 15000 rpm (16 600 g) for 60 minutes. After each centrifugation step, the supernatant was removed and the sediment was re-dispersed in DI water. To increase the concentration, smaller volume of DI water was added to the sediment after the last centrifugation.

Characterization of the graphene flake dispersions. The final concentration of nanosheets in the dispersion was determined using UV-Vis spectroscopy. The Beer-Lambert law was used to derive the concentration by assuming an absorption coefficient of 2460 L $g^{-1}$ $m^{-1}$ at 660 nm for graphene. A Perkin-Elmer 1-900 UV-Vis-NIR spectrophotometer was used to acquire the spectra. The statistical lateral size and height distribution of the exfoliated nanosheets were measured using Atomic Force Microscopy (AFM). A Bruker Atomic Force Microscope (MultiMode 8) in Peak Force Tapping mode, equipped with ScanAsyst-Air tips, was used. The sample was prepared by drop casting the solution on a clean silicon substrate; several areas of 100 $\mu m^2$ were scanned and about 200 flakes were selected for lateral size analysis. Lateral dimension and thickness distributions of graphene nanosheets were carried out using Gwyddion scanning probe microscopy data processing software. Raman measurements were performed using a Renishaw Invia Raman spectrometer equipped with 514.5 nm excitation line and 2.0 mW laser power. Diluted 2D crystal dispersions were dropcast onto silicon substrates and measurements were performed on isolated and individual flakes. The Raman spectra were taken with a 100×NA0.85 objective lens and 2400 grooves/mm grating. The exfoliated 2D crystals were all showing characteristic peaks for each 2D crystal, demonstrating that no degradation of the 2D crystals occurred during sonication. Electrophoretic mobility ($\mu$) was measured using a ZetaSizer Nano ZS (Malvern Instruments, UK) after dilution of samples with water in the folded capillary cells (Malvern Instruments, UK). Default instrument settings for water-based system and automatic analysis were used for all measurements, performed at 25° C. and at the natural pH. All values for samples are mean±standard deviation (SD), calculated from triplicate measurements.

Next, electrically conductive and flexible tracks were fabricated from the soft MVEG alginate hydrogels. To enhance the intrinsic, but limited, ionic conductivity of the alginate gels, both graphene flakes (GF) and carbon nanotubes (CNT) were added to these gels. These high aspect ratio carbon additives were suspended in the viscous nanoporous alginate solution prior to gelation (FIG. 11A). To reduce the percolation threshold for the conductive particles, and thus minimize the weight fraction of these stiff additives, microporous gels were fabricated. The conductive gels were frozen after cast, and the polymer and additives form a concentrated network surrounding the ice crystals. Removal of the ice crystals leads to an interconnected porous structure, which is then crosslinked to preserve the conductive gel network. Both nanoporous (direct crosslinking with no cryo-processing) and microporous conductive gels (NCG and MCG, respectively) were readily cast using molds, resulting in tracks that could be placed at specific locations on fresh tissue, while conforming to match the complicated geometries of the sulci and the vasculature (FIG. 11B). The tracks could bend more than 180° without fracturing, tied into a knot without breaking, and remain in situ over multiple days (FIG. 14).

Scanning electron microscopy (SEM) revealed that the inclusion of GF and CNT altered the structure of both the NCG and MCG (FIG. 11C). In the NCG, the surface roughness increased with the addition of additives, and larger particle aggregates were apparent at higher quantities of carbon. The GFs were integrated into the walls surrounding the micropores of the MCG while the CNTs formed dense nodes throughout the MCG. When both were present in MCG, the GF appeared to connect the CNT bundles, improving the probability for a percolating high conductivity path. The microCG wall thickness was between 750 and 850 nm, which is smaller than the length of the CNTs and allowed CNTs to span multiple pores. The resulting high surface area of MCG is likely to be advantageous for interfacing with neurons.

The electrical behaviors of the NCG and the MCG were subsequently studied using 4-point probe resistance for gels that were 100 $\mu m$ thick (FIG. 15), and conductivity values calculated and compared for gels containing GF-only (FIG. 11D), CNT-only (FIG. 11E), and a combination of GF+CNT (FIG. 11F). For all cases, the MCG formulations were significantly more conductive than the NCG equivalents (p-value <0.0001). The nanoporous, CNT-only gels were too brittle to test, as they disintegrated when handled, and were thus excluded from testing. Conductivity values greater than 10 S/m, and as high as 35 S/m, could be achieved with MCG compositions with less than 2% carbon loading. All the GF+CNT compositions were plotted and fitted to a sinusoidal curve to estimate the percolation threshold (FIG. 11G), which for MCG occurred at ~0.9% carbon with a residual fitting parameter of $R^2$=0.89. Subsequently, to explore the relative electrical contribution of each additive in the MCG, conductivity was plotted (color) as a function of both GF and CNT content (FIG. 11H). As the amount of carbon additive increased, the conductivity tended to increase. The conductivity increased more significantly with rising CNT content (region I) than with increasing GFs (region II), but the conductivity increased faster and had less variability in GF+CNT gels (region III) than CNT-only gels. SEM images revealed that as more carbon was added, the total porosity of the gels was not significantly affected, but the distribution of pore size seemed to increase.

The various compositions were next assessed to determine how added carbon impacted their mechanical properties. Rheological analysis (FIG. 16) that bulk gel G' and G" were not affected in a statistically significant manner as carbon was varied from 0 to 1.4%, and nanoindentation analysis of the surface mechanical properties also indicated that neither G' (FIG. 11I) nor G" (FIG. 11J) were statistically altered in the MCG as carbon containing 0-2% carbon was added.

These measurements had a large standard deviation, and the nanoindenter tip could have been in contact with the wall or strut of the gel, a more porous area, or a region that could have been more/less rich with carbon-nanomaterial additives. The range presented here is more similar to the mechanics of heterogeneous tissues than other reported conductive composites, and the conductive components are in contact with the underlying tissue only at the electrode sites. Further, the conductive gels had no detrimental impact on the viability of exposed astrocytes (FIGS. 13A and 13B).

The viscoelastic conductive composite comprising metal conductive fillers was also assessed to determine how added metal particle impacted the mechanical properties. As shown in FIGS. 11K-11M, the viscoelastic hydrogels retain their viscoelastic nature after loaded with conductive metal microparticles. The pore structures of the viscoelastic hydrogels loaded with conductive carbon or metal microparticles were shown in FIGS. 11N-11P.

Example 5. Assembly of a Fully Viscoelastic Device and In Vivo Validation

To fabricate a fully viscoelastic and functional device (arrays), electrical tracks were integrated with the encapsulation layers by transfer-printing the extruded tracks onto the PEVM-side of the bottom encapsulation layer. An overlay-PEVM barrier was aligned to prevent the electrode sites from touching the exposed TG of the top encapsulation. This process is further described in FIG. 17. The completed device was viscoelastic and plastically conformed to tissues (FIG. 18A). Further, the conductive tracks could be fabricated with both stiffness and viscoelasticity that overlap with those of heart and brain tissue (FIG. 18B). This contrasts with previously described electrical composites, which typically exhibit much higher stiffness and do not exhibit the viscoelasticity of tissues even when fabricated to have a lower stiffness. Table 2 below summarizes values used to generate the 3D plot in FIG. 18B. The modulus, electrical properties, and degree of viscoelasticity are plotted as a range. References for each material type, grouped below by color, are included. Tissues (brain and heart) are plotted through the entire range of conductivity axis.

nanotubes in composites by melt processing methods. *Chem. Phys. Lett.* 330, 219-225 (2000); Chen, Y. et al. A Skin-Inspired Stretchable, Self-Healing and Electro-Conductive Hydrogel with a Synergistic Triple Network for Wearable Strain Sensors Applied in Human-Motion Detection. *Nanomaterials* 9, 1737 (2019).

The electrical behavior of devices was first characterized in a solution of phosphate buffer solution (PBS) with 2 mM of calcium chloride. Individual tracks had impedance between 30-600 $k\Omega$ at 1 kHz, and the values were dependent on the carbon additives used, electrode diameter, and interface with the connector. To normalize conductivity between tracks, they were subsequently cast in molds with deeper electrode sites and a flexible comb-like connector was used

TABLE 2

Conductive composites-composition, mechanical, electrical, viscoelastic properties.

| 3D Map<br>Qualitative Description | Conductivity, mechanics,<br>viscoelasticity<br>Reference | Mechanics (Pa) | | Conductivity (S/m) | | VE as tandelta | |
|---|---|---|---|---|---|---|---|
| | | Min | Max | Min | Max | Min | Max |
| Polyacrylamide +<br>laponite + PEDOT | Tondera, Small 2019 | 5 × 10E3 | 23 × 10E3 | 10.00 | 23.00 | 0.00 | 0.00 |
| Water-bome PU +<br>PEDOT:PSS | Kim, Nat Comm, 2020 | 800 × 10E3 | 7 × 10E6 | 10E-2 | 10E4 | 0.00 | 0.00 |
| PEDOT:PSS in ionic<br>liquid/plastic matrix | Wang, Sci Adv, 2017 | 60 × 10E6 | 1 × 10E9 | 10.00 | 10E5 | 0.00 | 0.00 |
| PEDOT:\PSS, Inonic<br>liquid, polyacrylic, PS | Feig, Nat Comm 2018 | 175 × 10E3 | 400 × 10E3 | 10.00 | 23.00 | 0.00 | 0.10 |
| Pedot:PSS + DMSO + H2O<br>"hydrogels" | Lu, Nat Comm, 2019 | 1 × 10E6 | 11 × 10E6 | 10.00 | 3 × 10E3 | 0.00 | 0.00 |
| PVDF + CNT or GF | Vicente, Materials, 2019 | 863 × 10E6 | 1.2 × 10E9 | 10E-5 | 10E-2 | 0.00 | 0.00 |
| Carbon black in<br>elastomer | Bhagavatheswaran, J<br>Phys Chem C, 2015 | 2 × 10E6 | 12 × 10E6 | 1.00 | 40.00 | 0.00 | 0.00 |
| SWCNT in PMMA | Haggenmuller, Chem<br>Phys Lett, 2000 | 3 × 10E9 | 7 × 10E9 | 10E-2 | 10E-2 | 0.00 | 0.00 |
| GF, PMMA or PDMS<br>(foams) | Chen, Nat Mat, 2011 | 2 × 10E6 | 3 × 10E6 | 8 × 10E-4 | 10E-3 | 0.00 | 0.00 |
| Cellulose + polyacrylic<br>acid + polypyrrole | Chen, Nanomat, 2019 | 30 × 10E3 | 100 × 10E3 | 1.00 | 3.00 | 0.00 | 0.13 |
| Alginate | This work | 100.00 | 10 × 10E3 | 8 × 10E-4 | 10E-13 | 0.15 | 0.50 |
| Carbon microporous<br>gels | This work | 5 × 10E3 | 50 × 10E3 | 1.00 | 40.00 | 0.15 | 0.37 |
| Brain | This work | 800.00 | 900.00 | 6 × 10E-2 | 1 × 10E1 | 0.33 | 0.40 |
| Heart | This work | 30 × 10E3 | 36 × 10E3 | 10E-4 | 10E-3 | 0.20 | 0.25 |

The previously described electrical composite were described in Tondera, C. et al. Highly Conductive, Stretchable, and Cell-Adhesive Hydrogel by Nanoclay Doping. *Small* 15, 1901406 (2019); Kim, N. et al. Elastic conducting polymer composites in thermoelectric modules. *Nat. Commun.* 11, 1424 (2020); Wang, Y. et al. A highly stretchable, transparent, and conductive polymer. *Sci. Adv.* 3, e1602076 (2017); Feig, V. R., et al., Mechanically tunable conductive interpenetrating network hydrogels that mimic the elastic moduli of biological tissue. *Nat. Commun.* 9, 2740 (2018); Lu, B. et al. Pure PEDOT:PSS hydrogels. *Nat. Commun.* 10, 1043 (2019); Vicente, J., et al., A. Electromechanical properties of PVDF-based polymers reinforced with nanocarbonaceous fillers for pressure sensing applications. *Materials* (*Basel*). 12, (2019); Chen, Z. et al. Three-dimensional flexible and conductive interconnected graphene networks grown by chemical vapour deposition. *Nat. Mater.* 10, 424-428 (2011); Bhagavatheswaran, E. S. et al. Construction of an Interconnected Nanostructured Carbon Black Network: Development of Highly Stretchable and Robust Elastomeric Conductors. *J. Phys. Chem. C* 119, 21723-21731 (2015); Haggenmueller, R., Gommans, H. H., Rinzler, A. G., Fischer, J. E. & Winey, K. I. Aligned single-wall carbon to intimately contact each pad. The impedance range was reduced to an average impedance of 167 $k\Omega$+/-40 $k\Omega$, with an electrode surface area of 0.38 mm², over tracks measured from 5 devices (FIG. 18C). At a frequency of 1 kHz, the impedance ranged from 30-300 $k\Omega$. Intertrack resistance was measured with a DC meter and found to be 2-40M$\Omega$ in hydrated environments, confirming there were no short-circuits between independent tracks (FIG. 19).

Impedance spectra at 1 kHz and the intertrack resistance of four arrays were measured over time following submergence in PBS with 2 mM $CaCl_2$ for 84 days at room temperature (FIG. 18F). Three of the arrays showed no significant change in impedance, and the intertrack resistance did not significantly change for any of the arrays. Further, all devices remained fully attached and with no changes in any dimensions. To mimic the effects of multiaxial mechanical cycling in a physiological system, a mouse was intubated and mechanically ventilated with the stroke volume set to correspond to 11% linear strain in each direction, similar to the physiological strain experienced by the mouse heart. An array was placed on the exposed muscle and cycled either 10,000 or 100,000 times (FIG. 18G).

All 24 electrodes cycled 10,000 times showed less than a twofold increase in impedance. For the array cycled 100,000 times, only one electrode visibly fractured. No array slipped, as the hydrogel encapsulation was intimately interfaced with the hydrophilic tissue.

The viscoelastic array was fabricated to match the dimensions of a commercial array, and the conformability and functionality of the two were compared on a bovine heart. When both arrays were placed on a flat portion of the tissue, all four electrodes made good contact and demonstrated a consistent impedance (105 kΩ and 300Ω for the viscoelastic and commercial electrodes, respectively). On the heart wall, on which the arrays needed to bend by more than 90°, none of the electrodes of the commercial grid was in contact with the tissue. However, all four electrodes of the viscoelastic grid remained in contact and experienced no significant change in the impedance. Further, when bent by >180° around the tissue, the viscoelastic array remained in contact, with no change in the functionality (FIG. 18H). The charge storage capacity (CSC) of the clinical-scale grids (electrode diameter, 5 mm) was calculated over the voltage range corresponding to the water window for each composition (FIG. 18I), and the carbon-based electrodes showed tenfold more CSC than the platinum electrodes. This voltage range was −4 to 4 V for the nanomaterial electrodes and −1 to 1 V for the platinum electrodes, as the carbon tracks are highly resistive and thus required a higher applied voltage to reach water electrolysis at the electrode interface. As the relative ratios of the GFs and CNTs were modified, the CSC changed, which suggests that the composition of the carbon additive can be tuned to achieve stimulation electrodes or recording electrodes (FIG. 18J).

Arrays were placed on explanted tissues and were observed to conform to the cortical surface of a rat brain, intimately covered a rat heart and precisely wrapped around nerves in a bovine heart. There was no macroscopic damage caused to any of the structures, and no array components delaminated. To validate the functionality in vivo, a mouse hindlimb was stimulated at various locations. The pulse parameters were kept constant, but the location of the electrode or the electrode which applied the stimulation were changed. This resulted in different responses, such as activation of the toes only, the ipsilateral foot only, the entire ipsilateral ankle or both the ipsilateral and contralateral limbs.

To assess the ability to record electrical activity in vivo, devices were placed on the epicardial surface of a mouse heart, and on the surface of a rat brain. During acute in vivo surgeries, arrays were placed on the epicardial surface of a mouse heart or on the epidural surface of a rat cortex. An 8-electrode array, as a 3×3 grid of electrodes with a diameter of 700 μm and a spacing of 800 μm between adjacent electrodes and with the center left empty, was designed for these studies; larger arrays and more electrodes can be readily fabricated for studies with larger animals. The array stayed flat on the mouse heart and remained in place as a result of surface tension and plastic deformation as the organ continued to beat (FIG. 20). Electrocardiograms (ECGs; FIG. 18D) with a maximum signal-to-noise ratio (SNR) of 17.4 were recorded. Next, the array was wrapped around the mouse heart and ECGs were recorded from the posterior side of the tissue, with the array bent more than 180° (FIG. 18K). The electrodes remained functional, with a SNR of 15.6. To confirm the signals recorded were specific to the heart, and not an artefact from the physical movement of the tissue, the grid was placed on the exposed liver, where no electrical signal was recorded (FIG. 21).

For the neural recordings, the electrode array was placed on the dura, on the exposed cortical surface of a Thy1 rat.

This transgenic rat model was used as its neurons could be depolarized by directing a blue light laser beam at the cortex through the transparent portions of the viscoelastic grid (FIG. 22). First, the laser was directed to the center of the array to induce electrical activity in the underlying cortex. All 8 of the electrode channels successfully recorded electrical activity (FIG. 23), and the traces over the recording session were averaged for each channel and plotted (FIG. 18E). Signals with an amplitude of almost 1 mV were recorded, and depolarization events which corresponded to the laser stimulation were reliably identified. Next, the position of the laser was moved to the left-lateral edge and the waveforms of the recorded activity changed, as expected. Additionally, the laser power was reduced from 90 mW to 45 mW, while the light was applied to the center or the peripheral location of the grid. The neural activity recorded by the array was significantly reduced when the laser was directed to the tissue in the center of the array, and the amplitude of the traces from both positions of the laser stimulation were reduced when the power was lowered to 45 mW. Finally, when the pulse duration of the laser increased from 5 to 10 ms, the time to electrical depolarization over the electrodes increased, and this trend was observed over three levels of laser power (FIG. 24).

These experiments confirm that the recorded activity was a real signal based on the underlying neurons, as opposed to non-specific tissue activity. Additionally, the amplitude of the activity recorded is comparable to existing arrays with similar electrode diameters.

A three-electrode viscoelastic array was also placed over the auditory cortex of a wild-type rat (FIG. 25). This far-lateral cortical target is surgically more difficult to access, and the device was bent by more than 180°. The array remained functional, and all electrodes recorded auditory evoked potentials (AEPs) in response to tone bursts from 1 to 10 kHz frequency. The three electrodes displayed typical AEPs at the onset and offset of the sound. Interestingly, the relative magnitude of the AEP amplitude at sound onset and offset differed amongst the three electrodes, which suggests that the electrodes were recording local tonotopic information. Indeed, each electrode displayed a different frequency tuning profile with a maximum SNR of 18 for the recorded surface potentials.

Example 6. Discussion

The first fully viscoelastic electrode array, exhibiting similar mechanical properties to soft biological tissues, was fabricated, and characterized in this disclosure. The materials used for fabrication exhibit highly tunable physical properties, where both the viscoelasticity and stiffness can be independently varied. Additionally, the surface arrays feature novel electrical conductors made from low loading fractions of high aspect ratio carbon nanomaterials, and thus they retained an ultrasoft modulus and viscoelastic nature. Likely due to this ability to match the mechanical nature of a tissue, neural cell responses to the soft viscoelastic array materials in vitro were favorable, with minimal astrocyte activation in vitro and with sustained signal-to-noise ratio recordings in vivo, especially as compared to those observed with hard and/or elastic materials, and enhanced neurite spreading. Further, high SNR values of 18 were obtained in vivo, enabling the recording of low-amplitude local field potentials. Further, the electrode design and the array fabrication process are facile and fast (3 days from design to the functional and fully assembled array) and do not require high temperatures, harsh chemical etchants, or thin-film photolithographic technologies.

As the electrodes and tracks have the same composition, and due to the stability of the GFs and CNTs, there is no interface delamination or need for metallic films, thus presenting a class of arrays that would be compatible with a multitude of imaging techniques, such as magnetic resonance imaging (MRI). Because different compositions of carbon additives demonstrated tunability of the CSC, a combination of different formulations could be used to fabricate an array that has some tracks more optimized for stimulation and others more optimized for recording.

This soft technology can likely be used in the future for various bioelectronic interfaces, for both two-dimensional (2D) and three-dimensional (3D) microelectrode arrays, including large-scale surface brain recordings and dynamic cardiac mapping, and become a useful tool to better understand how organs develop, function, and change throughout diseased states. A striking feature of the viscoelastic arrays is that they plastically deform upon implantation, enabling rapid 'personalization' to the local environment without the need for changing the electrode layout. The same initial 2D grid will quickly conform to the underlying tissue architecture without compromising the electrical and mechanical properties of the nanomaterial-based tracks. Implantation of the arrays in larger mammals, such as the porcine brain, would offer complex geometries (for example, intrasulcular) for recordings, which are currently inaccessible without causing significant plastic damage to the tissue.

INCORPORATION BY REFERENCE

All publications, patents, and patent applications mentioned herein are hereby incorporated by reference in their entirety as if each individual publication, patent or patent application was specifically and individually indicated to be incorporated by reference. In case of conflict, the present application, including any definitions herein, will control.

EQUIVALENTS

Those skilled in the art will recognize, or be able to ascertain using no more than routine experimentation, many equivalents to the specific embodiments of the present invention described herein. Such equivalents are intended to be encompassed by the following claims.

What is claimed is:

1. An viscoelastic conductive composite comprising:
   a viscoelastic conductive material, wherein the viscoelastic conductive material comprises a crosslinked polymer, and the crosslinked polymer comprises a hydrogel; and
   0.2 to 2.0% wt. of a conductive filler, wherein the conductive filler is a combination of a graphene flake and a carbon nanotube;
   wherein the viscoelastic conductive composite has a conductivity greater than 0.1 S/m, and the viscoelastic conductive material has a viscoelastic property that matches a viscoelastic property of a tissue.

2. The viscoelastic conductive composite of claim 1, wherein
   the crosslinked polymer is a polypeptide or a polysaccharide; or
   the crosslinked polymer is selected from the group consisting of alginate, chitosan, gelatin, collagen, laminin, and hyaluronic acid.

3. The viscoelastic conductive composite of claim 1, wherein the crosslinked polymer is ionically crosslinked with a crosslinking agent selected from the group consisting of a $Ca^{2+}$ salt, a $Mg^{2+}$ salt, a $Mn^{2+}$ salt, a $Be^{2+}$ salt, a $Sr^{2+}$ salt, a $Ba^{2+}$ salt, and a $Ra^{2+}$ salt.

4. The viscoelastic conductive composite of claim 3, wherein the crosslinking agent is selected from the group consisting of $CaSO_4$, $CaCl_2$, $Ca(NO_3)_2$, and $CaCO_3$.

5. The viscoelastic conductive composite of claim 1, wherein the hydrogel comprises a nanopore or a micropore.

6. The viscoelastic conductive composite of claim 5, wherein the hydrogel comprises a micropore having a diameter of about 1 μm to about 150 μm.

7. The viscoelastic conductive composite of claim 1, wherein the hydrogel has a porosity of about 50% to about 97%.

8. The viscoelastic conductive composite of claim 1, wherein the hydrogel is a cryogel.

9. The viscoelastic conductive composite of claim 1, wherein the viscoelastic property is selected from the group consisting of a storage modulus, a loss modulus, a ratio of loss modulus/storage modulus, and any combination thereof.

10. The viscoelastic conductive composite of claim 9, wherein the viscoelastic conductive materials has a storage modulus of about 500 Pa to about 400 KPa, a loss modulus of about 40 Pa to about 200 kPa, and a ratio of loss storage to storage modulus of about 0.1 to about 0.6.

11. The viscoelastic conductive composite of claim 1, wherein the crosslinked polymer comprises an alginate.

12. The viscoelastic conductive composite of claim 1, wherein the tissue is selected from the group consisting of central nervous system tissue, peripheral nervous system tissue, cardiac tissue, musculoskeletal tissues and skin.

13. A method of making an viscoelastic conductive composite according to claim 1, comprising:
    mixing a conductive filler and a viscoelastic conductive material, wherein the viscoelastic conductive material comprises a crosslinked polymer, and the crosslinked polymer comprises a hydrogel; and wherein the conductive filler is mixed with the polymer prior to the crosslinking.

14. The method of claim 13, wherein the method further comprises crosslinking the polymer.

15. A method of making an viscoelastic conductive composite of claim 1, comprising
    mixing a conductive filler with a polymer comprising an alginate; and
    crosslinking the polymer;
    wherein the conductive filler is a combination of a graphene flake and a carbon nanotube; and
    wherein the crosslinking is a cryogelation.

* * * * *